United States Patent [19]

Ide et al.

[11] Patent Number: 5,455,778
[45] Date of Patent: Oct. 3, 1995

[54] BEARING DESIGN ANALYSIS APPARATUS AND METHOD

[76] Inventors: Russell D. Ide, 122 Ridge Dr., Exeter, R.I. 02822; Donald J. Paquette, 24 Red Oak Dr., Coventry, R.I. 02816

[21] Appl. No.: 902,811

[22] Filed: Jun. 23, 1992

Related U.S. Application Data

[63] Continuation-in-part of Ser. No. 878,601, May 5, 1992, which is a continuation-in-part of Ser. No. 785,005, Oct. 30, 1991, Pat. No. 5,246,295, and Ser. No. 685,148, Apr. 15, 1991, which is a continuation-in-part of Ser. No. 309,081, Feb. 8, 1989, Pat. No. 5,137,373, which is a continuation-in-part of Ser. No. 283,529, Oct. 25, 1988, Pat. No. 5,112,143, which is a continuation-in-part of Ser. No. 55,340, May 29, 1987, abandoned.

[51] Int. Cl.⁶ ..................................................... G06F 15/20
[52] U.S. Cl. ...................... 364/512; 364/578; 364/474.24
[58] Field of Search .................... 364/578, 512, 364/474.24; 384/117, 122, 124, 121, 123, 125, 426

[56] References Cited

U.S. PATENT DOCUMENTS

| | | |
|---|---|---|
| 1,664,878 | 4/1928 | Flintermann . |
| 1,991,461 | 2/1935 | Howarth . |
| 2,110,464 | 3/1938 | Kingsbury . |
| 2,250,546 | 7/1941 | Michell et al. . |
| 2,314,703 | 3/1943 | Howarth . |
| 2,347,663 | 5/1944 | Carnahan . |
| 2,424,028 | 7/1947 | Haeberlein . |
| 3,001,136 | 9/1961 | Rumpelein . |
| 3,107,955 | 10/1963 | Trumpler . |
| 3,132,908 | 5/1964 | Grotzinger . |
| 3,142,519 | 7/1964 | Abramovitz . |
| 3,160,450 | 12/1964 | Gentiluomo . |
| 3,298,751 | 1/1967 | Elwell . |
| 3,384,425 | 5/1968 | Brown . |
| 3,578,827 | 5/1971 | Smith . |
| 3,586,401 | 6/1971 | Gravelle . |
| 3,604,765 | 9/1971 | Babcock . |
| 3,639,014 | 2/1972 | Sixsmith . |
| 3,677,612 | 7/1972 | Barnett et al. . |
| 3,829,180 | 8/1974 | Gardner . |
| 3,899,224 | 8/1975 | Schuller et al. . |
| 3,944,304 | 3/1976 | Purtschert . |
| 3,951,475 | 4/1976 | Okano et al. . |
| 3,971,602 | 7/1976 | Anderson . |
| 4,005,914 | 2/1977 | Newman . |
| 4,099,799 | 7/1978 | Etsion . |

(List continued on next page.)

FOREIGN PATENT DOCUMENTS

| | | |
|---|---|---|
| 7890/75 | 7/1975 | Australia . |
| 0206686 | 12/1986 | European Pat. Off. . |
| 0324188 | 12/1988 | European Pat. Off. . |
| 1010959 | 6/1952 | France . |
| 879116 | 10/1961 | Germany . |
| 1425086 | 3/1969 | Germany . |
| 53-56448 | 5/1978 | Japan .............................. F16C 17/02 |
| 222818 | 1/1966 | U.S.S.R. . |
| 8809443 | 12/1988 | WIPO . |

OTHER PUBLICATIONS

Article entitled: "Lubrication, Its Principles and Practice", A. G. M. Mitchell, pub. 1950, Blackie & Son Ltd., London.
White et al.; "A Factor Implicit Scheme for the Numerical Solution of the Reynolds Equation of Very Low Spacing" ASME 1980.

(List continued on next page.)

*Primary Examiner*—Ellis B. Ramirez
*Attorney, Agent, or Firm*—Michael D. Bednarek; Marks & Murase

[57] ABSTRACT

A method and apparatus for designing hydrodynamic bearings having movable bearing pads and a method for supporting a rotating shaft with such bearings. Bearing pad position under load is calculated using finite element analysis to determine influence coefficients, which are then used in conjunction with a two-dimensional model of the fluid film to provide the steady-state behavior of the bearing. The bearing design is altered until an acceptable design is arrived at. A bearing designed according to this method can be used to support a rotating shaft.

37 Claims, 51 Drawing Sheets

U.S. PATENT DOCUMENTS

| | | |
|---|---|---|
| 4,178,046 | 12/1979 | Silver et al. . |
| 4,227,752 | 10/1980 | Wilcock . |
| 4,335,925 | 6/1982 | Stopp . |
| 4,348,065 | 9/1982 | Yoshioka et al. . |
| 4,496,251 | 1/1985 | Ide . |
| 4,657,411 | 4/1987 | Bath . |
| 4,668,106 | 5/1987 | Gu . |
| 4,671,677 | 6/1987 | Heshmat et al. . |
| 4,676,668 | 6/1987 | Ide . |
| 4,699,525 | 10/1987 | Mizobuchi et al. . |
| 4,726,695 | 2/1988 | Showalter . |
| 4,738,453 | 4/1988 | Ide . |
| 4,738,550 | 4/1988 | Gardner . |
| 4,742,473 | 5/1988 | Shugar et al. ................... 364/578 |
| 4,797,842 | 1/1989 | Nackman et al. ............... 364/578 |
| 5,033,871 | 7/1991 | Ide ..................................... 384/98 |
| 5,102,236 | 4/1992 | Ide . |
| 5,125,754 | 6/1992 | Ide . |
| 5,137,373 | 8/1992 | Ide . |
| 5,209,579 | 5/1993 | Matake . |
| 5,222,815 | 6/1993 | Ide . |
| 5,255,984 | 10/1993 | Ide . |

OTHER PUBLICATIONS

Maeno et al.; "Effect of the Hydrodynamic Bearing on Rotor Stator Contact in a Ring–Type Ultrasonic Motor"; IEE Nov. 1992.

Andritsos et al.; "Nonlinear Pad Functions For Static Analysis of Tilting Pad Bearings" ASME 1980.

Maeno et al.; "Effect of the Hydrodynamic Bearing on Rotor/Stator Contact in A Ring–Type Ultrasonic Motor"; IEEE Symp. Dec. 8–11, 1991.

IEEE Transactions on Magnetics, vol. 27, No. 6, issued Nov. 1991, E. Cha et al., "Numerical Simulation and Animation of Head–Disk–Assembly Dynamics", pp. 5136–5138.

IEEE Transactions on Ultrasonics Ferroelectrics and Frequency Control, vol. 39, No. 6, issued Nov. 1992, Maeno et al., "Effect of the Hydrodynamic Bearing on Rotor/stator Contact in a Ring–Type Ultrasonic Motor," pp. 675–682.

IEEE Tokyo, 1986, Konno et al., "Advanced Implicit Solution Function of DEQSOL and Its Evaluation", pp. 1026–1033.

Article entitled "Fem for Thermo–Fluid Bearing Dynamic Characteristics" from An International Journal of Computers & Structures, vol. 31, No. 1, 1989, Oxford, U.K. pp. 93–102 by Z. A. Parszewski, X. Nan & D.–x. Li.

Article entitled "Prediction of Dynamic Properties of Rotor Supported by Hydrodynamic Bearings using the Finite Element Method" from An International Journal of Computers & Structures, vol. 12, No. 1, Oct. 1980, Oxford, UK, pp. 483–496, by Y. Birembaut & J. Peigney.

Article entitled "Application of Finite–Element Method to Hydrodynamic Lubrication Problems—Part 2: Finite–Width Bearing" from the Bulletin of the Japan Society of Mechanical Engineers, vol. 14, No. 77, Nov. 1971, Japan, pp. 1234–1244, Sanae Wada & Hirotsugu Hayashi.

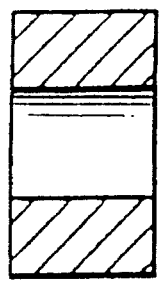 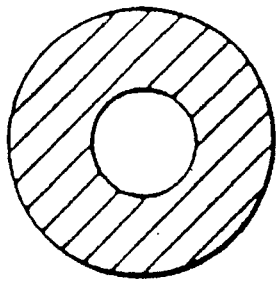 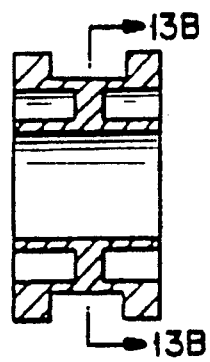 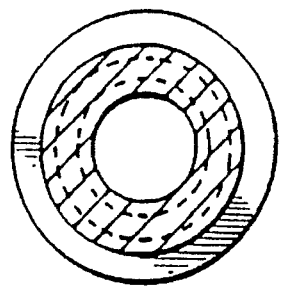
FIG.11A  FIG.11B  FIG.13A  FIG.13B
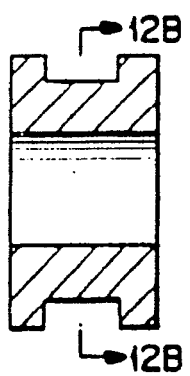 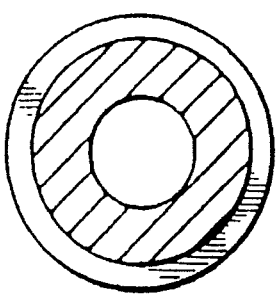 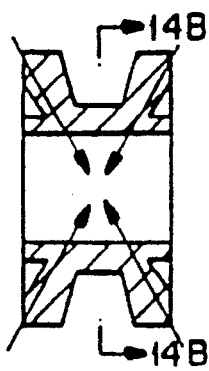 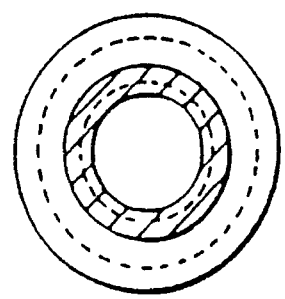
FIG.12A  FIG.12B  FIG.14A  FIG.14B
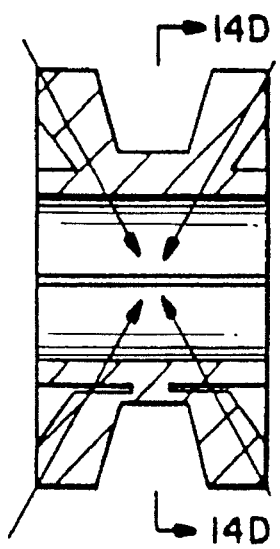 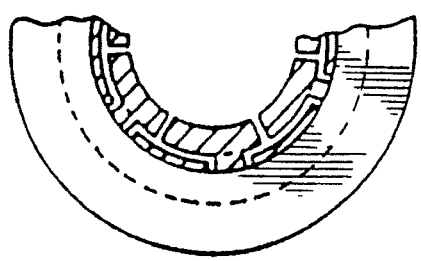
FIG.14C  FIG.14D

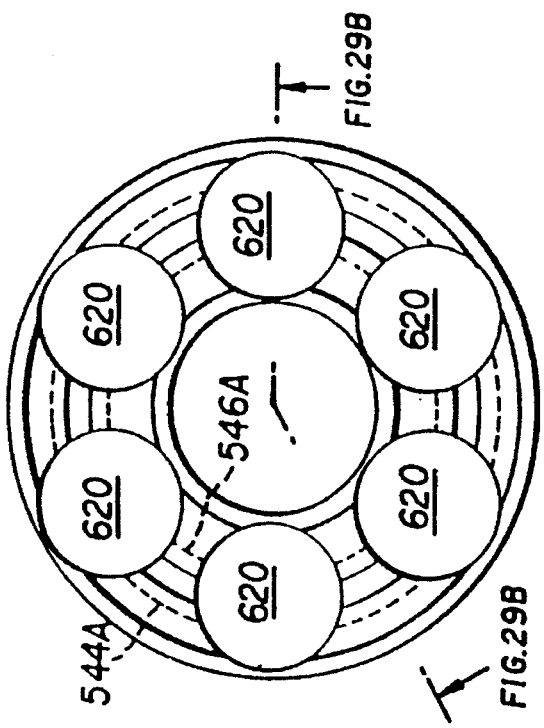
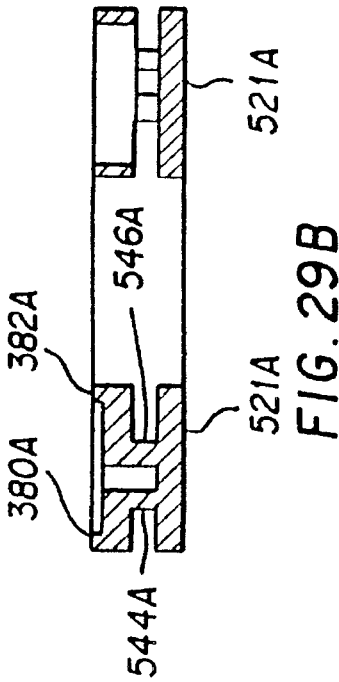
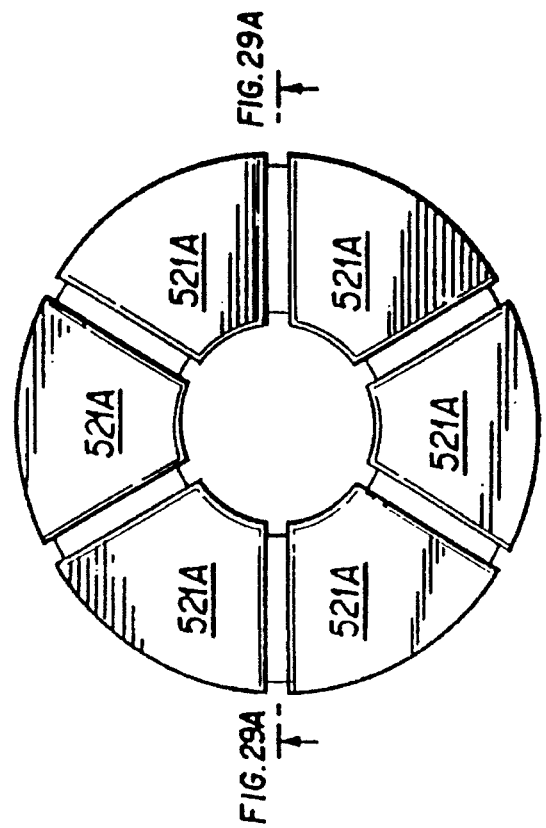
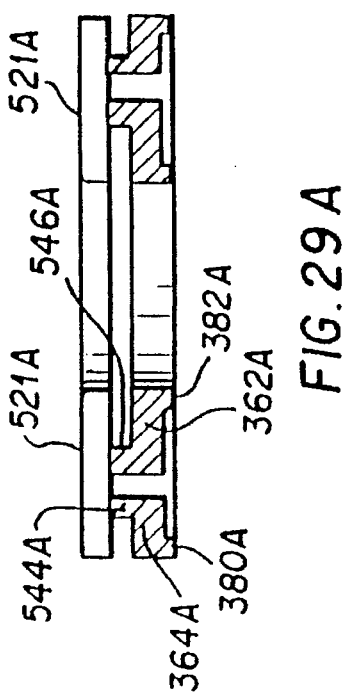

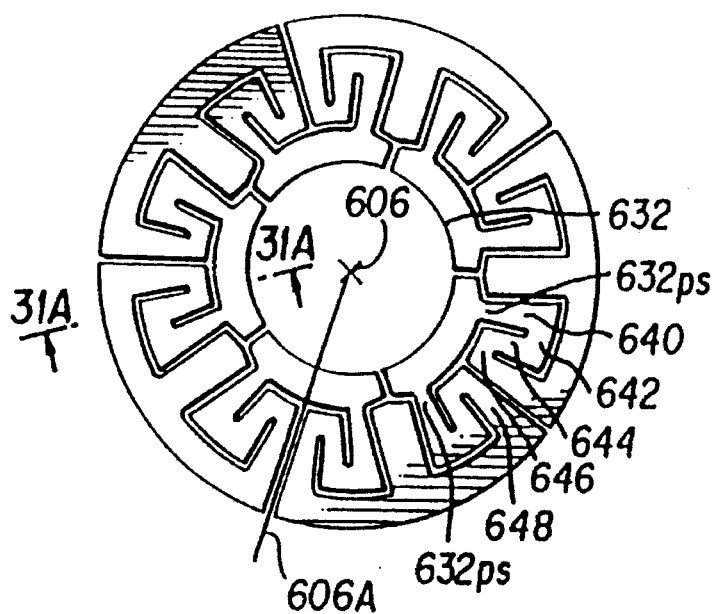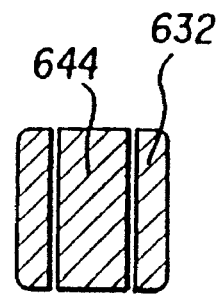
FIG. 31
FIG. 31A
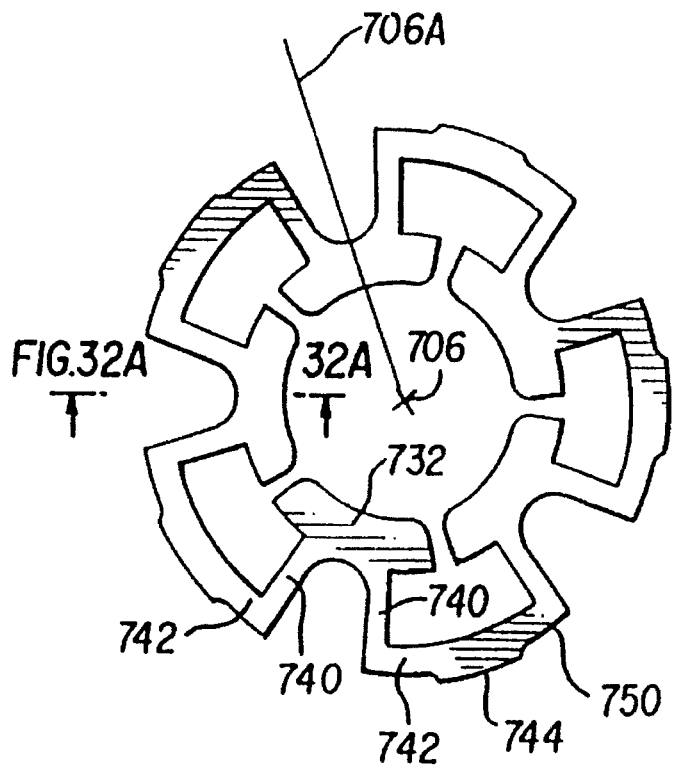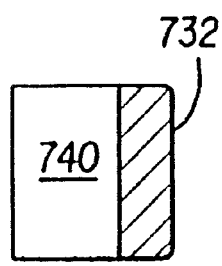
FIG. 32
FIG. 32A

BEARING DESIGN ANALYSIS APPARATUS AND METHOD

This application is a continuation-in-part (C.I.P) of, and claims the benefit of, 35 U.S.C. § 120 with respect to the applicant's copending U.S. application Ser. No. 07/878,601, filed May 5, 1992, which is a C.I.P. of and claimed the benefit of applications Ser. No. 07/785,005 filed Oct. 30, 1991 (U.S. Pat. No. 5,246,295) and Ser. No. 07/685,148 filed Apr. 15, 1991, which is a C.I.P. of and claimed the benefit of application Ser. No. 07/309,081 filed Feb. 8, 1989 and now U.S. Pat. No. 5,137,373, which was a C.I.P. of International Application PCT/US88/01841 and corresponding U.S. application Ser. No. 07/283,529 filed Oct. 25, 1988 and now U.S. Pat. No. 5,112,143, which is a continuation in part of U.S. patent application Ser. No. 07/055,340, filed May 29, 1987 and now abandoned.

FIELD OF THE INVENTION

The present invention relates to movable pad variable geometry bearings and a method and apparatus for use in the analysis of such bearings. More particularly, the invention relates to the design and analysis of radial bearings and thrust bearings having movable bearing pads.

BACKGROUND OF THE INVENTION

The present invention relates to hydrodynamic fluid film bearings. In such bearings, a rotating object such as a shaft is supported by a stationary bearing pad via a pressurized fluid such as oil, air or water. Hydrodynamic bearings take advantage of the fact that when the rotating object moves, it does not slide along the top of the fluid. Instead, the fluid in contact with the rotating object adheres tightly to the rotating object, and motion is accompanied by slip or shear between the fluid particles through the entire height of the fluid film. Thus, if the rotating object and the contacting layer of fluid move at a velocity which is known, the velocity at intermediate heights of the fluid thickness decreases at a known rate until the fluid in contact with the stationary bearing pad adheres to the bearing pad and is motionless. When, by virtue of the load resulting from its support of the rotating object, the bearing pad is tilted at a small angle to the rotating member, the fluid will be drawn into the wedge-shaped opening, and sufficient pressure will be generated in the fluid film to support the load. This fact is utilized in thrust bearings for hydraulic turbines and propeller shafts of ships as well as in the conventional hydrodynamic journal bearing.

Both thrust bearings and radial or journal bearings normally are characterized by shaft supporting pads spaced about an axis. The axis about which the pads are spaced generally corresponds to the longitudinal axis of the shaft to be supported for both thrust and journal bearings. This axis may be termed the major axis.

In an ideal hydrodynamic bearing, the hydrodynamic wedge extends across the entire bearing pad face, the fluid film is just thick enough to support the load, the major axis of the bearing and the axis of the shaft are aligned, leakage of fluid from the ends of the bearing pad surface which are adjacent the leading and trailing edges is minimized, the fluid film is developed as soon as the shaft begins to rotate, and, in the case of thrust bearings, the bearing pads are equally loaded. While an ideal hydrodynamic bearing has yet to be achieved, a bearing which substantially achieves each of these objectives is said to be designed so as to optimize hydrodynamic wedge formation.

The present invention relates to hydrodynamic bearings that are also sometimes known as movable pad bearings and methods of making the same. Generally these bearings are mounted in such a way that they can move to permit the formation of a wedge-shaped film of lubricant between the relatively moving parts. Since excess fluid causes undesirable friction and power losses, the fluid thickness is preferably just enough to support the maximum load. This is true when the formation of the wedge is optimized. Essentially the pad displaces with a pivoting or a swing-type motion about a center located in front of the pad surface, and bearing friction tends to open the wedge. When the formation of the wedge is optimized, the wedge extends across the entire pad face. Moreover, the wedge is formed at the lowest speed possible, ideally as soon as the shaft begins to rotate.

The so-called tilt-pad radial bearing is by far the most commonly-prescribed design for machines requiring maximum rotordynamic stability because of its exceptional stability characteristics. Consequently, it has become the standard by which many other radial bearings are measured when seeking a highly stable bearing design. The tilt-pad bearing's popularity is evidenced by the large number of applications found in industry, both as original equipment, and as aftermarket replacements. Applications range from small high-speed machines such as turbochargers and compressors, to very large equipment such as steam turbines and generators. The high rotordynamic stability comes from the reduction of cross-coupled stiffness that occurs when pads are free to tilt about their individual pivot points. This attenuates the destabilizing tangential oil film forces that can induce catastrophic subsynchronous vibration in machines equipped with conventional fixed-geometry bearings. Since so many machines are susceptible to this type of bearing-induced instability, there is a large demand for quality tilt-pad bearings.

Because of its many moving parts and manufacturing tolerances, the tilt-pad design is also the most complex and difficult to manufacture of all journal bearing designs. The design complexity is evident in the number of highly-machined parts required to make up the bearing. Clearance tolerances are additive in the built-up assembly of shell, pivots, and pads, requiring a high degree of manufacturing accuracy to yield acceptable radial shaft clearances. Pad pivot friction under high radial load can also lead to premature wear, or even fatigue failure, which can enlarge clearances and increase rotordynamic unbalance response. All of these requirements combine to make the tilt-pad bearing one which demands maximum attention to design, manufacturing, and materials.

The need for close tolerances manifests itself in known radial pad type bearings because it has been believed necessary to provide an accurately determined clearance between the bearing and the rotating object supported so as to allow the appropriate movement of the bearing pads to form the hydrodynamic wedge. The requirement of close tolerances is particularly troublesome in the manufacture of gas lubricated bearings. Another problem with gas lubricated bearings is the breakdown of the fluid film at high speeds. These problems have limited the use of gas lubricated hydrodynamic bearings.

Moreover, there is still a need for a hydrodynamic radial bearing which can be used in applications where it is essential that the shaft remain centered. Currently, in applications where the shaft can not be allowed to float within a radial envelope, e.g., mechanical seals rotating element bearings are used. In rotating element type bearings, shaft centering is not a problem because the shaft is in effect maintained in solid contact with the housing. With conventional hydrodynamic bearings, however, the shaft is separated from the housing by a spacing known as the radial envelope and in operation the shaft is supported on a fluid film. Thus, because of the spacing between the shaft and the bearing surface in conventional hydrodynamic bearings, the center of the shaft tends to float or drift during operation. In mechanical seals, for example, this movement of the shaft leads to a problem known as "shaft run out" which defeats the operation of the mechanical seal. Alternatives to the commonly used tilt pad bearings have been proposed.

The focus of these attempts has been to provide simple bearing constructions which emulate the performance of more complex tilt pad bearings. For example, on pages 180–181 of *Lubrication: Its Principles and Practice,* Michell discusses a multiple pad bearing in which the pads are elastically pivoted on an annular member of which they form integral parts. The design shown is extremely rigid because the circumferential dimension of the neck supporting the pads is at least twice as great as the radial dimensions of the neck.

U.S. Pat. No. 3,107,955 to Trumpler discloses one example of a bearing having beam mounted bearing pads that displaces with a pivoting or swing-type motion about a center located in front of the pad surface. This bearing, like many prior art bearings, is based only on a two dimensional model of pad movement. Consequently, optimum wedge formation is not achieved.

In the Hall patent, U.S. Pat. No. 2,137,487, there is shown a hydrodynamic moveable pad bearing that develops its hydrodynamic wedge by sliding of its pad along spherical surfaces. In many cases the pad sticks and the corresponding wedge cannot be developed. In the Greene Patent, U.S. Pat. No. 3,930,691, the rocking is provided by elastomers that are subject to contamination and deterioration.

U.S. Pat. No. 4,099,799 to Etsion discloses a nonunitary cantilever mounted resilient pad gas bearing. The disclosed bearing employs a pad mounted on a rectangular cantilever beam to produce a lubricating wedge between the pad face and the rotating shaft. Both thrust bearings and radial or journal bearings are disclosed.

There is shown in the Ide patent, U.S. Pat. No. 4,496,251 a pad which moves with these web-like ligaments so that a wedge shaped film of lubricant is formed between the relatively moving parts. The use of three spaced ligaments necessarily limits flexibility and prevents simple tilting action.

U.S. Pat. No. 4,515,486 discloses hydrodynamic thrust and journal bearings comprising a number of bearing pads, each having a face member and a support member that are separated and bonded together by an elastomeric material.

U.S. Pat. No. 4,526,482 discloses hydrodynamic bearings which are primarily intended for process lubricated applications, i.e., the bearing is designed to work in a fluid. The hydrodynamic bearings are formed with a central section of the load carrying surface that is more compliant than the remainder of the bearings such that they will move under load and form a pressure pocket of fluid to carry high loads.

It has also been noted, in Ide U.S. Pat. No. 4,676,668, that bearing pads may be spaced from the support member by at least one leg which provides flexibility in three directions. To provide flexibility in the plane of motion, the legs are angled inward to form a conical shape with the apex of the cone or point of intersection in front of the pad surface. Each leg has a section modulus that is relatively small in the direction of desired motion to permit compensation for misalignment. These teachings are applicable to both journal and thrust bearings. While the disclosure of this patent represents a significant advance in the art, it has some shortcomings. One such shortcoming is the rigidity of the support structure and bearing pad which inhibits deformation of the pad surface. Further, the bearing construction is not unitary.

The last two patents are of particular interest because they demonstrate that despite the inherent and significant differences between thrust and journal bearings, there is some conceptual similarity between hydrodynamic journal bearings and hydrodynamic thrust bearings.

This application relates in part to hydrodynamic thrust bearings. When the hydrodynamic wedge in such bearings is optimized, the load on each of the circumferentially spaced bearings is substantially equal.

Presently, the most widely used hydrodynamic thrust bearing is the so-called Kingsbury shoe-type bearing. Like tilt pad radial bearings, the shoe-type Kingsbury bearing is characterized by a complex structure which includes pivoted shoes, a thrust collar which rotates with the shaft and applies load to the shoes, a base ring for supporting the shoes, a housing or mounting which contains and supports the internal bearing elements, a lubricating system and a cooling system. As a result of this complex structure, Kingsbury shoe-type bearings are typically extraordinarily expensive.

An alternative to the complex Kingsbury shoe-type bearing is the unitary pedestal bearings shown in FIGS. 19–20. This bearing has been employed in, among other things, deep well pumps. This relatively simple structure is typically formed by sand casting or some other crude manufacturing technique because heretofore, the specific dimensions have not been deemed important. As shown in FIGS. 19 and 20, the bearing is structurally characterized by a flat base 36PA having a thick inner circumferential projection 38PA, a plurality of rigid pedestals 34PA extending transversely from the base and a thrust pad 32PA centered on each rigid pedestal.

FIG. 20(A) illustrates schematically the movement of the bearing of FIGS. 19–20 in response to movement of the opposing thrust runner in the direction of arrow L. In FIG. 20(A), the deflected position (greatly exaggerated) is illustrated in solid lines and the non-deflected position is illustrated in phantom. The curve PD in FIG. 20(A) illustrates the pressure distribution across the face of the pad. Under load, the thrust pads move around the rigid pedestals in an umbrella-like fashion as shown in FIG. 20(A). By virtue of this umbrella-like movement, only a partial hydrodynamic wedge is formed. Consequently, there is an uneven distribution of pressure across the face of the pad as illustrated in FIG. 20(A). Thus, the bearing has proportionately less hydrodynamic advantage compared to a bearing in which a hydrodynamic wedge is formed across the entire thrust pad face. Moreover, the rigidity of the pedestals and flat inflexible base prevent the movements necessary to optimize wedge formation. The foregoing may explain why bearings of the type shown in FIGS. 19–20, while far less expensive than Kingsbury bearings, have proved less efficient and capable and consequently less successful than the shoe-type bearings.

The present inventor has also discovered that the center pivot nature of both the bearing shown in FIGS. 19–20 and the Kingsbury shoe-type bearing contributes to bearing inefficiency. It should also be noted that, because of their rigid center pivots, neither the Kingsbury shoe-type bearings nor the bearing shown in FIGS. 19–20 can move with six degrees of freedom to optimize wedge formation. Thus, while, in some instances, the prior art bearings are capable of movement with six degrees of freedom, because the bearings are not modeled based upon or designed for six degrees of freedom, the resulting performance capabilities of these bearings are limited.

Prior art hydrodynamic bearings often suffer from fluid leakage which causes breakdown of the fluid film. In radial bearings, the leakage primarily occurs at the axial ends of the bearing pad surface. In thrust bearings, the leakage primarily occurs at the outer circumferential periphery of the pad surface as a result of centrifugal forces action on the fluid. When wedge formation is optimized, fluid leakage is minimized.

Many of today's modern turbomachines, especially those running at high speeds and low bearing loads, require the superior stability characteristics of tilt-pad journal bearings to prevent rotordynamic instabilities. Until now, the design complexity of tilt-pad bearings has precluded their use in many small, high-volume applications where cost and size are important.

Pad bearings with moving supports are also described in U.S. Pat. Nos. 5,054,938 and 5,066,144, both to Russell Ide.

As can be appreciated from the above discussion, the geometry of the pad and pad support structure and the mechanical properties of the bearing material govern bearing performance. In general, the design and optimization of such bearings for a given set of operating conditions necessitates complex and time consuming analysis. While various methods have been proposed for performing bearing design analysis, various drawbacks exist when using these previously proposed methods with pad bearings with moving supports. One drawback of the prior methods is the failure to take surface movement into account. Another drawback is the inefficiency of the prior art methods, due in part to the failure to use a finite element analysis (FEA) technique.

SUMMARY OF THE INVENTION

The present invention relates to pad type bearings and methods of making and analyzing the same. The bearings of greatest interest offer many of the rotordynamic advantages of conventional multi-piece tilt-pad bearings without the complexities of a multi-piece design. The pad type bearing, which is preferably unitary, can be formed from a single piece of heavy walled tubing or a cylindrical journal that has been machined or formed with small grooves and slits, bores or cuts through or on the bearing wall to define a flexible journal or thrust pad and a support structure. The pads and support structure are designed to optimize the shape of the converging wedge formed between the pad surface and the shaft when the shaft rotates. This can be done by modifying the pad shape, the support structure or both. Specifically, the pad can be modified to include grooves, cuts, rails and recesses to achieve desired deformations under load. The support structure can be designed to support the pads for movement in up to six degrees of freedom (i.e., translation or movement in the +x, −x, +y, −y, +z and −z directions) and rotation about the X, Y, and Z axes so as to optimize formation of the hydrodynamic wedge.

The bearings of the present invention can be designed in three dimensions to provide movement with up to six degrees of freedom so as to ensure optimum wedge formation at all times. Specifically, it has been discovered that a hydrodynamic bearing operates most effectively when the hydrodynamic wedge has several characteristics. In particular, the wedge should extend across the entire pad surface; the wedge should have an appropriate thickness at all times; the wedge should be shaped so as to minimize fluid leakage; the wedge should accommodate misalignment such that the major axis of the bearing is collinear or substantially parallel to the axis of the shaft; and the wedge should be formed at the lowest speed possible to prevent damage to the wedge forming surface which generally occurs as a result of shaft to pad surface contact at low speeds. Moreover, with thrust bearings, the loading among the spaced bearing pads should be equal.

With regard to thickness of the fluid film, it should be understood that the optimum thickness varies with loading. Under high or heavy loading, a relatively thick fluid film is desirable to adequately support the load. However, thicker films increase friction and power loss. Thus, the bearings are preferably designed to provide the minimum thickness necessary to support the shaft at maximum load.

The support structure is preferably unitary (one-piece) and comprises support stubs, beams, and/or membranes connected to a housing which is sometimes defined by the radially outermost portion of the bearing in the case of a journal bearing or, in the case of thrust bearings, a housing into which the bearing is mounted.

The inventor has discovered that in many specific applications such as in high speed applications, it is necessary to examine and evaluate the dynamic flexibility of the entire system consisting of the shaft or rotor, the hydrodynamic lubricating film and the bearing. In computer analysis of this system using a finite element analysis (FEA) model, it has been determined that it is necessary to treat the entire bearing as a completely flexible member that changes shape under operating loads. By adding more or less flexibility via machining of the basic structure, bearing characteristics may be achieved that provide stable low friction operation over wide operating ranges. A number of variables have been found to substantially affect the bearing's performance characteristics. Among the most important variables are the shape, size, location and material characteristics (e.g. modulus of elasticity etc.) of the pad and support members defined by the bores, slits or cuts and grooves formed in the bearing. The shape of the support members has been found to be particularly important. Also by providing a fluid backing to the flexible members, a high degree of damping may be achieved that further adds to system stability. In some instances, this damping has replaced secondary squeeze film dampening that is present when the oil film is present between the casing of the bearing and the housing.

The inventor has also discovered that, with respect to gas or air lubricated movable pad bearings, there are instances where loads or speeds exceed the capability of a gas film. In these cases, it is necessary to introduce a liquid type lubricant into the converging wedge without providing a liquid reservoir or bath. The present invention provides a bearing which solves this problem by providing liquid lubricant when necessary.

In accordance with the present invention, the movement of any given support structure is calculated using a linear spring model and FEA to determine influence coefficients. These coefficients can then be used to determine the extent of bearing pad movement caused by fluid film pressure loading. This method accounts for the elastic behavior of the pad and support structure, and provides for an efficient assessment of the impact of bearing flexibility on bearing performance.

The foregoing influence coefficients may be assembled in a matrix used to perform a radial bearing analysis. Determination of the influence coefficient matrix for most movable pad radial bearings requires the generation of a two dimensional model of the pad. In some cases, the support structure geometry may not be constant along the length of the bearing and a three dimensional model may be desired. In either case, the model is constructed, for example, as a wire frame using computer aided design (CAD) and is translated to a finite element package where influence coefficients are determined. Alternatively, the model can also be entirely constructed in the finite element package without the use of CAD. A bearing analysis is then performed using influence coefficients in conjunction with a two dimensional model of the fluid film based on the Reynolds equation. This analysis provides, for example, film thickness, pressure distribution, shaft equilibrium position, moved bearing shape, oil flow rate, temperature changes and power loss for a given set of operating conditions.

The distribution forces applied to bearings may be analyzed via FEA to determine the stresses which are acting inside the bearing itself.

Stability coefficients may be determined for input into a rotordynamics program to determine whether the design is stable for a given rotor bearing system. Rotordynamic analysis is, of course, performed routinely in the art and entire texts are dedicated to this topic (see, e.g., *Rotordynamics of Turbomachinery*, John M. Vance, John Wiley & Sons, 1988). Such a rotordynamics analysis may be performed including stability, forced response and sensitivity analyses.

The results of the bearing, stress, stability, forced response and/or sensitivity analyses are then evaluated. If the current bearing design does not meet the needs of the specific application, a new bearing design will be analyzed. This new design may, according to the present invention, incorporate various changes in the bearing parameters (such as clearance, length, number of pads, preload, etc.) and/or changes in the pad support structure. This entire process is repeated until a bearing design meeting the goals and requirements of the application is found.

A further aspect of the invention relates to performing a thrust bearing analysis. As with radial bearings, determination of the influence coefficients for a movable pad thrust bearing requires the generation of a multi-dimensional model of the pad. This model is constructed as a wire frame using computer aided design (CAD) and is translated to a finite element package where the influence coefficients are determined. Alternatively, the model is constructed entirely within the finite element package without the use of CAD. A bearing analysis is performed using influence coefficients in conjunction with a two dimensional model of the fluid film based on the Reynolds equation. This analysis provides, for example, film thickness, pressure distribution, pad shape under load, temperature rise across the pad, oil flow rate and power loss for a given set of operating conditions. The predicted film pressure distribution is then applied to the finite element bearing model to determine the stresses in the support structure. If the performance characteristics are not acceptable, the bearing design is modified. This modification is preferably based on design experience either through manual input by the bearing designer or through the use of an expert system. This process is repeated until the bearing design meets the specific goals of the application.

The present invention thus provides a method for analyzing a hydrodynamic bearing system comprising a hydrodynamic bearing for supporting a rotating shaft on a hydrodynamic fluid film is provided. The bearing comprises a plurality of spaced bearing pads and a support structure for supporting the bearing pads. Each of the bearing pads has a pad surface facing the rotating shaft, a support surface facing the support structure, a leading edge, a trailing edge and two side edges. The method requires that the operating conditions and a range of acceptable steady-state behavior characteristics for the hydrodynamic bearing system be identified. Details of a bearing construction are then input, including a pad shape and a support structure configuration to support the shaft under the operating conditions, and a multi-dimensional model of the bearing construction generated. The multi-dimensional model of the hydrodynamic bearing is then translated into a system of nodes appropriate for finite element analysis. Movement characteristics of the bearing construction are determined then through finite element analysis by applying unit nodes to selective nodes on the pad surface of the hydrodynamic bearing. An influence coefficient matrix is then formed from the movement characteristics and the influence coefficient matrix is combined with a two-dimensional model of the hydrodynamic fluid film based on the Reynolds equation. The combined matrix and model is then solved in an iterative fashion to determine the steady-state behavior of the bearing construction. Finally, it is determined whether the steady-state behavior is acceptable. If not, at least one of the pad shape and support structure is modified.

In accordance with another aspect of the present invention a rotordynamic analysis is conducted for the hydrodynamic bearing system. The analysis requires that a range of acceptable rotordynamic performance characteristics be identified. A rotor model is constructed by replacing the structural components of the hydrodynamic bearing system with springs and dampers at appropriate sections. Undamped critical speed maps and mode shapes can then be determined from the rotor model. Damping coefficients can also be determined by applying a velocity perturbation and calculating a change in force from the velocity perturbation. Stiffness coefficients can also be determined by applying a position perturbation and calculating a change in force from the position perturbation. The damping and stiffness coefficients are then applied to the springs and dampers, and forced response and stability analyses are performed using the rotor model to determine the rotordynamic behavior of the bearing construction. If the forced response or stability behavior falls outside the acceptable range, at least one of the pad shape and support structure is modified.

In accordance with another aspect of the present invention an apparatus is provided for analyzing the operation of the hydrodynamic bearing system using the above method.

The present invention also provides a method for providing a support for a rotating shaft. The method comprises the steps of: providing a plurality of circumferentially spaced bearing pads, each pad having a shaft supporting face; providing a support structure to support the bearing pads under load and to provide for movement of the bearing pads caused by shaft rotation under load such that a hydrodynamic wedge is formed between the shaft and the pad shaft supporting faces; analyzing the movement characteristics of the pads and support structure under expected loading; and modifying the bearing pads and support structure to provide pad and support structure movement under load which results in the desired hydrodynamic wedge characteristics. The bearing pads and support structure can be modified in accordance with any of the embodiments or structural variations disclosed herein.

Based upon the method and using the apparatus of the present invention, unitary movable pad bearings may be designed to suit virtually any application. While there are numerous arrangements of bores, grooves, cuts, or slits which may be formed in a unitary member to achieve desired performance, there are primarily two modes of movements: namely, one or more ligaments or membranes which move in the general direction of load in a bending mode and secondly, by torsional movement in a beam or membrane in a direction extending away from the pad along the longitudinal axis of the shaft in journal bearings. The degree of movement in the bending mode is, in part, a function of the stiffness of the support structure in the radial direction. The pad itself may be made to move under a load to form a different shape by providing internal cuts beneath the pad or by undercutting the edges of the pad. In either case, the cuts are specifically made to result in a predetermined shape under load. By surrounding or backing certain ligaments or membranes with lubricating fluid, a damping element may be added to the design.

Similar cuts are used for journal bearings and thrust bearings. The primary determinant is the movements desired for optimum performance. However, since journal and thrust bearings perform significantly different functions there, are inherent differences in desired performance requiring different desired movements. Consequently, despite the general conceptual similarity between the journal bearings and thrust bearings of the present invention there are also significant conceptual differences and plainly evident structural dissimilarities.

One embodiment of the bearing of the present invention includes a pad that may change shape and move in any direction (i.e., is supported for movement with six degrees of freedom). The bearing also may have a built-in damping system and is preferably of unitary or single piece construction for high volume economical manufacture. The journal bearings of the present invention also fits in a relatively small envelope (i.e., spacing between the housing outer diameter and the pad inner diameter).

Although the bearings of the present invention can be designed such that the bearings move with up to six degrees of freedom, such flexibility is not always necessary or desirable. For applications requiring more stability, the bearing pads can be supported for less than six degrees of freedom.

One bearing according to the present invention is composed of centrally-pivoted pads machined from a solid bronze puck through an Electric Discharge Machining (EDM) process. The support structure comprises a single narrow web supporting each of the pads with enough radial stiffness to support the shaft loads without becoming overstressed, while also providing enough rotational (tilt) flexibility to exhibit tilt-pad performance.

Optimization of the support structure configuration for individual applications precludes high stresses and assures long service life. The absence of moving parts eliminates pivot wear and durability concerns by eliminating the pad pivot contact stresses. Manufacturing tolerances are completely eliminated at all but the final bearing bore, thus simplifying the manufacturing process. EDM manufacturing is efficient and accurate for low-volume applications, while high-volume applications are either cast, extruded, or forged as discussed herein.

To obtain variable pad geometry in a one-piece design using a single ligament supporting its pad, the ligament must be flexible enough that the pads rotate with the load imposed by the rotating shaft. This characteristic, flexural rotation, distinguishes the present invention from other fluid film bearings. The capability of the pad to flex and rotate with the load allows cross coupling stiffness to approach zero as with a tilt pad bearing. This ensures stable operation. The web dimensions depend on the load being applied in a particular application and on other parameters which vary depending on the specific application and material construction of the bearing. The values for the rotational stiffness in a particular application are determined from a stability analysis where the stiffness is varied until a range is reached where the rotational flexibility provides performance comparable to tilt pad bearings. Tilt pad bearings tilt and build a pressure in the oil film which is symmetric around the shaft journal. The bearings of the present invention also tilt, but the tilt is not due to the rolling action as in standard tilt pad bearings. Instead, the tilt in the bearings of the present invention is due to the flexibility of the web section which allows the pad to rotate or tilt and accommodate the applied load. Although specific dimensions depend on the specific application, the ligaments should, as a rule, be longer in the radial direction than they are wide in the circumferential direction.

Another desirable feature available from the design of the bearings of the present invention is the narrower range of pre-load that can be obtained. Tilt pad bearings suffer from the stack-up in tolerances and thus result in a wide range of pre-load. This range increases as the bearing dimensions are reduced. The one-piece bearings of the present invention can, however, be manufactured to closer tolerances. In part, this is due to the fact that the position of the components relative to one another is fixed in a one-piece design. Thus, tolerances are not additive.

The need for close tolerances between the bearing pad and the shaft portion to be supported can be obviated by dimensioning the bearing so as to eliminate the spacing between the bearing pad and the shaft portion to be supported, while at the same time dimensioning the support structure such that the radial (in the case of a journal bearing) or axial (in the case of a thrust bearing) stiffness of the bearing is less that the corresponding fluid-film stiffness of the supporting fluid. Either the entire pad or only a portion thereof can be pre-biased into contact with the shaft. For instance, with extremely flexible bearings, it may be desirable to pre-torque the entire bearing pad into contact with the shaft. On the other hand, in some instances it is advantageous to pre-torque only the trailing edge of the bearing pad into contact with the shaft so as to define a hydrodynamic wedge. Thus, the bearings of the present invention can be designed to have an interference fit when installed on the shaft.

In one embodiment, as the bearing is forced onto the shaft, the pad support structure moves slightly to form a converging wedge shape while in the installed, static position with contact between the bearing pad and the shaft at the trailing edge. In such an instance where the bearing is designed to provide a statically loaded wedge, an appropriate spacing between the pad and the shaft will be established instantaneously upon rotation of the shaft by virtue of the stiffness of the fluid film. This is because the fluid film enters the wedge and builds up fluid pressure causing separation of the shaft and pad. Specifically, the relatively stiff fluid causes the relatively flexible beam support structure to move until the stiffness of the support structure is equal to the fluid film stiffness. The instantaneous formation of the fluid film protects the surface of the bearing pad from damage which occurs at low start-up speeds when there is direct contact between the shaft.

Interference fit bearings of the aforementioned type allow a much larger variation in machining tolerances. For example, relatively large (e.g. 0.003 inch) variations in the interference fit can be designed to have an insignificant impact on the wedge. This is particularly critical for gas lubricated bearings where alternate bearing forms require extraordinarily precise machining for proper operation. The present invention relaxes machining requirements.

The present invention provides a particular support structure which is especially well suited for interference fit applications. Such a support structure must provide both proper support under load and trailing edge contact at rest. To achieve this, the moment generated by the load acting at the trailing edge should act to turn the pad away from the shaft. A bearing designed in this way can be used to accurately center the shaft and hold the shaft in position until start up.

The present invention also relates to an improved variable geometry pad bearing that provides better shaft centering over the operating speed range than current bearings while also maintaining good rotor dynamic stability. Specifically, the present invention provides a new bearing design in which the stability characteristics of traditional bearings are maintained while also providing better shaft centering characteristics.

The bearing construction is a multiple pad bearing of the type described in applicant's previous application Ser. No. 07/785,005 filed Oct. 30, 1991 incorporated herein by reference. At least some of the bearing pads are provided with a support structure that allows the bearing pads to contact the shaft at rest to maintain the shaft in the proper centered position. The cantilevered centering pads begin at zero clearance and expand at speed under hydrodynamic pressure to a larger operating clearance. The larger centrally-pivoted pads offer low pivot rotational stiffness and high radial stiffness to attenuate unbalance response and maintain stability. Studies of this bearing construction have shown that such a one-piece journal bearing which includes pads supported by a single ligament can offer favorable rotordynamic stability comparable to that of a tilt-pad bearing, without the cost and complexity of a multi-piece design. Stresses induced in the ligaments, both from journal radial loads, and from pad tilting action, are well below the material fatigue limits, thus assuring long service life. This is largely because of the very small tilt oscillations traversed by the pads during operation, limiting the corresponding induced stresses to values which are inconsequential.

Similarly the thrust bearings of the present invention can be designed to provide a statically loaded wedge. Specifically, the thrust bearings of the present invention can be designed such that the bearing pads are biased so that the inner circumferential edge of the bearing pad extends away from the shaft and so that the trailing edge extends toward the shaft. With this arrangement, in the static loaded condition, the bearing pad slopes toward the shaft in the radial direction (when moving outwardly from the axis). Further, the bearing pad slopes toward the shaft from the leading edge to the trailing edge. In this way, a statically loaded wedge approximating the optimum wedge is formed and appropriate spacing between the pads and shafts is established instantaneously upon rotation of the shaft.

The relationship between fluid stiffness and spring characteristic may also be used to provide a combined radial-thrust bearing assembly. The assembly can include a simple continuous conical bearing surface pressed into contact with a shaft runner by a spring. The spring rate is selected such that under load, the bearing moves away from the runner surface and the shaft is supported on a fluid film.

In the bearings of the present invention, the pad movement may be directed toward the shaft to hold shaft location and to give the pad the ability to adjust for misalignment of the shaft and unequal loading among pads. Of course, the present invention may apply to any radial, thrust or combined radial and thrust form of bearings and may be one or two directional in nature, depending on the configuration of the bearing. More specifically, if the bearing support structure is symmetrical about the bearing's pad circumferential center line, the bearing will be bidirectional, i.e., capable of supporting a shaft for rotation in two directions in an identical fashion. However, if the bearing support structure is non-symmetrical about the bearing's pad circumferential center line the bearing will move differently when supporting a shaft for rotation in a first direction as compared to rotation in the opposite direction. For both journal or radial bearings and thrust bearings, the major axis is the central axis of the cylindrical blank from which the bearing is formed.

In the bearings of the present invention, the bearing pads can be supported for movement so as to retain the hydrodynamic fluid, thus obviating the problem of fluid leakage. With respect to radial or journal bearings, the support structure is designed such that, under load, the bearing pad moves to form a fluid retaining pocket. Generally, such a support is achieved when the primary support portion is connected to the bearing pad proximate the axial edges of the bearing pad and the center of the bearing pad is not directly supported, i.e., is free to move radially outward. With respect to thrust bearings, the pad is supported so as to tilt toward the bearing's inner diameter under load so as to prevent centrifugal leakage. Generally, this is achieved when the pad support surface at which the primary support structure supports the bearing pad is located closer to the bearing outer diameter than to the bearing inner diameter. When the primary support structure includes two or more radially spaced beams, the overall support structure must be designed to cause movement of the bearing pad at the inner end. Further, when the bearing pad is supported by a plurality of radially spaced beams and the region between the beams is not directly supported, the pad will tend to move so as to form a concave fluid retaining channel.

In short, the present invention relates to radial, thrust and compound radial and thrust hydrodynamic bearings which perform significantly better than known bearings and can be manufactured at a fraction of the cost of competitive bearings.

BRIEF DESCRIPTION OF THE DRAWINGS

The details of the invention will be described in connection with the accompanying drawings, in which:

FIGS. 11A and 11B are cross sectional views of a cylindrical journal or blank prior to machining;

FIGS. 12A and 12B are cross sectional views of a machined journal or blank;

FIGS. 13A and 13B are cross-sectional views of a further machined journal or blank;

FIGS. 14A and 14B are cross sectional views of a modified machined journal or blank; and FIGS. 14C and 14D are cross sectional views of a bearing constructed from the modified machined journal or blank of FIGS. 14A and 14B.

FIG. 29A is a cross-section of another thrust bearing construction according to the present invention.

FIG. 29B is a cross-section along the lines indicated in FIG. 30B.

FIG. 30A is a top view of the bearing of FIG. 29A.

FIG. 30B is a bottom view of the bearing of FIG. 29A.

FIG. 31 is a side view of another journal bearing construction in accordance with the present invention.

FIG. 31A is a radial cross-section of a portion of the bearing illustrated in FIG. 31.

FIG. 32 is a side view of another journal bearing construction in accordance with the present invention.

FIG. 32A is a radial cross-section of the bearing of FIG. 32.

FIG. 55 is a flow chart corresponding to a RADIAL module used to analyze radial bearings according to one embodiment of the present invention.

FIG. 56 is a flow chart corresponding to a DEFPAD module to be used in conjunction with the RADIAL module of FIG. 55.

FIG. 57 is a flow chart corresponding to a THRUST module used to analyze thrust bearings according to one embodiment of the present invention.

FIG. 58 is a flow chart corresponding to a PAD module to be used in function with the THRUST module of FIG. 57.

FIG. 59 is a plot of the principle and cross-coupling stiffness coefficients as a function of pad tilt stiffness and web thickness for a four-pad movable-pad bearing similar to that shown FIG. 1A.

FIG. 60 is a plot of logarithmic decrement as a function of pad tilt stiffness and web thickness for a four-pad movable-pad bearing similar to that shown in FIG. 1A.

FIG. 61 is a schematic representation of a high-speed double-overhung air-driven turbocompressor.

FIG. 62 is a cross-section of a rotor model used for rotordynamic analysis of the turbocompressor shown in FIG. 61.

FIG. 63 illustrates the computed undamped mode shapes based on the rotor model of FIG. 62.

FIG. 64 is a plot of critical speed as a function of support stiffness based on the rotor model of FIG. 62; also shown is a plot of the frequency-dependent support stiffness of a three-pad bearing like that shown in FIG. 1C.

FIG. 65 is a plot of the first mode log decrement for the rotor model of FIG. 62 as a function of web thickness and pad tilt stiffness.

FIG. 66 is a plot of the second mode log decrement for the rotor model of FIG. 62 as a function of web thickness and pad tilt stiffness.

Figure 67:
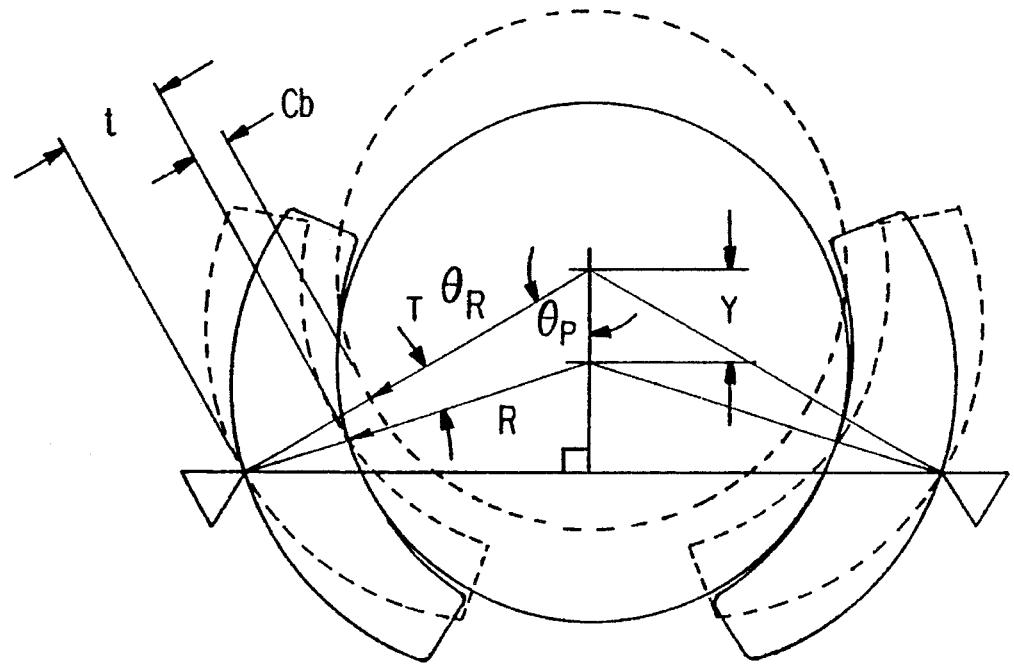

FIG. 67 is a schematic diagram illustrating the maximum possible pad movement when the bearing shaft is forced between two pads.

Figure 68:
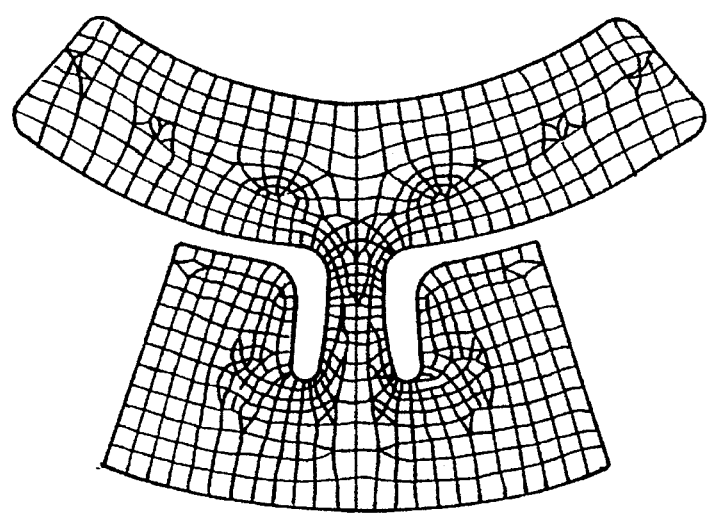

FIG. 68 is an illustration of the key points and line segments that are selected for FEA according to the present invention.

DETAILED DESCRIPTION OF THE PREFERRED EMBODIMENTS

The present invention is directed to a method of designing movable pad type hydrodynamic bearings and an apparatus for use therein. The bearings are preferably unitary and include pad support structures formed integrally as a single piece with the pads.

As discussed in detail below, the position of such a bearing pads under load is governed by the geometry of the pad support structure and the mechanical properties of the bearing material. According to one aspect of the invention, the support structure may be modeled as a linear spring by using the spring equation, F=KX, there F is the applied force, X is the extent of movement, and K is the spring constant having units of force per unit length. Alternatively, this relationship can be expressed as X=αF, where α, the influence coefficient, is the inverse of K and has units of length per unit force.

This equation is used in conjunction with finite element analysis to determine the influence coefficients for a given support structure. For example, in order to generate the influence coefficients, a finite element model of the structure is first generated and unit loads are applied to all or a number of nodes on the surface of the bearing, one node at a time. Although only the movements of the surface nodes are needed to determine the bearing profile, the resulting node movements of the entire support structure are calculated in a known manner using FEA. The surface movements due to the application of the unit loads at each node are stored and assembled to form an N×N matrix, where N is the number of nodes on the bearing surface.

This matrix, called the influence coefficient matrix, $\bar{\alpha}$, provides an indication of how the bearing will move under given loads through the equation $\vec{X}=\bar{\alpha}\vec{F}$=where $\vec{X}$ is the displacement vector and $\vec{F}$ is the force vector. The matrix may be arranged such that the rows correspond to individual loads and the columns correspond to particular nodes, or vice versa. In this way, the movement of each node due to each unit load is represented in the matrix.

Once the influence coefficient matrix is generated, the movements of the support structure due to any load distribution may be determined by performing a simple matrix multiplication. This method allows rapid analysis of an infinite number of operating conditions without using FEA for each movement calculation and, compared with other methods, significantly reduces the amount of time necessary to obtain the desired result.

Figure 54A:
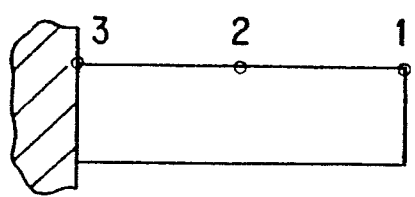
FIG. 54A shows a cantilever beam having three nodes according to one embodiment of the present invention.
Figure 54B:
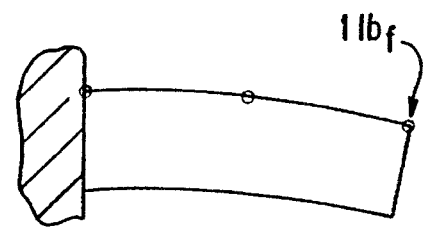
FIG. 54B illustrates the movement of the cantilever beam of FIG. 54A due to the application of 1 $lb_f$ at Node 1.

This procedure is illustrated in FIGS. 54A to 54D using a simple cantilever beam model with 3 surface nodes. As shown in FIG. 54B, the application of a unit load at node 1 causes movement of the cantilever beam. In this example, the movement at node 1 due to a unit load at node 1, is 4. Similarly, the movement at node 2, due to the unit load at node 1, is 3. This result is summarized as follows:

| Node No. | α(inch/lb$_f$) |
|---|---|
| 1 | 4 |
| 2 | 3 |

Figure 54C:
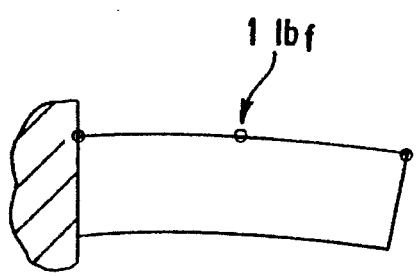
FIG. 54C illustrates the movement of the cantilever beam of FIG. 54A due to the application of 1 $lb_f$ at Node 2.

The application of a unit load at node 2, as illustrated in FIG. 54C, indicates that the movement at node 1 is 2 and the movement at node 2 is 1, i.e.,

| Node No. | α(inch/lb$_f$) |
|---|---|
| 1 | 2 |
| 2 | 1 |

From this data, an influence coefficient matrix $\bar{\alpha}$ can be generated such as that shown below:

$$\bar{\alpha} = \begin{vmatrix} 4 & 2 \\ 3 & 1 \end{vmatrix}$$

Figure 54D:
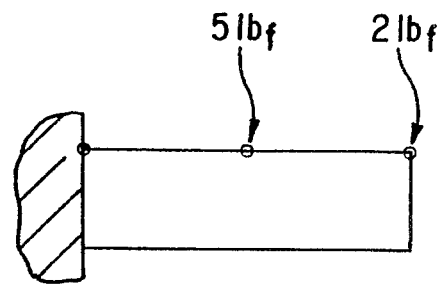
FIG. 54D illustrates the application of 2 $lb_f$ at Node 1 and 5 $lb_f$ at Node 2 of the cantilever beam of FIG. 54A.

Note that loads applied at node 3 in this example yield no movement by definition of a cantilever beam. Once the influence coefficient matrix $\bar{\alpha}$ is generated, it can be used as shown in the example of FIG. 54D. In FIG. 54D, it is shown that when there is a two-unit load at node 1 and a five-unit load at node 2, according to the equation $\vec{X}=\bar{\alpha}\vec{F}$, the matrix can be easily calculated to solve for displacement X1 and X2, as shown below.

$$\vec{X} = \bar{\alpha}\vec{F}$$

$$\begin{vmatrix} X_1 \\ X_2 \end{vmatrix} = \begin{vmatrix} 4 & 2 \\ 3 & 1 \end{vmatrix} \times \begin{vmatrix} 2 \\ 5 \end{vmatrix} = \begin{vmatrix} 18 \\ 11 \end{vmatrix}$$

Therefore, a two-unit load at node 1 and a five-unit load at node 2 results in movements at these nodes of 18 and 11, respectively. In practice, more than two nodes would be sampled. For example, on the order of 29 nodes per surface may be desired for greater accuracy. The calculation of the 29×29 matrix that is generated as a result of such a process can be easily handled by a simple computer.

Figure 55:
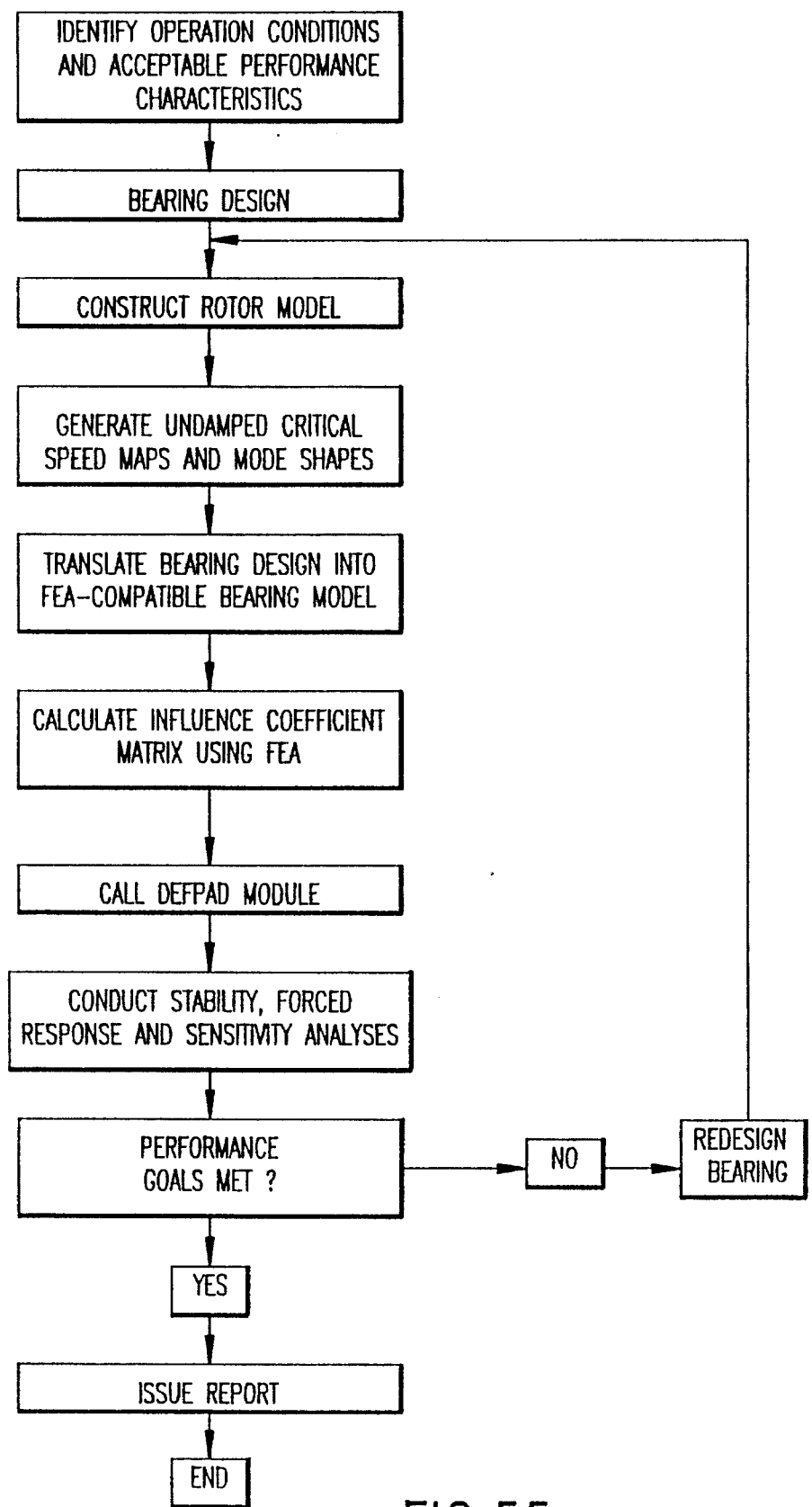

As illustrated in the RADIAL module flow chart of FIG. 55, the radial bearing analysis technique of the present invention involves the following steps. First, the operating conditions are identified. The operating conditions may include load, speed, temperature, geometry, lubricant properties and other known conditions and parameters. A range of acceptable performance characteristics is also identified for evaluating the performance of the bearing.

Preferably, acceptable rotordynamic performance characteristics are predetermined or set out in technical specifications such as, for example, the API (American Petroleum Institute) specifications. These specifications are readily available and widely used to identify standards of acceptable behavior.

A bearing model is then designed, typically using engineering judgment, based on the specified conditions. A rotor model is then constructed from the bearing model by dividing the rotor into sections (based on geometry) and replacing the bearings and seals with springs and dampers at the appropriate sections. It may also be desirable to include other effects to provide a more complete model of the system as will be apparent to one of ordinary skill in the art. An initial rotordynamics analysis of the rotor is then conducted using transfer matrices to determine undamped critical speed maps and mode shapes of the rotor. Undamped critical speed maps are plots of rotor natural frequencies v. support stiffness. Mode shapes are normalized shapes assumed by the rotor as it passes through natural frequencies for a specific support stiffness.

If the undamped critical speed maps and mode shapes are unacceptable, the bearing pads or support structure configuration is modified. As discussed below, this is currently performed using engineering judgment, but expert system approaches are also contemplated. If the undamped critical speed maps and mode shapes are acceptable for the operating frequency of interest, the bearing design is then implemented, for example, using computer aided design (CAD). The CAD may, for example, use CADKEY, a well known CAD program, to produce a two-dimensional (or three-dimensional) wire frame model of the bearing design, or part of the bearing design, in a known manner. The bearing design is then translated from CAD to a format compatible with finite element analysis (FEA) by creating key points and line segments from the wire frame model using a known CAD to FEA translator. Alternatively, the bearing design can be directly implemented in the finite element program, without the use of CAD. Nodes and elements are then defined and appropriate boundary conditions applied. FEA is performed (e.g., using a commercially available finite element package such as ANSYS) to generate influence coefficients which may be used to characterize support structure stiffness. The influence coefficients α are generated, assembled in a matrix and stored in the manner described above in connection with FIGS. 54A–54D.

Figure 56:
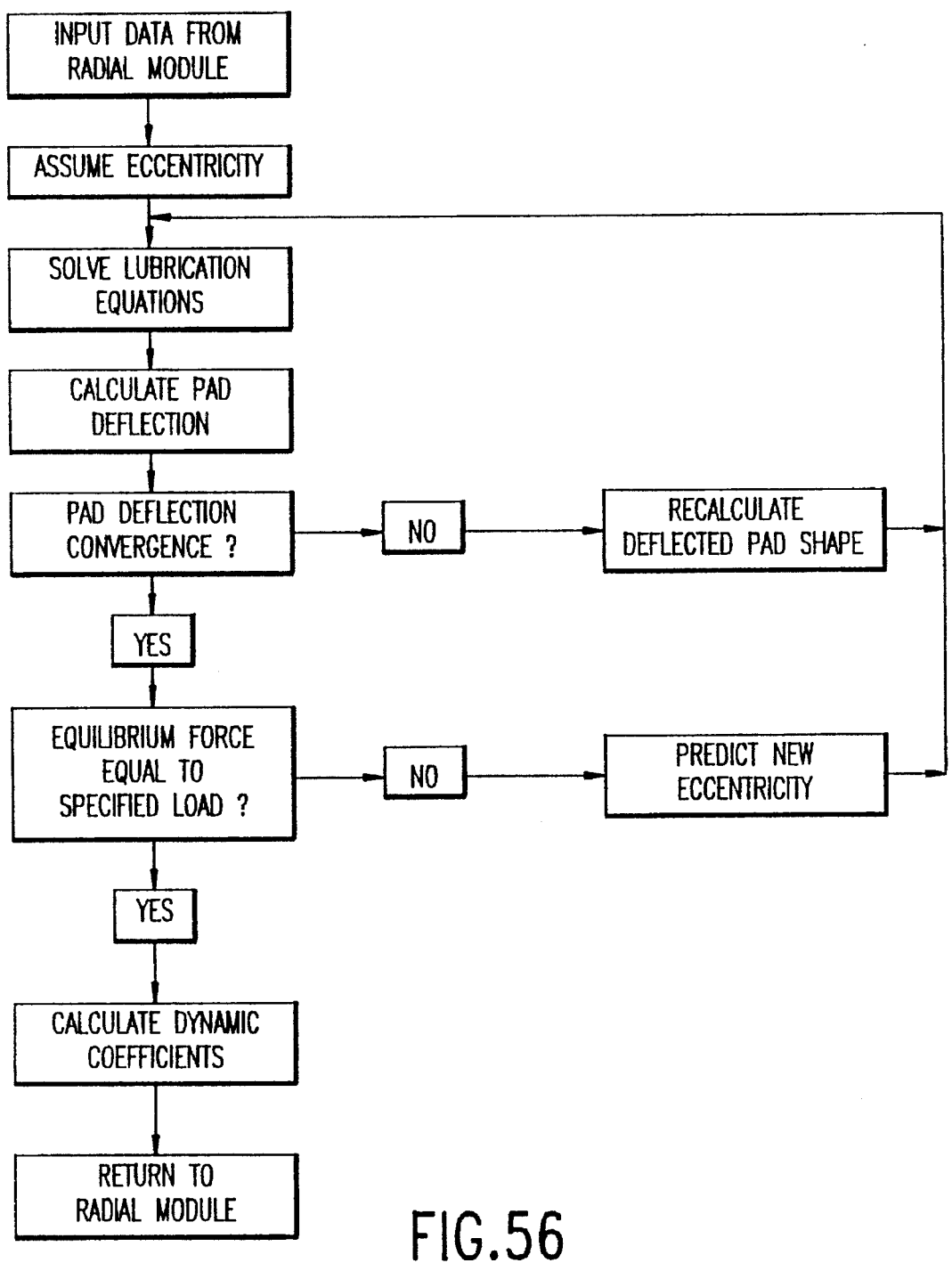

Once the influence coefficient matrix, $\bar{\alpha}$, is generated, a radial bearing analysis is begun, for example, using a radial bearing program (such as the DEFPAD module summarized in FIG. 56).

Once the DEFPAD module is called, key data are inputted from the RADIAL module. An initial shaft position, or eccentricity, is then selected, either manually or based on a computer generated determination. It is generally preferred that the initial shaft position be selected in the correct quadrant to minimize calculation time. If this step is automated, the factors taken into consideration include the magnitude and direction of the load. Based on these factors, the correct quadrant for the shaft position is usually obtainable.

The Reynolds equation (a second-order, elliptic, non-linear, partial differential equation based on the Navier-Stokes equation) is then solved for the initial shaft position to calculate the pressures in the oil film. One possible form of the Reynolds equation is, e.g., $$\frac{\partial}{\partial x}\left(h^3 \frac{\partial P}{\partial x}\right) + \frac{\partial}{\partial y}\left(h^3 \frac{\partial P}{\partial y}\right) = 6\mu U \frac{\partial h}{\partial x}$$

where $h=f(P,x,y)$ and is the bearing clearance (also referred to as gap size or film thickness), P is the pressure, x and y are distance coordinates (e.g., in the plane of the bearing surface), $\mu$ is the viscosity and U is the velocity. Of course, other forms of the Reynolds equation are possible and may be based, for example, on radial or spherical coordinate systems. Regardless of the form, the Reynolds equation can be solved by various known numerical methods, including finite differences and finite elements.

Next, the pad movements for the selected shaft position are determined by applying the pressures calculated using the Reynolds equation to the bearing pads in conjunction with the influence coefficient matrix. The pad movements are recalculated and the Reynolds equation is re-solved until convergence is reached. Convergence may be deemed to have occurred, for example, when two successive pad movement calculations are the same, within a specified tolerance. In addition to the pressure distribution and pad movements, solution of the Reynolds equation provides other information such as temperature profiles.

It is then determined whether the equilibrium force (which is calculated by integrating all pressure profiles and determining the magnitude and direction of the resultant force vector) matches the specified external load vectors. If the equilibrium force does not match the predetermined specified load vectors, a new shaft position, or eccentricity, is assumed and the foregoing steps are repeated. In general, if the equilibrium force is too large, it is desirable to move the shaft position closer to the center. Conversely, if the equilibrium force is too small, the shaft should be moved away from the center.

After assuming a new shaft position, pressures and forces are recalculated and it is determined whether the pad movements have converged. If so, a calculation is again made to determine whether the equilibrium force matches the specified load. This procedure is repeated until the selected shaft position yields a calculated equilibrium force substantially equal to the specified load.

Once the equilibrium force for a given shaft position matches the specified load, linearized dynamic bearing coefficients may be calculated. For example, stiffness coefficients can be calculated by applying a position perturbation to determine the resulting change in force. Similarly, damping coefficients may be calculated by applying a velocity perturbation to determine the resulting change in force. The linearized dynamic bearing coefficients may comprise four damping coefficients and four stiffness coefficients.

To further elaborate, the eight coefficients may represent the force in the X direction due to a displacement in the X direction ($K_{xx}$), the force in the X direction due to a displacement in the Y direction ($K_{xy}$), the force in the Y direction due to a displacement in the X direction ($K_{yx}$), the force in the Y direction due to a displacement in the Y direction ($K_{yy}$), the force in the X direction due to a velocity in the X direction ($D_{xx}$), the force in the X direction due to a velocity in the Y direction ($D_{xy}$), the force in the Y direction due to a velocity in the X direction ($D_{yx}$), and the forced in the Y direction due to a velocity in the Y direction ($D_{yy}$).

The DEFPAD module is then complete and the program is returned to the RADIAL module. The linearized dynamic bearing coefficients are then applied to the stations which the bearing occupy in the above-constructed rotor model. This allows the previous rotordynamics analysis (which yielded undamped critical speed maps and mode shapes) to be extended to further include damped analyses (forced response and stability) and a sensitivity study. The sensitivity study ensures that the design is acceptable over the expected range of bearing clearances, bearing preloads, bearing viscosities, etc. Such a comprehensive rotordynamics bearing analysis is used for radial bearing applications in which the dynamics of the rotor-bearing system are important.

The results of all of the above bearing analyses are then considered. If the bearing meets the performance goals (as defined by predetermined criteria), the design is complete. If any of the above analyses should demonstrate that the bearing design is unacceptable, changes such as bearing thickness, bearing width, bearing clearance, bearing length, bearing preload, machined-in pad profiles, offset, number of pads, shape of the pad support structure, support thickness, support width, and support length may be made. Bearing preload, m, is defined as $$m = 1 - \frac{C_b}{C_p}$$

where $C_b$ is the bearing clearance. $C_b$ and $C_p$ are further defined by $C_b=R_b-R_s$ and $C_p=R_p-R_s$, where $R_s$ is shaft radius, $R_b$ is the distance from the bearing center to the nearest portion of the pad surface, and $R_p$ is the radius of the pad surface. Offset is the fraction of the arc length of the pad that comprises the convergence length.

As discussed below, these changes are currently implemented using engineering judgment, but automated expert system approaches are also contemplated.

Although certain modifications are necessary, thrust bearings are analyzed in a manner generally similar to the analysis and design of radial bearings.

For example, thrust bearings, like radial bearings, may have a structural compliance which can be modeled using an influence coefficient matrix resulting from the placement of a unit load at user-defined locations (nodes) on the pad surface as discussed above. Determination of influence coefficients for movable pad thrust bearings requires the generation of a three-dimensional model of the pad. Such a three-dimensional model, as described above, may be constructed as a wire frame using computer aided design which may be translated to a finite element program where the influence coefficients are determined. Alternatively, the model can be constructed directly in FEA without the use of CAD.

According to one embodiment of the present analysis technique for thrust bearings, the bearing pad surface is subdivided into a grid pattern of nodes and elements, preferably in two dimensions (e.g., circumferential and radial). The fluid film system of equations is then established for the grid network and boundary conditions (pressurized boundaries, deformation, etc.) are incorporated in the system of equations. A variable grid finite element numerical method is then employed to obtain a solution to the lubrication equations. Film thickness, pressure distribution, deflected pad shape, temperature rise across the pad, oil flow rate and power loss, for example, are determined for a given set of operating conditions. The predicted film pressure distribution is then applied to the finite element bearing model to determine stresses in the support structure. This process is repeated until the bearing design meets the specific goals of the application.

The analysis technique has many capabilities and options including, but not limited to, pad structural compliance (i.e., load induced movement), pad local misalignment, runner-bearing misalignment, variable location angle and radius of pad center, variable axial location of pad surfaces for multiple-pad bearings (i.e., axial offset of the pads), circular pad automatic mesh generation, arc pad (e.g., step or tapered) automatic mesh generation, manual mesh input, heat balance (to satisfy cavity oil temperature), film rupture (to account for cavitation), pressurized boundaries and laminar or turbulent flow conditions.

The thrust bearing analysis technique may be used, e.g., to determine the steady-state performance characteristics of incompressible fluid film thrust bearings. The invention is applicable, but not limited to a wide variety of hydrodynamic fixed and movable-type pad geometry thrust bearings. The thrust bearing analysis technique, according to the present invention, may yield load capacity, viscous power loss, righting moments about pad local orthogonal axes, righting moments about bearing global orthogonal axes, flow requirements, pressure distribution, clearance distribution, spring and damping coefficients, heat balances and other critical information to bearing performance.

The analysis technique is applicable to a wide variety of bearing types including, but not limited to, step-pad, shrouded step-pad, tapered land-pad and shrouded tapered land-pad bearings having arc shapes. This technique is also applicable, but not limited, to circular pad flat surface bearings, circular pad crown-shaped surface bearings, circular pad cone-shaped surface bearings and virtually any other bearing geometry that can be defined using the manual input option of the program. The analysis technique is applicable with various types of runners including, but not limited to, runners having flat surfaces, crown shaped surfaces, coneshaped surfaces, and surfaces with circumferential waviness.

Figure 57A:
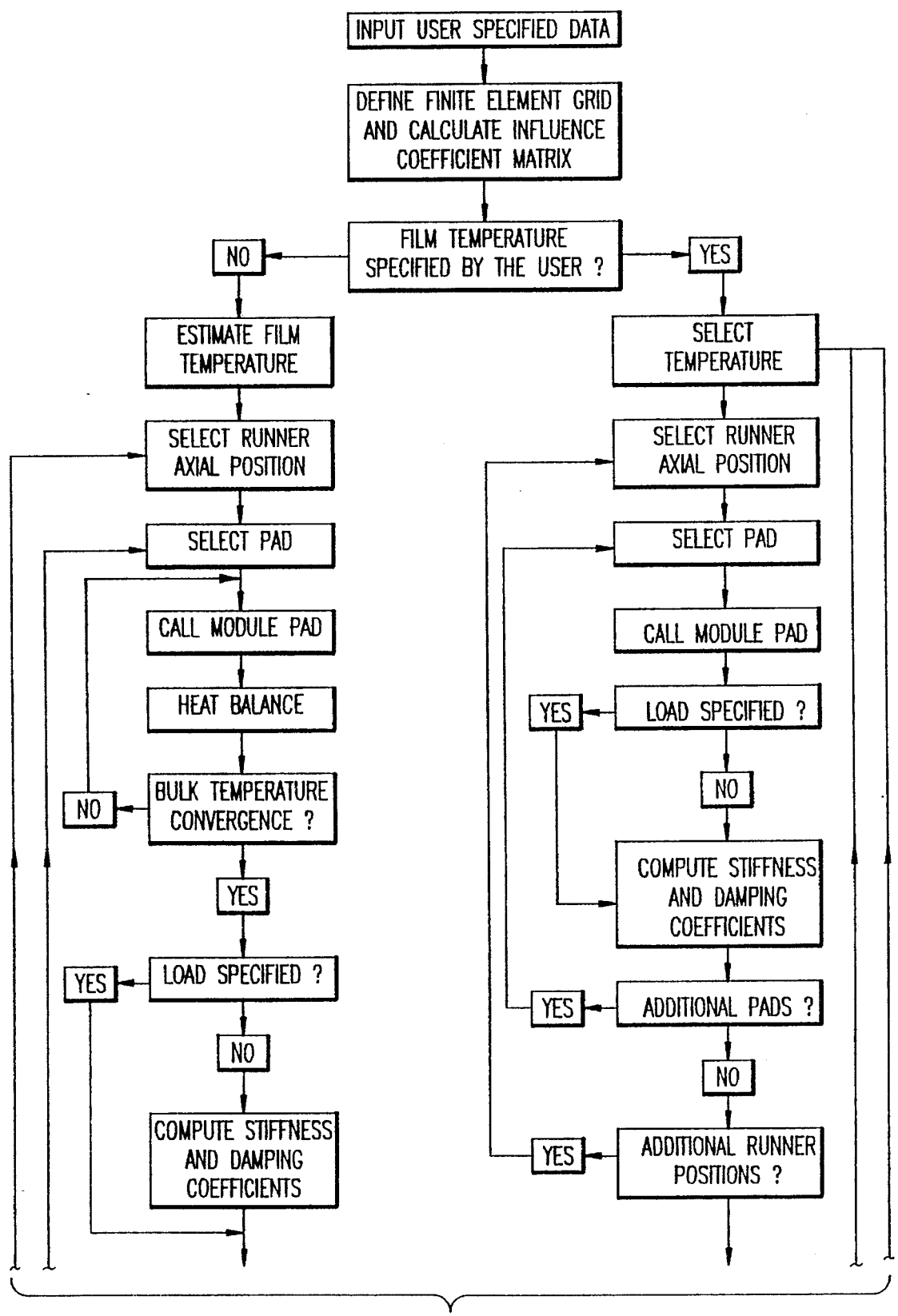
Figure 57B:
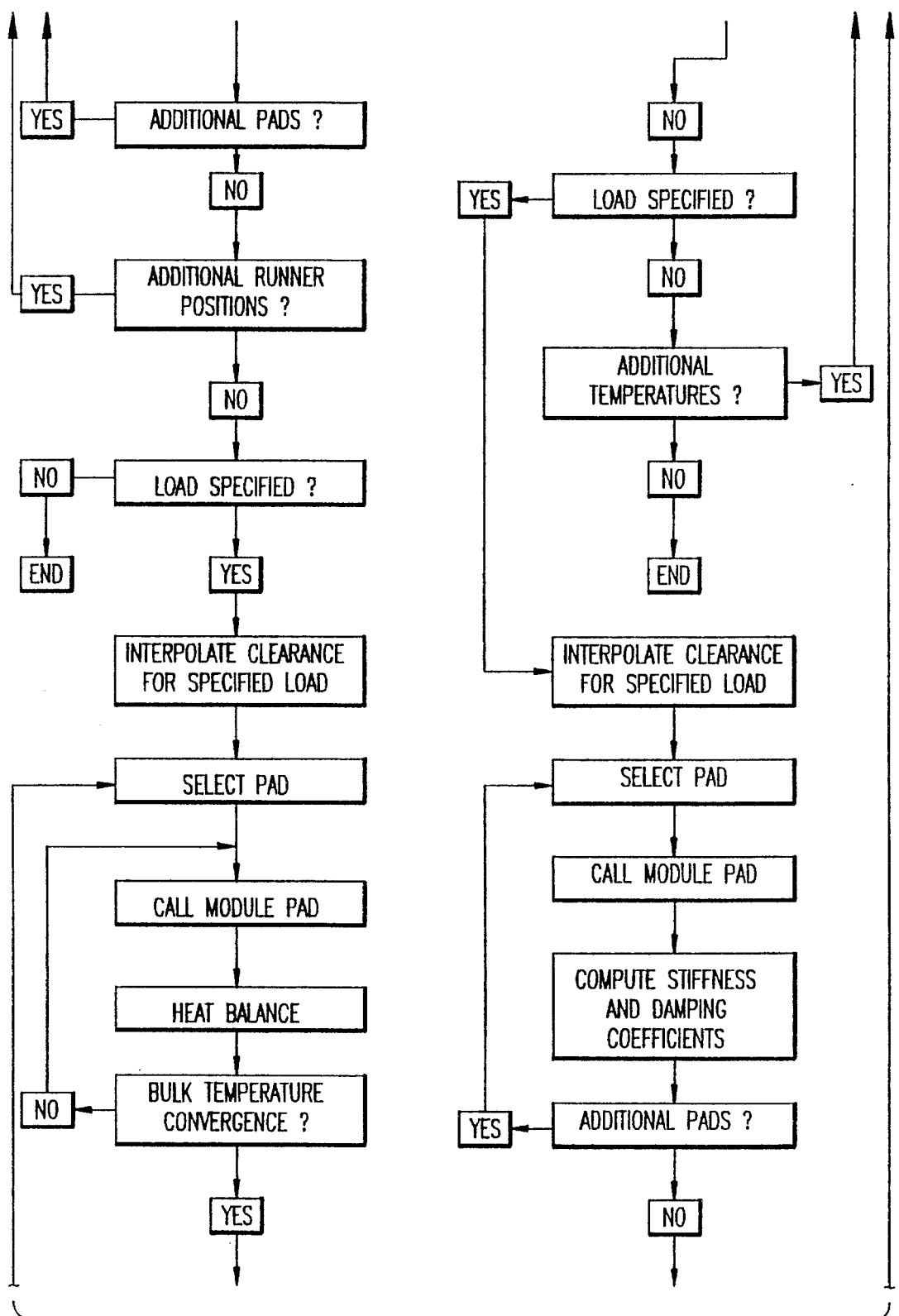
Figure 57C:
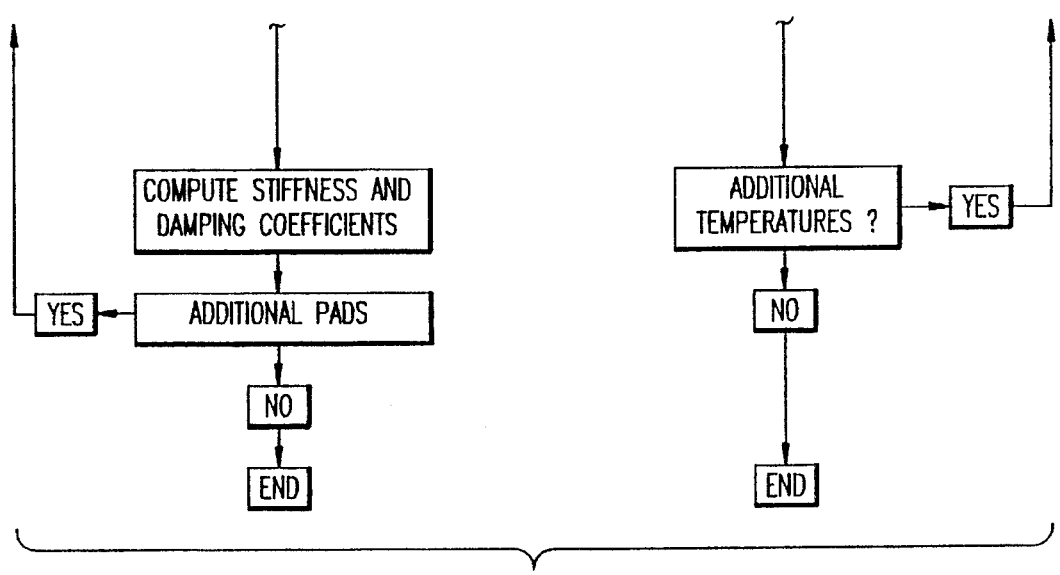

According to a novel analysis technique of the present invention, a thrust bearing is characterized by the use of a bearing analysis. For example, according to one embodiment of the present invention, a THRUST module as seen in FIG. 57 may be called wherein user specified input data are initially provided. This data may include pad type and local geometry, the number of pads in the bearing, lubricant properties, global pad and runner geometry, orientation/misalignment, shaft/runner local geometry, operating speed, influence coefficients and printout options.

The next step is to define a finite element grid and modify the influence coefficients to a required form. The model can be constructed directly in the finite element program, without the use of CAD. The bearing model is then meshed and appropriate constraints applied. A FEA is then performed to generate influence coefficients which, for example, may characterize support structure stiffness. The influence coefficients are generated, stored and assembled in a matrix in a manner like that described above in connection with FIGS. 54A–54D.

The user may then choose to specify an oil inlet temperature (and iterate to a correct film temperature), or the user may simply choose to begin a temperature loop by directly specifying a film temperature. If the film temperature is not user specified, an initial bulk film temperature must be estimated. This estimated temperature may be, for example, 120% of the oil inlet or bath temperature. In either case, a runner axial position loop is then begun by selecting an initial axial position for the runner.

Next, a pad loop is begun by selecting a pad on the bearing for analysis. Additional pad loops are necessary, for example, if it is desired to calculate the effects of misalignment.

Figure 58:
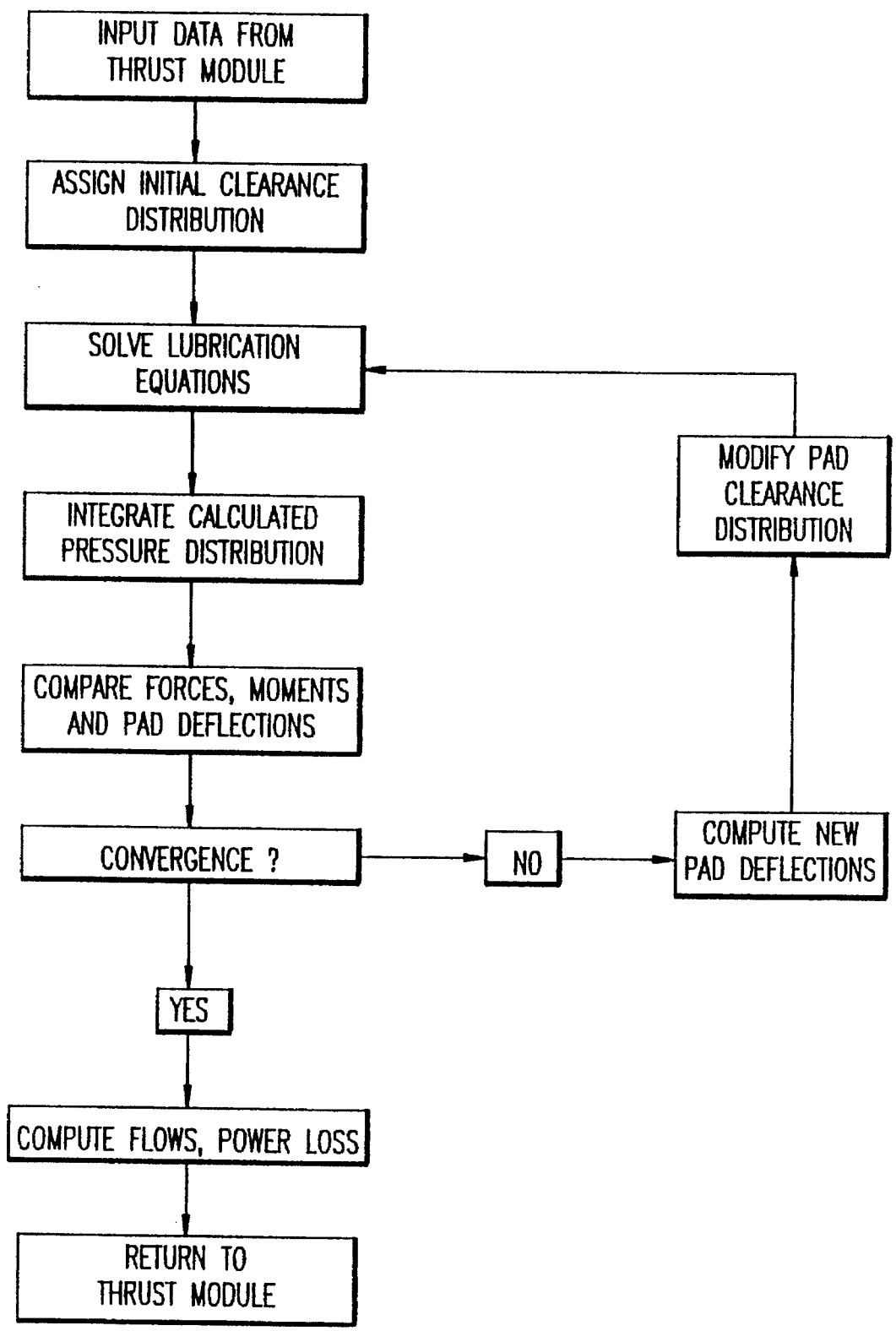

Using either the estimated or the user specified film temperature, a pad analysis is then conducted. For example, as shown in FIG. 58, a PAD module can be called and provided with input data from the THRUST module including the finite element grid, pad and bearing dimensions, influence coefficients, velocity, viscosity, clearance and angular misalignment. Changes in viscosity with film temperature may be taken into consideration, for example, by inputting viscosity information at specified temperatures and fitting a known expression (e.g., a power curve) to the inputted data.

Next, an initial surface configuration is assigned to the pad, usually based on prior experience, to provide an initial clearance distribution. The lubrication equations, including the effects of turbulence (i.e., non-laminar fluid movement) and cavitation (i.e., the rapid formation and collapse of vapor pockets in a flowing liquid in regions of very low pressure), are then solved to yield the pressure distribution in the fluid. The pressure distribution is then integrated to determine the forces and moments associated with the bearing pad. By comparing selected quantities (e.g., moments about x and y axes, integrated force, and movements at user-specified nodes) over two successive iterations, it can be determined whether the convergence criteria have been satisfied.

If convergence is not reached, a new pad surface deformation/movement is calculated based on the influence coefficients of the bearing pad and on the nodal axial forces previously obtained from the calculated pressure. After modifying the pad clearance distribution with the newly calculated pad surface deformation/movement, the deformation iteration loop is repeated until convergence is reached. Once this occurs, power loss and fluid flow are calculated. When the pad analysis is completed, the overall bearing analysis is continued, for example, as shown in the THRUST module in FIG. 57.

At this point, if the film temperature is not specified by the user, a heat balance is conducted. A simple heat balance can be calculated, for example, using the power loss and the fluid flow calculated in the pad analysis. For example, the equation $$T_{film} = T_{in} + \Delta T/2$$

can be used to calculate the bulk film temperature where $\Delta T = P/MC_p$ and where $T_{film}$ is the film temperature, $T_{in}$ is the inlet or bath temperature, P is the power loss, M is the mass flow rate of fluid and $C_p$ is the specific heat of the fluid. If this equation does not yield the correct inlet temperature, the temperature loop is repeated using a new value for $T_{film}$.

Once the bulk film temperature satisfies the convergence criteria or, alternatively, if the film temperature has been specified by the user, the load is then considered. If the load is not specified, the damping and stiffness coefficients of the bearing are computed by incrementing displacement and velocity and by solving the lubrication equations. If the load is specified, this step is skipped.

Regardless of whether or not the load is specified, pad performance and detailed pad output parameters may then saved and printed based on the output options specified. Output options include, but are not limited to, pressure profile, clearance distribution, minimum film thickness and temperature.

If there are alignment differences between the various pads of the bearing, the pad loop is then repeated for each of the different pads. After completion of all pad loops, the runner position and axial load are stored. Then, if calculations are desired for additional runner positions, the runner axial position loop is repeated.

Once the runner axial position loop is completed, a table of axial loads as a function of the specified clearances may be printed. The total load is calculated by totaling the loads on each of the pads for a specified runner position.

If the load has not been specified and the film temperature has been iteratively solved, rather than user specified, the program is complete.

If the load has not been specified and the film temperature has been user specified, the temperature loop may be repeated for additional film temperatures. When no additional film temperatures are desired, the program is complete.

If the load is specified, regardless of whether the film temperature has been specified by the user or whether it is iteratively solved, the clearances and applied loads generated above may be used to interpolate a value of the clearance for the specified load. For example, the above-specified clearances can be related to the above-generated axial loads by the second-order polynomial, $$R = AL^2 + BL + C,$$

where R is the runner position, L is a load and A, B and C are coefficients of the equation. Once A, B and C are determined (e.g., by known non-linear least-squares techniques) the runner position R can be directly calculated for the specified load using the above equation.

The bearing problem is then solved for the interpolated clearance that corresponding to the specified load. This is done, for example, as was previously done, by beginning by a pad loop by selecting a pad on the bearing for analysis. The selected pad is then analyzed, for example, by calling and operating the PAD module as described above with respect to FIG. 58.

Once the overall bearing analysis (represented in this example by the THRUST module) is resumed, if the film temperature has not been user specified, a heat balance is conducted and a new bulk temperature calculated as described above. If the heat balance does not yield the proper inlet temperature, the PAD module is run again. Once the heat balance yields the proper inlet temperature, or if the temperature has been user specified, the stiffness and damping coefficients of the bearing at the interpolated clearance are computed as above by incrementing displacement and velocity and solving the lubricating equations.

Detailed pad outputs may then be printed. The information printed includes detailed flows, loads (6 DOF), frictional power losses, film thicknesses, linearized film data, and stiffness and damping matrices.

If calculations are then desired for additional pads (e.g., to calculate the effects of misalignment), the pad loop is repeated until solutions are obtained for each of the pads desired.

Total bearing performance may then be summarized and printed for the interpolated clearance. This allows the thrust bearing to be assessed based on such criteria as the ability to handle misalignment stresses, minimum clearance, power loss, flow rate and so forth.

If the film temperature has been user specified, the temperature loop may be repeated for addition specified temperatures. Otherwise, the THRUST module is terminated and the thrust bearing analysis complete. As with the above radial bearing analysis, if the steady-state and rotordynamic characteristics do not meet acceptable performance characteristics, the bearing is redesigned and the above process repeated until acceptable performance is provided.

Currently the best way of modifying the pad shape and support structure wherein the steady-state and rotordynamic behavior is found to be unacceptable is manually selecting a new design based on experience and knowledge of how modifications to the support structure and pad shape affect bearing performance, as discussed in detail below. Since this information is known as a result of the present inventor's disclosure, however, it is contemplated that modified bearing designs could be generated automatically by a computer or the like so that the entire bearing design process could be automatic. This could be done in two ways. First, the computer could simply evaluate all possible bearing constructions within a prescribed universe. Alternatively, the computer could be programmed to make "intelligent" choices based on the design considerations discussed herein using expert system technology.

The first option is inefficient and currently is prohibitively expensive because of the number of calculations which would have to be performed. The second option is believed much more practical and will become increasingly practiced as improvements are made in expert systems employing so called "artificial intelligence."

Having described the method and apparatus used to design bearings according to the present invention, applicant will now describe a variety of possible bearing designs to illustrate the structural features which can be used in a bearing designed according to the present invention.

In describing these bearing designs in an understandable way, it is helpful to describe the bearing structures as being formed from a cylindrical blank by providing grooves, slits, bores and other openings in the cylindrical blank. As noted below, this is sometimes a useful technique for manufacturing a prototype bearing. However, the reference to the cylindrical blank is primarily intended to assist understanding of the present invention. It should be noted that although many of the bearings of the present invention could be manufactured from a cylindrical blank, it is not necessary that any of them be so manufactured. Indeed the bearings can be manufactured in numerous ways, some of which are discussed hereinafter.

Although the present invention provides a bearing construction which can be designed such that the pads are free to move in six directions, such freedom of movement is not always needed. For example, in conventional tilt bearings, see FIG. 1E, the individual pads need only tilt or pivot about an axis parallel to the rotor. A known rocker pivot pad has nearly zero rotational pivot stiffness. Such bearings are known to provide adequate performance, but they are expensive and difficult to tailor to individual applications. The function and performance can be replicated using bearings of the present invention which are of course, significantly less expensive than rocker pivot pad bearings.

The present invention also relates to one piece bearings designed to operate as tilt-pad bearings in a lubricant filled environment. In particular, the present inventor has found that the performance of expensive multipart rocker pivot pad bearings can be replicated in a single piece bearing in which the pads are supported on a single thin web. The pivot stiffness of such a pad is determined by the support web thickness. When the web thickness is low enough, tilt-pad behavior results as illustrated in FIG. 1D.

The effect of web thickness is typically expressed in terms of the principal stresses and cross coupled stiffness. Cross coupled stiffness is a term of art which can be though of as a measure of the resistance to tilting. As tilt stiffness drops, the cross-coupling terms asymptotically approach zero, which by definition yields tilt-pad behavior. At high pad tilt stiffness, the cross-coupling asymptotically approaches the high (negative) fixed-geometry values, resulting in much lower stability that is characteristic of fixed-geometry bearings. The principle coefficients vary slightly from the asymmetric (unequal) fixed-geometry values, to symmetric (equal) values that are characteristic of a fourpad tilt-pad bearing with load between pads.

In general, tests and analysis have shown that the one piece tilt pad bearing of the present invention exhibits fixed-geometry performance with high tilt stiffness, and tiltpad, variable geometry, performance at low tilt stiffness. Intermediate stiffnesses reflect transition from fixed-geometry behavior to tilt-pad behavior. Thus, the web thickness must be chosen low enough to exhibit tilt-pad stability without becoming overstressed from shaft loads or tilt stresses. The tilt-stresses are low because of the very small tilt angles traversed by the pads during operation.

Another desirable feature available from the design of the bearings of the present invention is the narrower range of pre-load that can be obtained. Tilt pad bearings suffer from the stack-up in tolerances and thus result in a wide range of pre-load. This range increases as the bearing dimensions are reduced. The one-piece bearings of the present invention can, however, be manufactured to closer tolerances. In part, this is due to the fact that the position of the components relative to one another is fixed in a one-piece design. Thus, tolerances are not additive.

Figure 1A:
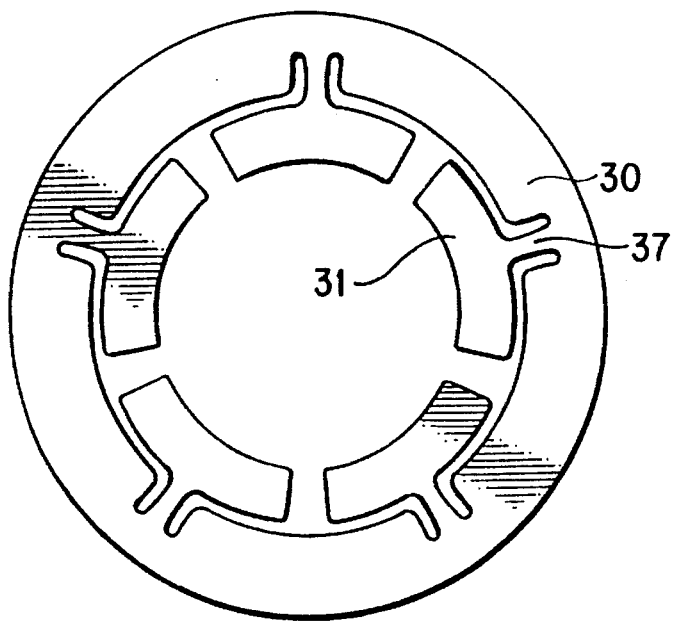
FIG. 1A is a side view of a tilting pad bearing according to the present invention.

FIG. 1A illustrates one form of tilt pad bearing according to the present invention. The bearing is designed to operate in a liquid filled environment. In operation, the pads tilt so as to pressurize the liquid. As shown, the bearing includes five spaced bearing pads 31. The number of bearing pads can, of course, be varied to suit any particular application. The bearing pads 31 are each supported on a bearing housing 30 via a single thin web-like ligament 37. As shown, the ligament has a radial length which significantly exceeds its circumferential width.

In the embodiment illustrated the web 37 is provided on the circumferential center line of the pad 31 so that the bearing supports the shaft rotation in either the clockwise or counterclockwise direction, i.e., the bearing is bidirectional. The web 37 extends generally radially between the pads and the bearing housing. The bearing may be formed by machining a solid bronze puck through an electric discharge machining (EDM) process, but this is not required. According to the present invention, the webs 37 must support the pad with enough radial stiffness to support the shaft loads without becoming overstressed, while also providing enough rotational (tilt) flexibility to exhibit tilt-pad performance. Although the acceptable range of web thickness varies from application to application, the present inventor has found that the web thickness should, at minimum be less than the radial length of the web. If the webs are too thin, the web will be overstressed and the bearing will be destroyed. On the other hand, if the webs are too thick the pads will no longer function as tilt pads, instead functioning either in the transition regime or as fixed geometry pads. Of course, the stresses that result from tilting must also be within the endurance limit to avoid fatigue failure. The endurance limit is defined as the allowable stress below which you can have an infinite number of cycles. Other facts that can affect performance include thermal effects and pad surface movements. Optimization of the support structure configuration for individual applications precludes high stresses and ensures long life. As mentioned previously stresses are minimized because of the small tilt angle. The absence of moving parts eliminates pivot wear and durability concerns by eliminating the pivot pad contact stresses. Manufacturing tolerances are completely eliminated all but the final bearing bore, thus simplifying the manufacturing process. EDM manufacturing is efficient and accurate for low volume applications, while high volume applications can be cast, molded, extruded or forged as discussed herein.

Figure 1E:
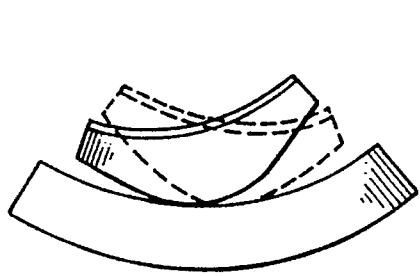
FIG. 1E is a side view of a pad of a prior art tilt pad bearing.
Figure 1D:
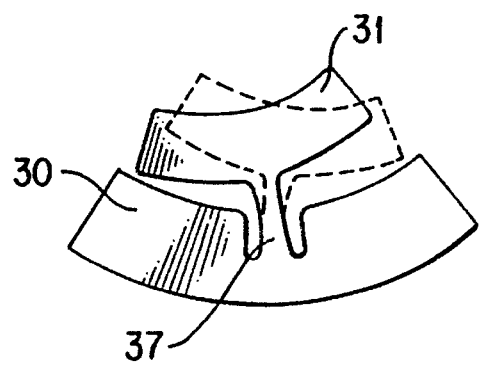
FIG. 1D is a side view of one tilt supported bearing pad showing the tilting of the pad under load.

FIGS. 1D and 1E show a comparison of the tilting pad function of the tilt pad bearings of the present invention (FIG. 1D) with a conventional tilting pad construction (FIG. 1E). As is illustrated therein the simple one piece tilt pad bearing construction of the present invention pivots in essentially the same manner as a conventional pivot bearing. Again, the critical design feature for successfully replicating the performance of a tilt-pad bearing is providing the appropriate web thickness.

It should noted that FIG. 1A illustrates a bearing which is extremely simple and is designed to simply replicate the performance of a pivot pad bearing. Consistent with the teachings of the present invention, however, this bearing construction can be further modified to provide additional flexibility if desired. For instance, facing grooves can be provided in any sides of the bearing to reduce the axial thickness of the web so as to enhance the ability of the pads to twist to accommodate shaft misalignment. Moreover, the outer periphery of the bearing housing can be formed with grooves or projections to increase the radial flexibility of the pads so that the pads can move in the radial direction.

Figure 1B:
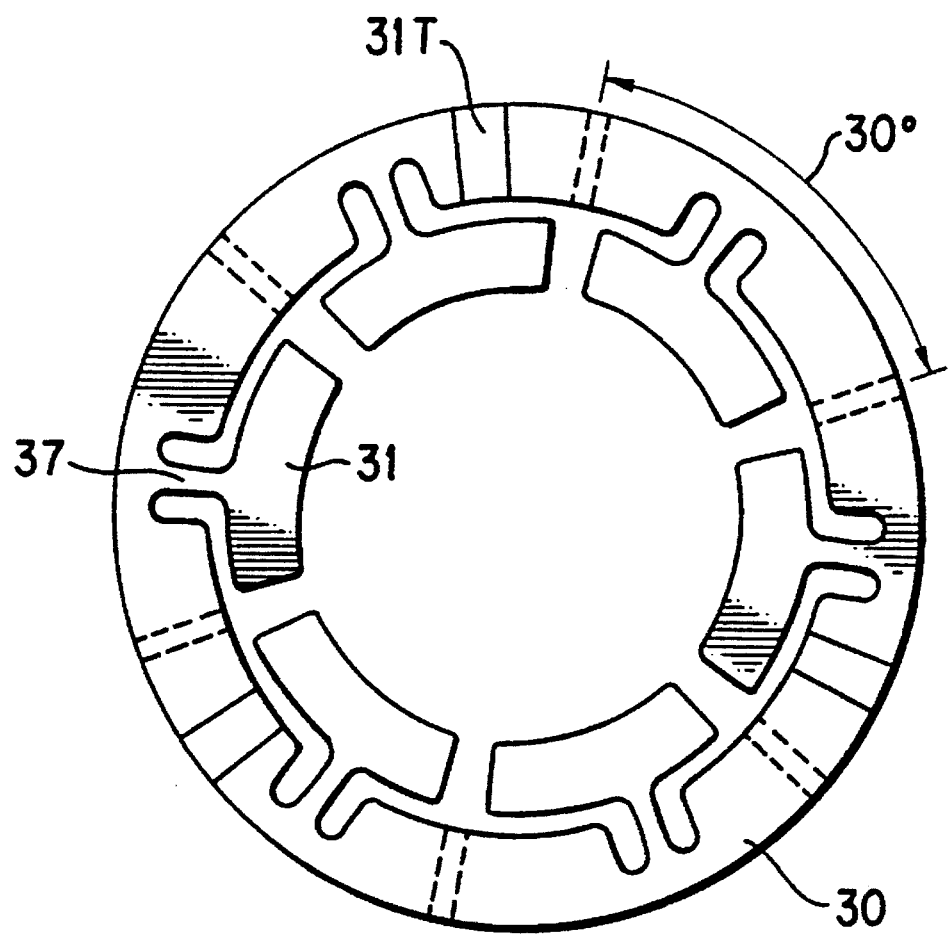
FIG. 1B is a side view of another tilting pad bearing according to the present invention.

FIG. 1B illustrates another tilt-pad bearing according to the present invention. This bearing construction is similar to that shown in Figure A with few exceptions. First, the webs 37 are circumferentially offset so that the bearing is, in effect, designed to support the shaft for rotation in only one direction. Because the support is different for each direction of rotation, the tilting characteristics of the pad will vary and will only operate properly in one direction. The bearings shown in FIG. 1B includes six circumferentially spaced bearing pads 31. Again, each of the pads are supported on a single radially extending thin web 37. The webs are supported on a bearing housing 30. Once again, it is critical that the webs 37 are thick enough to avoid tilting stress, but thin enough such that the pads tilt as tilt-pads rather than as fixed geometry pads. As shown, the ligaments have a length which exceeds their circumferential width. In the embodiment illustrated in FIG. 1B, the bearing housing 30 is provided with radially extending oil lubricating passages 30° to allow the lubricant to flow into a bearing housing. The oil lubricating passages 300 are preferably located between adjacent pads as shown in FIG. 1B.

In accordance with another aspect of the present invention, tapered thrust lands 31T are provided on the bearing housing 30 to carry small thrust loads incurred during operation. This might be necessary, for example, when the bearing is used in a planetary gear arrangement wherein small thrust loads are incurred in positioning the planet gear shaft. The thrust loads 31 should, preferably, be circumferentially spaced along the bearing. Like the embodiment of FIG. 1A, the embodiment of FIG. 1B includes simple pivoting-type webs. Again, however, the support structure could be modified to provide additional flexibility as discussed herein.

Figure 2A:
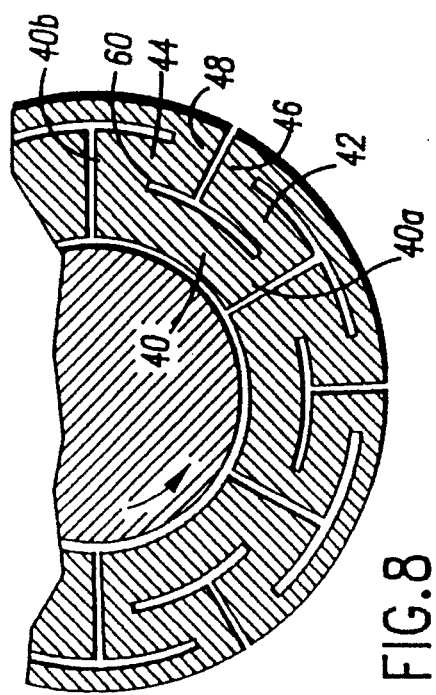
FIG. 2A is a sectional view of a journal bearing illustrating a sector thereof embodying one form of the invention.
Figure 2:
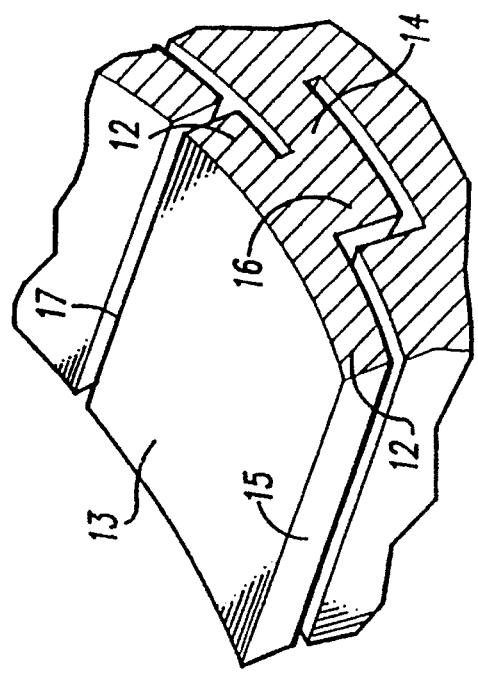
FIG. 2 is a schematic view of a single pad made in accordance with the example illustrated in FIG. 1.
Figure 3:
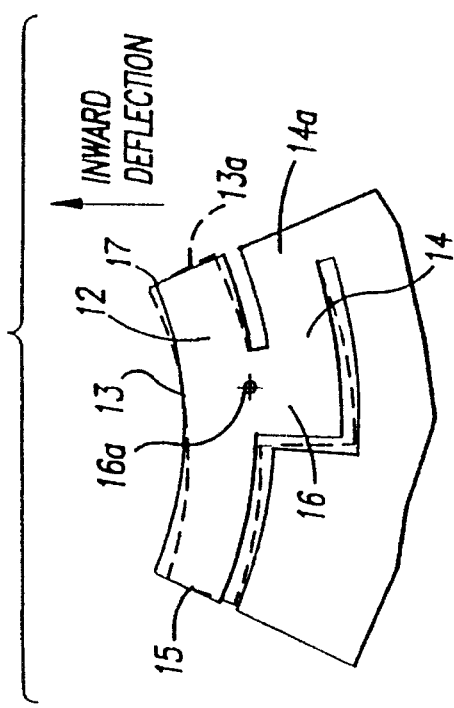
FIG. 3 is an edge view of the pad of FIG. 2 illustrating the pad orientation with the support structure in the loaded state.

Referring now to FIGS. 2, 2A and 3, the structure therein illustrated is a sector of a journal bearing assembly having grooves and slits formed therein so as to define a housing 10 and a plurality of circumferentially arranged bearing pads 12 each of which is supported by a support structure which includes the housing, a beam 14 and a stub section 126. The bearing is not symmetrical about the pad circumferential center line 13a (FIG. 3).

Accordingly, the bearing illustrated is a radial unidirectional bearing, i.e., it is adapted for radially supporting a shaft for rotation in only one direction. In the illustrated embodiment, the bearing supports the shaft 5 only for rotation in the counter-clockwise direction illustrated by the arrow. On the other hand, if the bearing were symmetrical about the center line of the pad would be capable of supporting the shaft 5 for either clockwise or counter clockwise rotation, i.e., the bearing would be bi-directional.

Each bearing pad 12 includes a leading edge 15 and a trailing edge 17. The leading edge is defined as the edge first approached by a point on the circumference of the shaft as it continues to rotate. Similarly, the trailing edge is defined as the edge approached circumferentially later by the same point on the shaft as it continues to rotate. When the shaft 5 is rotating in the proper direction, it moves, on a fluid film, from the leading edge across the bearing pad and off the trailing edge. Optimum performance is obtained when the stub-section 16 supports the bearing pad 12 and hence any load, at a point 16a (FIG. 3) between the circumferential center line 13a of the pad 12 and the trailing edge 17, preferably closer to the center line 13a. The beam 14 should also pivot about a point 14a which is located angularly between the leading edge and the trailing edge so that as a result of movement of the beam 14, the trailing edge 17 moves inwardly. Of course, the degree of movement depends on, among other things, the shape of the beam and the length of the cuts or slits formed in the bearing.

Although specific reference is made to either journal bearings or thrust bearings to facilitate an understanding of this invention, some of the same principles of bearing design apply regardless of the specific form of bearing being designed. For example, both types of bearings operate on the principle of formation of a hydrodynamic wedge. Further, the major axis of both Journal bearings and thrust bearings is the central axis of the cylindrical blank from which the bearing is formed. The circumferential pad center line is the radially extending line passing through the geometric center of the pad and the major axis of the bearing. Accordingly, if either a thrust bearing or a journal bearing is symmetrical about this center line axis, i.e., the major axis, the bearing will be bi-directional.

There are significant differences between thrust bearings and journal or radial bearings. The most prominent difference is, of course, the portion of the shaft supported and consequently the orientation and/or attitude of the bearing pad supports. For instance, while journal bearings support circumferential portions of shafts, thrust bearings support shoulder or axial end portions of shafts. Other differences follow from this fundamental difference. For example, in a radial or journal bearing, the pads in the direction of the load take or support the load; whereas, in a thrust bearing, all pads normally share load. Moreover, a journal bearing generally has a built-in wedge due to differences in the shaft and bearing diameters; conversely, there is no such built-in wedge in thrust bearings. Additionally, while a journal or radial bearing controls rotational stability as well as load; a thrust bearing typically only carries load. It should also be understood that the design of journal bearings, particularly hydrodynamic journal bearings, is significantly more complicated than the design of thrust bearings. In part, this is because of the constraints imposed by the need to limit the radial envelope of the journal bearings. In order to accommodate these differences the configuration of the thrust bearings is naturally somewhat different than that of journal bearings. Nevertheless, as is evident from this disclosure, many of the principles discussed herein are applicable to either thrust or journal bearings.

Referring now to FIGS. 2 and 3, it will be seen that the pad 12 is provided with an accurate face 13 which corresponds essentially to the radius or arc of the outer diameter of the shaft which the pad will be supporting (via the fluid film) and each pad is defined by axially extending and radially extending edges. The axially extending edges comprise the leading and trailing edges. The beam is shown both in a static position (solid lines) and in a deflected position (phantom lines) in FIG. 3. The basic construction of the support structure as illustrated in FIG. 1, is created by the use of small slits.or cuts through the wall. Typically these slits or radial cuts are between 0.002" to 0.125" wide. The degree of movement can be varied by varying, among other things, the length of the cuts. Longer cuts provide a longer moment arm which yields greater movement. Shorter cuts yield beams having less flexibility and higher load carrying ability. In selecting a length of cut or slit, care must be taken to avoid resonance.

Figure 9:
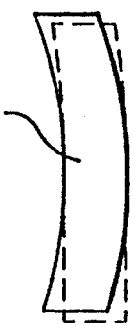
FIG. 9 is an edge view of the pad of FIG. 1 illustrating local movement of the pad surface without support structure movement, greatly exaggerated.
Figure 6:
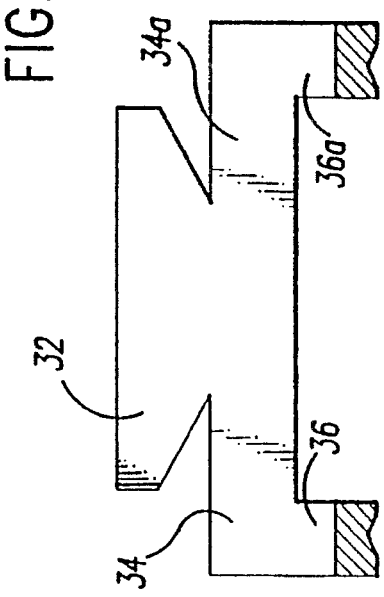
FIG. 6 is an end view of the bearing of FIG. 4.

By locating the end of beam 14 as shown, the movement downward about the connection point 16a will result in inward movement of the trailing edge 17 of the pad 12, outward movement of the leading edge 15 and a slight flattening of the pad 12 as seen in the dotted lines of FIG. 9. As a result of this movement, the gap between the pad face 13 and the outer surface of the shaft 5, through which fluid flows, becomes wedge shaped to yield the well-known hydrodynamic support effect.

Ideally the ratio of the spacing between the trailing edge and the shaft versus the spacing between the leading edge and shaft is between 1:2 to 1:5. In other words, the spacing between the leading edge and shaft should be between 2 to 5 times greater than the spacing between the trailing edge and the shaft. In order to attain this ideal spacing or wedge ratio for any specific application, appropriate movement variables including number, size, location, shape and material characteristics of the unitary element must be selected. A computer aided finite element analysis has proven to be the most efficacious means of optimizing these variables. Computer aided analysis is particularly useful in a bearing such as the type described above which permits movement in all six directions (six degrees of freedom).

The most important consideration in the performance of a hydrodynamic bearing is the shape of the space, typically a converging wedge, between the rotating shaft to be supported and the bearing pad surface. Since the shape of the shaft surface to be supported is basically invariable, it follows that the most important consideration in the design of hydrodynamic bearings is the shape of the pad surface under load. The shape of the pad surface under load principally depends upon two factors: the shape of the pad itself and the construction and location of the pad support structure. For purposes of this description, the various support structure designs will be discussed first followed by a discussion of various pad designs. It must be emphasized that the various support structures disclosed herein can be used with any of the pad shapes disclosed herein and the pad-shapes used herein can be used with any of the support structures disclosed herein.

Figure 4:
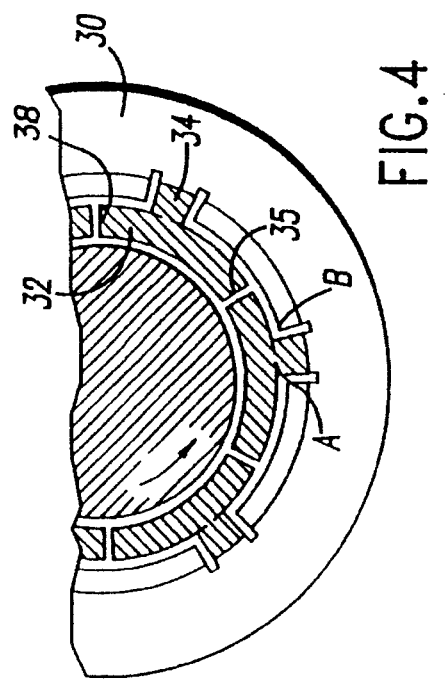
FIG. 4 is a sectional view of a sector of a second example of a journal bearing made in accordance with the present invention.
Figure 5:
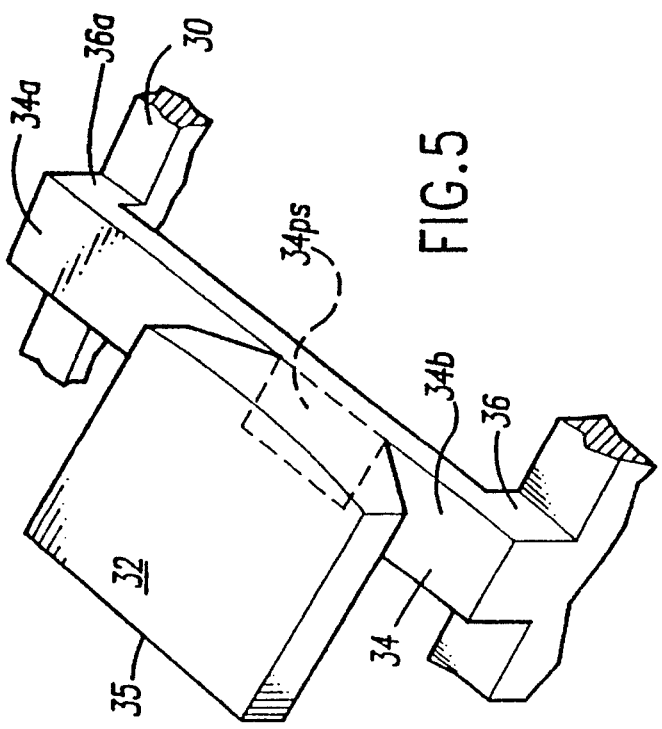
FIG. 5 is a view partly in section of a single pad of FIG. 4.

Referring to FIGS. 4 and 5, there is shown a second illustrative example of a bearing incorporating features of the present invention in which the bearing is formed with slits or cuts and grooves to define a bearing housing 30 with a bearing pad 32 that is supported from the housing by a support structure which includes a beam having a pair of beam portions 34a, 34b which extend substantially in a single line away from the pad. Moreover, the pad may be undercut so that it is supported by the beams only on a pad support surface 34ps. Referring to FIG. 5, it will be seen that the beams 34, 34a have a convenient stub beam end as is 36, 36a which acts as a cantilever support for the beam.

Figure 7:
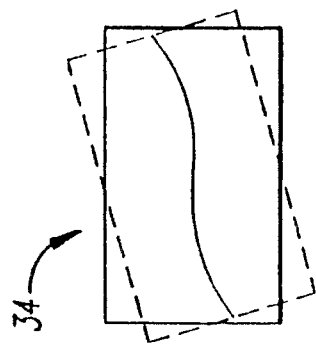
FIG. 7 is a diagrammatic view of the torsional movement of a beam, greatly enlarged.
Figure 5A:
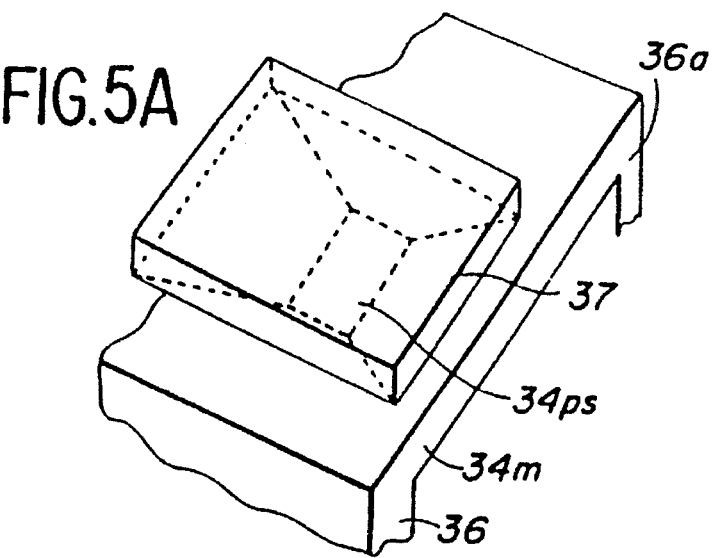
FIG. 5A is a perspective view of a section of a modified form of the bearing of FIG. 4.
Figure 5B:
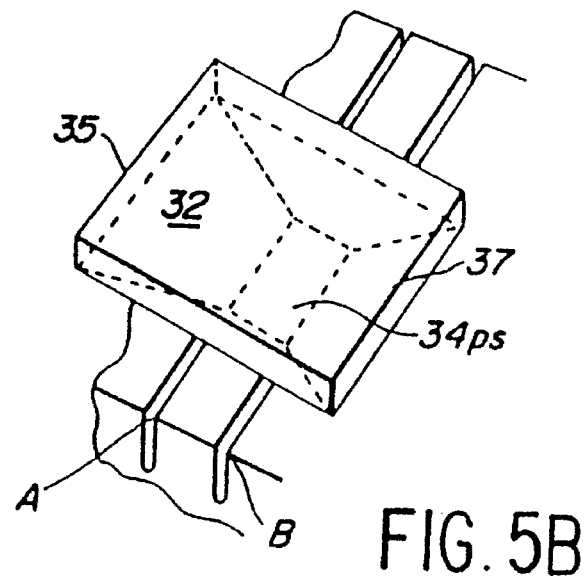
FIG. 5B is a perspective view of a modified form of the bearing shown in FIG. 4.

As is evident from FIG. 4, the perspective view of FIG. 5 shows only a portion of the pad 32. The complete pad is illustrated in FIGS. 5A and 5B which show possible modifications of the bearings illustrated in FIG. 4. As is clear from the drawings, the pad support surface 34ps is located closer to the trailing edge 37 than the leading edge 35. With this construction, twisting of the beam, as illustrated in FIG. 7, will take place intermediate the beam and create the torsional movement illustrated. Again the primary flexibility is developed by small cuts or slits through the bearing housing wall. These cuts provide the bearing pad with six degrees of freedom (i.e., the pad can translate in the +x,−x, +y,−y, +z and −z directions as well rotate about the x, y and z axes) and are designed to optimize hydrodynamic wedge formation. If the cuts or slits were terminated before breaking through to form beam portions 34a and 34b, the pad 32 would be supported by a continuous cylindrical membrane 34m as shown in FIG. 5A. The membrane acts as a fluid damper upon which the pad 32 is supported. The termination of the cuts would occur at Point A and Point B of FIG. 4. The flexibility of the membrane, combined with the fluid lubricant, provides a means to vary the damping action and to isolate the pad from the housing. The damping takes the form of a dash pot that exhibits high damping characteristics.

As shown in FIG. 5B, the beam may be defined more simply than shown in FIG. 5 by simply extending the cuts or slits downward from points A and B.

In such a case, the bearing is supported for simple flexural rotation, i.e., on a single radially extending beam. As noted earlier, such a construction is well suited for certain applications. It should be noted that with such a construction, the beam is slightly longer in the radial direction than it is wide, to ensure sufficient flexibility.

Figure 8:
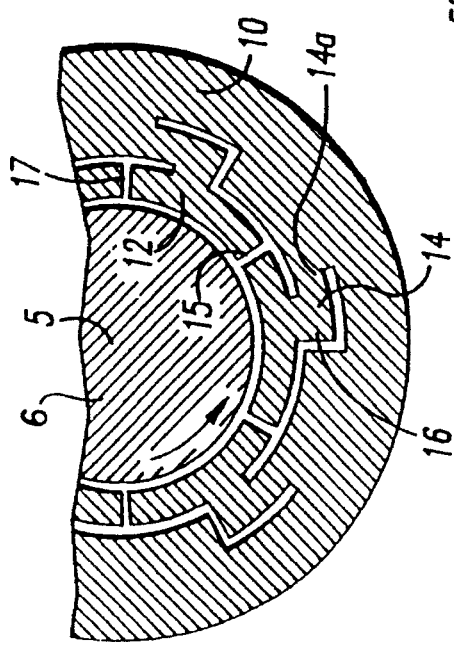
FIG. 8 is a sectional view of a journal bearing illustrating an example of a bearing incorporating the features of the preset invention which includes two beams.

Referring to FIG. 8, there is shown another illustrative example of a bearing incorporating features of the present invention. In this example, internal slits or cuts are provided to create a beam on beam support structure. Specifically, the bearing is formed with grooves and slits or cuts to define a pad 40 which is supported from a housing by beams 42 and 44. The pad is connected to the beams at support stubs 40a and 40b. Beam attachment to the housing is at support stubs 46 and 48. Again the bearing consists of the thin cuts or slits shown cut through the bearing wall. The cut or slit 60 below the pad surface introduces additional flexibility such that under load the pad changes shape to form an airfoil for the introduction of lubricant. Thus, as a result of the beam on beam two point support, the pad acts as a spring like membrane.

Figure 10:
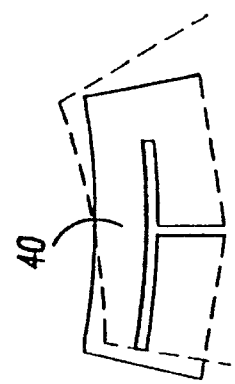
FIG. 10 is an edge view of the pad of FIG. 8 illustrating the pad orientation with the support structure in the loaded state.
Figure 10A:
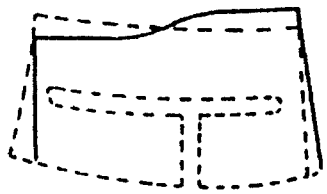
FIG. 10A is an edge view of the pad of FIG. 8 illustrating local movement of the pad surface greatly exaggerated.

FIG. 10A shows the deflected shape of the pad 40 under load. As shown in the drawings (exaggerated), the pad can be formed and supported so as to move to an airfoil shape under load. The airfoil dramatically improves performance. As is evident from the drawings, the pad is capable of displacement in the x, y, and z directions as well as rotation about the x, y, and z axes, that is, the pad has six degrees of freedom. Again, the structure allows optimal hydrodynamic wedge formation.

Referring to FIG. 9, there is shown the local inherent movement of the face pad 50 where the pad flattens under load. These movements are combined with the support structure movement shown in FIGS. 3 and 10 but are of a lower magnitude. The net result is the shape shown in FIGS. 3 and 10 but with a face curvature that has been minutely flattened.

FIGS. 31 and 31A illustrate another example of a journal bearing in accordance with the present invention. The bearing construction illustrated in FIGS. 31 and 31A differs from the previously described journal bearing constructions in that the bearing is bi-directional, i.e., the bearing is capable of supporting a shaft for either clockwise or counterclockwise rotation as viewed in FIG. 31. The bearing is bi-directional because the pads are symmetrical about their center line, which is defined as the radial extending line passing through the bearing major axis (606) and the geometric center of the pad. Like the previously described journal bearings, the bearing of FIGS. 31 and 31A is formed with a plurality of thin radial and circumferential slits to define a plurality of circumferentially spaced bearing pads 632.

The support structure for each of the bearings pads 632 is somewhat similar to the support structure for the journal bearing illustrated in FIG. 8. In particular, each bearing pad 632 is supported by a beam support structure at two pad support surfaces 632ps. The beam network connected to the bearing pads at each pad support surface 632ps is identical, yielding the symmetrical construction of the bearing which makes the bearing bi-directional. For purposes of simplifying this description, only the network of beams which supports the bearing at one pad support surface will be described since the other pad support surface is supported in an identical fashion. Thus, as shown in FIG. 31, a first, generally radially extending beam 640 is connected to the bearing pad 632 at the pad support surface 632ps. A second, generally circumferential beam 642 is connected to the radially outermost end of beam 640. A third, generally radial, beam 644 extends radially inward from the beam 642. A fourth, generally circumferential beam 646 extends from the radially innermost portion of the beam 644. A fifth, generally radial beam 648 extends radially outwardly from a beam 644 to the housing portion of the support structure. In summary, each bearing pad 632 and the bearing illustrated in FIG. 31 is supported by ten beams and the bearing housing. Further, as discussed below, by forming radially extending circumferentially spaced grooves or continuously extending circumferential grooves in the housing portion of the support structure, the housing portion of the support structure can be designed to act as a plurality of beams or membranes. It should also be noted that, like the bearing in FIG. 8, the cut or slit formed below the pad's surface introduces additional flexibility such that under load the pad changes shape to form an airfoil for the introduction of lubricant. Thus, as a result of the beam on beam two point support, the pad acts like a spring-like membrane.

FIG. 31A is a radial cross-section of FIG. 31 showing the third beam 644, the bearing pad 632 and the housing.

Figure 32B:
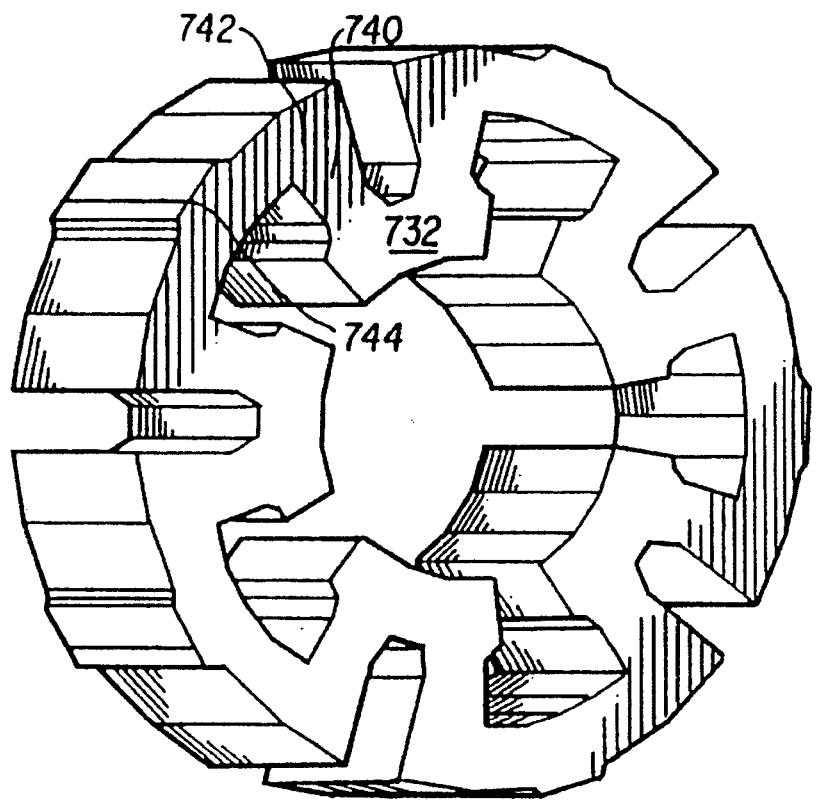
FIG. 32B is a perspective view of the bearing of FIG. 32.

FIGS. 32, 32A and 32B illustrate another journal bearing construction in accordance with the present invention. This bearing construction differs from the previously described bearing constructions in that the bearing pads and support structure are defined by relatively large grooves and openings formed in a cylindrical blank. Normally, this type of construction would be formed by milling the blank rather than electrical discharge machining or some other similar technique for farming small grooves as with the previously described embodiments. An advantage of the bearing construction illustrated in FIG. 32 is that in applications requiring extremely small bearings it is easier to form precisely the proportionately larger cuts and openings required to form a bearing of the type illustrated in FIGS. 32, 32A and 32B as compared to the proportionately smaller cuts and openings required by the construction of, for example, FIGS. 1, and 8. Moreover, the large grooves or openings are generally easier to mold or extrude bearings formed by larger cuts also find use in applications requiring extremely large bearings with stiff bearing pad support structures.

The bearing pads shown in FIG. 32 are symmetrical about their pad center line, 706A. Hence, the bearing is bi-directional. Moreover, as best shown in the perspective view of FIG. 32B, the bearing has a continuous cross-section with no hidden openings. Hence, it is easily extrudable and easily moldable. Naturally, the support structure can be altered by providing discontinuities in the cross-section, e.g., by providing radially extending circumferential grooves or non-symmetrically disposed radially extending openings to alter the support structure and thereby alter the performance characteristics. The bearing's major axis is 706.

As shown in FIG. 32, the bearing includes a plurality of circumferentially spaced bearing pads 732. Each bearing pad 732 is supported by a support structure which includes a pair of generally radial beams 740 connected to the bearing pad 732 at a pad support surface. A second, generally circumferentially extending beam 742 supports each of the beams 740. Beams 742 are connected to the housing or support stubs 744 in a cantilever type fashion. In this bearing, the beams 740 can be regarded as a primary support structure; the beams 742 can be regarded as a secondary support structure; and the beams 744 can be regarded as a tertiary support structure.

The second beams 742 shown in FIG. 32 are defined by forming a plurality of axially extending circumferential grooves 750 in the housing of the support structure. In order to maintain the symmetry of the bi-directional bearing, these grooves are circumferentially spaced about pad center lines 706A in a manner identical to the circumferential spacing of the bearing pads 732. Naturally, similar circumferentially spaced radial grooves could be provided in any of the previous bearing constructions. For instance, as noted above, such grooves could be formed in the periphery of the bearing construction illustrated in FIGS. 31 and 31A to provide a further beam-like support.

FIG. 32A is a radial cross-section of a portion of the bearing illustrated in FIG. 32. In this cross-section, the bearing pad 732 and first beam 740 are visible.

FIG. 32B is a perspective view of the bearing of FIG. 32. It should be noted that although the peripheral, circumferential and cylindrical portions of the bearing are depicted in a somewhat segmented fashion to emphasize the curvature, these curved surfaces are in fact continuously curved.

Figure 33:
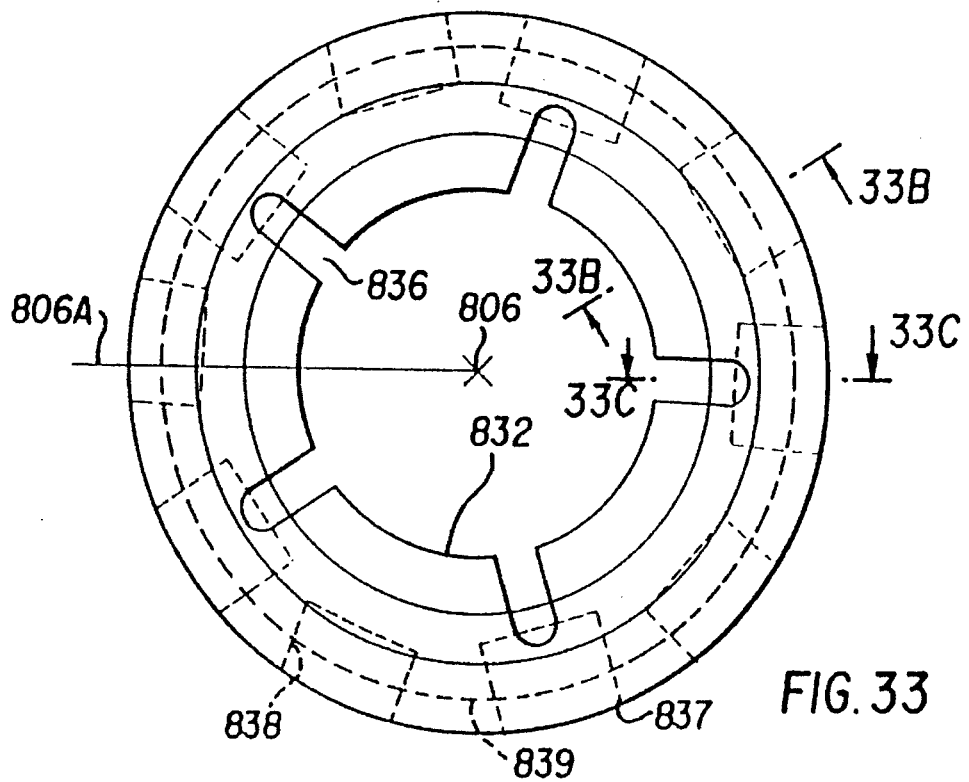
FIG. 33 is a side view of another journal bearing construction in accordance with the present invention.

FIG. 33 illustrates a journal bearing construction according to the present invention. Like the bearing of FIG. 32, the bearing of FIG. 33 is formed by proportionately large grooves and bores. In particular, a plurality of equally spaced radially extending circumferential grooves define a plurality of circumferentially spaced bearing pads 832. The bearing pads 032 are further defined by a pair of axially extending circumferential grooves which extend symmetrically from the planar faces of the cylindrical blank and are best seen in FIGS. 33B and 336 in which the grooves are indicated by the reference numerals 834 and 835. The bearing support structure is defined by the aforementioned structural features and by a plurality of circumferentially spaced symmetrically disposed shallow bores 838 and a plurality of circumferentially spaced symmetrically disposed deep bores 837. Because of the presence of the "hidden" bores 837, 838, the bearing construction of FIG. 33 is not extrudable and not moldable in a simple two-piece mold, i.e., not easily moldable.

Figure 33A:
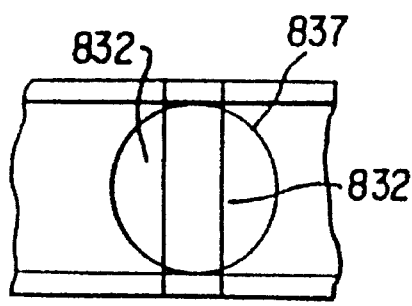
FIG. 33A is a detail of a portion of the outer periphery of the bearing of FIG. 33.
Figure 33B:
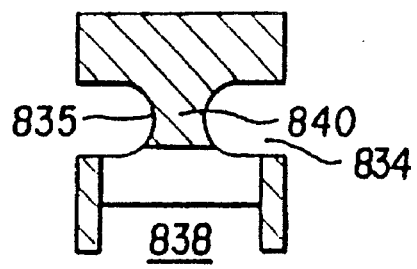
FIG. 33B is a cross-section of the bearing of FIG. 33.

As best shown in FIG. 33A, the deep bores 837 intersect the axial grooves 836 so as to define support structures for each bearing pad. The support structure is further defined by a circumferential groove 839 extending from the outer periphery of the cylindrical blank.

Figure 33C:
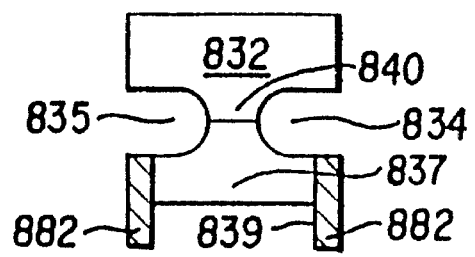
FIG. 33C is another cross section of the bearing of FIG. 33.

With reference to FIGS. 33—33c, it will be understood that the provision of the structural members as discussed above provide a support structure for the bearing pad 832, which includes a beam 840 directly supporting the pad, i.e. a primary support structure, two continuous beams 882, i.e. a tertiary support structure and a secondary support structure comprising a plurality of beams defined in part by bores 837 and 838 connecting the beam 840 to the continuous beams 882.

Because the support structure of the bearing illustrated in FIGS. 33-33C is non-symmetrical about the pad center line extending from the major axis 806, it is unidirectional. Further, like the bearing of FIG. 32, this bearing is particularly well suited to applications requiring extremely small bearings since the proportionately larger grooves and bores which define this bearing and its support structure are more easily manufactured.

Figure 34:
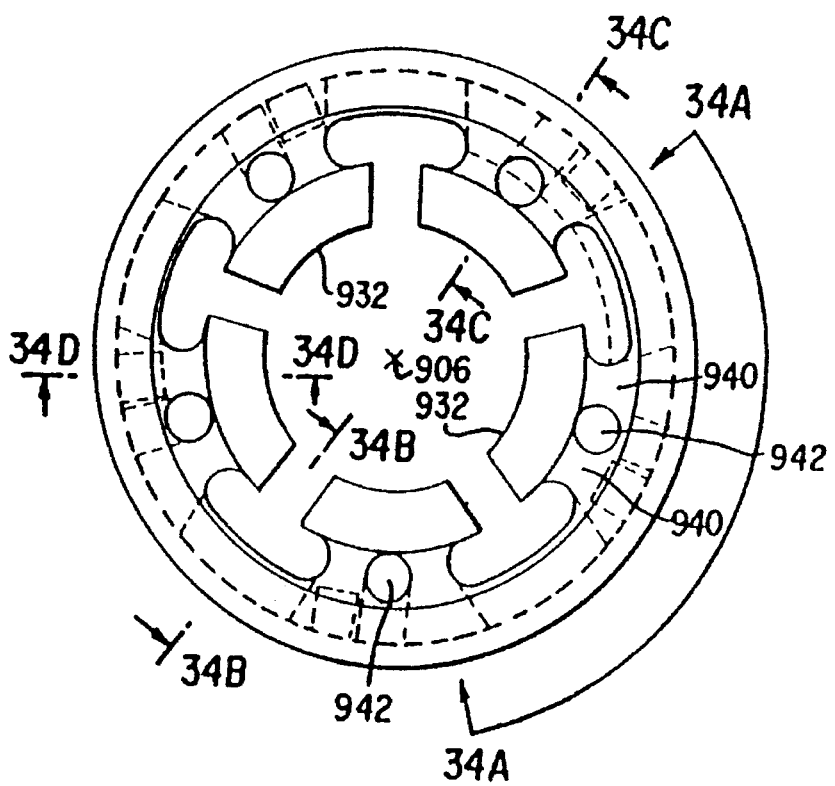
FIG. 34 is a side view of another journal bearing according to the present invention.
Figure 34A:
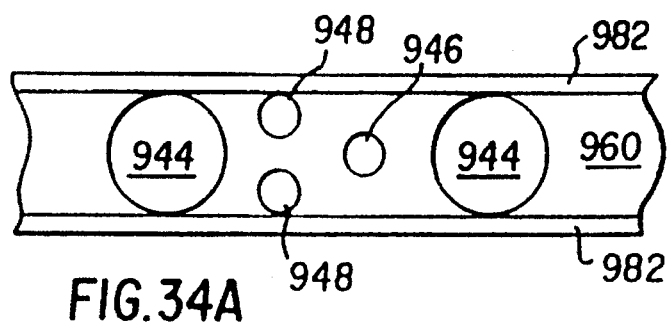
FIG. 34A is a detail of a portion of the outer periphery of the bearing of FIG. 34.
Figure 34B:
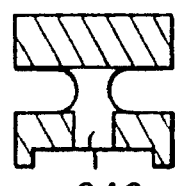
FIG. 34B is a cross-section of the bearing of FIG. 34.
Figure 34C:
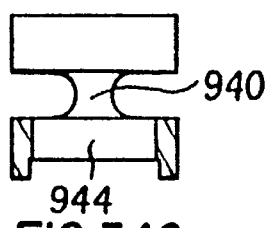
FIG. 34C is another cross-section of the bearing of FIG. 34.
Figure 34D:
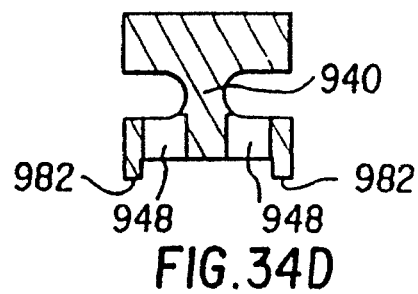
FIG. 34D is another cross-section of the bearing of FIG. 34.

FIGS. 34 and 34A–34D illustrate another journal bearing construction in accordance with the present invention. The bearing construction of FIG. 34 is similar to that of FIG. 33 insofar as the bearing pads and their support structures are defined by proportionately large grooves and bores as shown in the drawings. The support structure for the bearing pads 932 is like the support structure for the bearing pads 832. In particular, while the support structure for each of the bearing pads 932 is identical, the support structure is not symmetrical with respect to each bearing pad. Hence, the bearing illustrated in FIG. 34 is unidirectional. Moreover, because the support structure includes "hidden" openings, the bearing is neither extrudable or moldable in a simple two-piece mold.

As shown in the drawings, the bearing support structure includes a primary support structure comprising a pair of beam-like members 940 which are connected to the bearing pads 932 and defined in part by symmetrically disposed openings 942. A shallow circumferential groove formed on the outer periphery of the bearing defines a tertiary support structure comprising a pair of continuous beam-like elements 982. A secondary support structure comprising a beam and membrane network 960 for connecting the beams 940 to the continuous beams 982 is defined by the provision of a plurality of large symmetrically disposed bores 944, the provision of smaller symmetrically disposed bores 946 and the provision of small non-symmetrically disposed bores 948. By virtue of the provision of the non-symmetrically disposed bores 948, the support structure is more flexible, and thus biased, in the direction of those bores.

Figure 16:
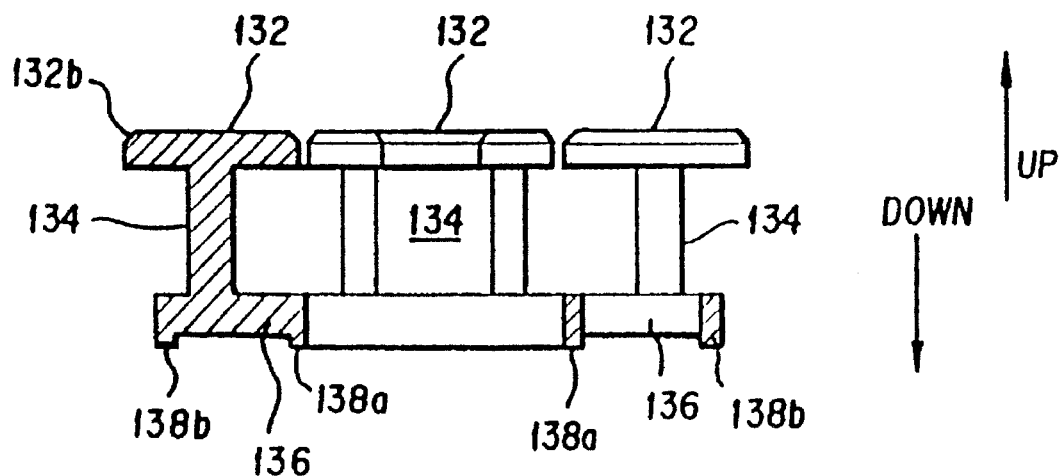
FIG. 16 is a side cross section of the thrust bearing of FIG. 15.
Figure 17:
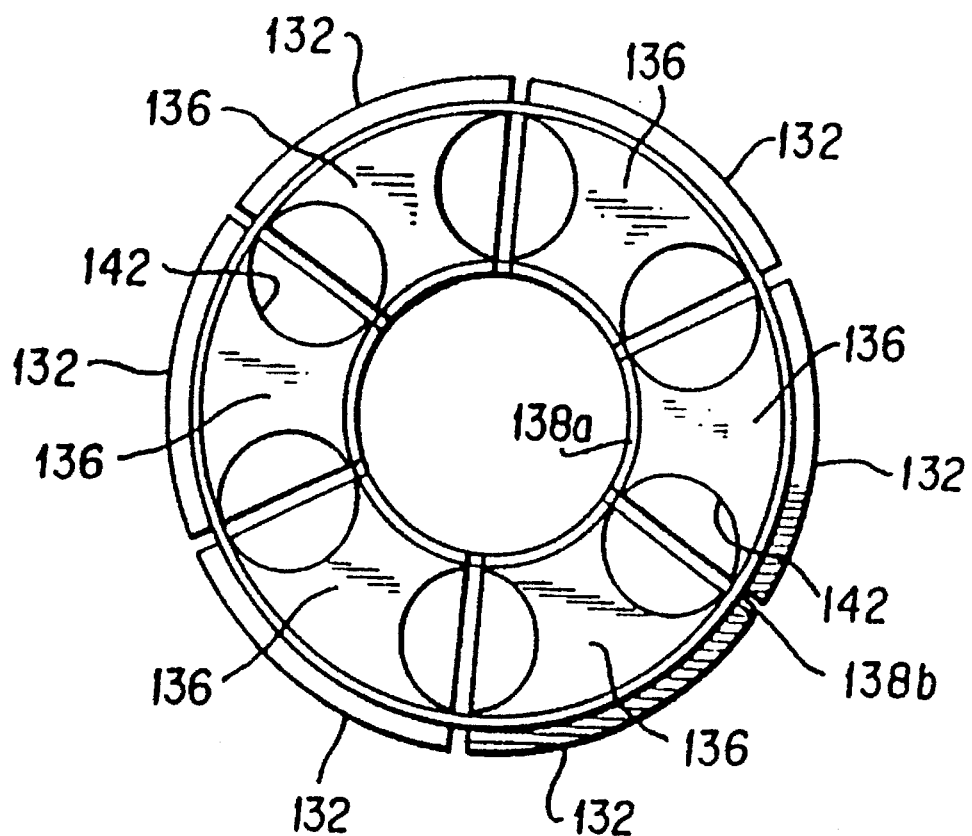
FIG. 17 is a bottom view of the thrust bearing of FIG. 15.
Figure 18:
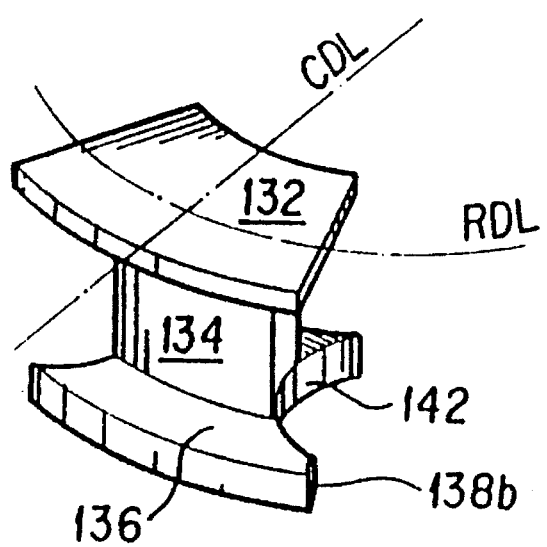
FIG. 18 is a perspective view of a portion of the thrust bearing of FIG. 15.
Figure 19:
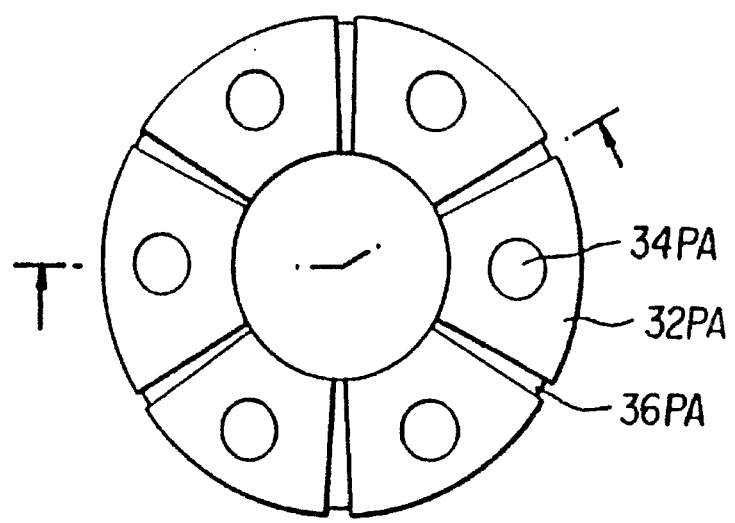
FIG. 19 is a top view of a prior art thrust bearing.
Figure 20:
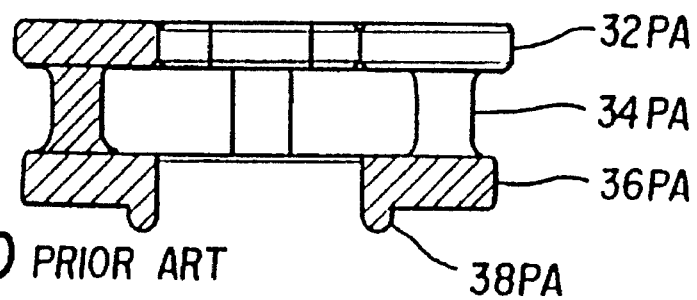
FIG. 20 is a cross-section of the prior art thrust bearing of FIG. 19.
Figure 20A:
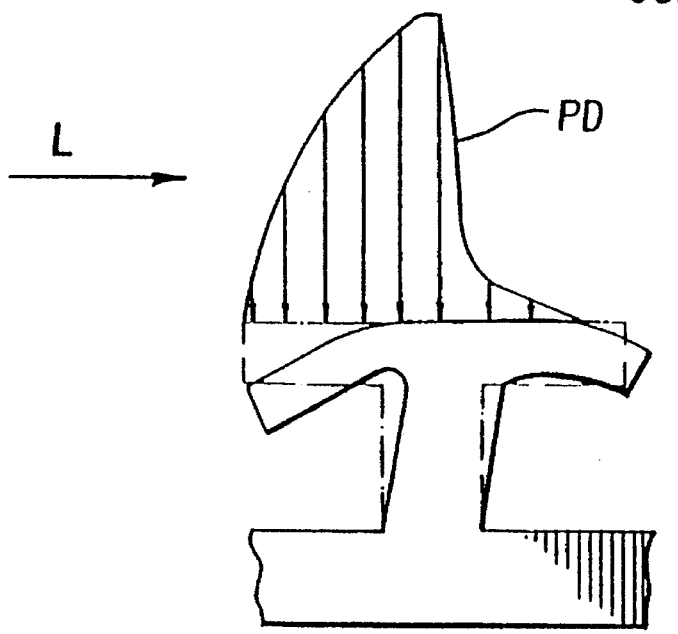
FIG. 20A is a schematic representation of a segment of the prior art thrust bearing of FIGS. 19 and 20 showing the pressure distribution across the surface of a bearing pad.

FIGS. 15–18 illustrate a unitary hydrodynamic thrust bearing in accordance with the present invention. As noted earlier, thrust bearings in accordance with the present invention incorporate some of the same features as journal bearings in accordance with the invention. For instance, like journal bearings, the thrust bearings of the present invention have a major axis defined as the central axis of the blank from which the bearing is formed. Also the bearing pads have a circumferential center line extending from the major axis through the geometric center of the pad. When the thrust bearing is symmetrical about its circumferential center line it is bi-directional; when the bearing is non-symmetrical about its circumferential center lines, it is unidirectional. However, by nature of their different function, the thrust bearings have a slightly different configuration. For example, the thrust bearing shown in FIGS. 15–18 includes a plurality of bearing pads 132 of substantially identical configuration. FIG. 18 shows the circumferential dividing line CDL and radial dividing line RDL of the bearing pad 132. The bearing pad surfaces of the bearing pads 132 lie in a plane which is essentially transverse to the axis of the shaft to be supported and the bearing's major axis. Of course, when the pad surfaces are moved under load, or if it is desired that the bearing be skewed slightly so as to contact the shaft in the installed or static state, the surface of the bearing pads may be somewhat non-planar and somewhat skewed with respect to the major axis or the axis of the shaft to be supported.

A particularly important consideration in the design of thrust bearings of the present invention is the prevention of fluid leakage. To a large extent, this objective is achieved by designing the support structures such that under load the inner edge of the bearing pads move downward (as viewed in FIG. 16) and the outer edge moves upwardly. All of the thrust bearings described herein are designed in this manner. For instance, in the bearing shown in FIG. 16, the beam 134 is connected to the pad 132 at a pad support surface 134ps which is closer to the outer edge of the bearing pad than it is to the inner edge of the bearing pad. Thus, the pad support surface 134ps is located radially outward of the radial dividing line RDL shown in FIG. 18. Hence, the bearing is designed such that, under load, the inner edge of the bearing moves downward.

In operation, the downward movement of the inner edge of the bearing pad corresponds to movement away from the shaft supported and the upward movement of the outer edge of the bearing pad corresponds to movement toward the shaft. The deflected orientation of the bearing pad significantly inhibits the loss of fluid which otherwise occurs as a result of centrifugal forces' action on the fluid.

Figure 29:
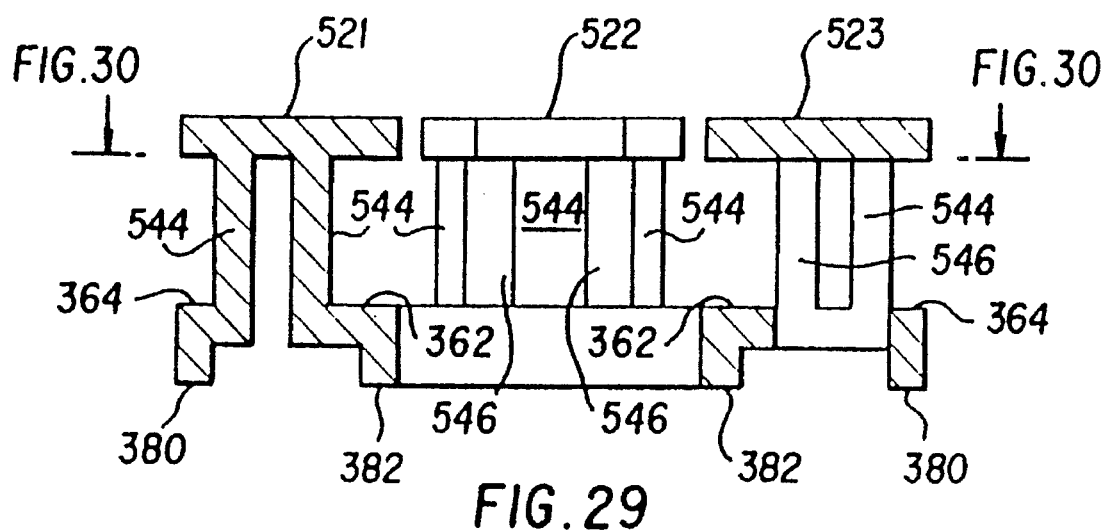
FIG. 29 is a side cross-section of another bearing construction according to the present invention.

The loss of hydrodynamic fluid can be further reduced by supporting the bearing pad such that under load, the bearing pad deforms to form a lubricant retaining pocket. Generally, such support is achieved when the bearing pad is supported by a plurality of radially or circumferentially spaced beams and the region between the beams is not directly supported such that the unsupported central region of the pad will tend to deform outwardly so as to form a fluid retaining channel. FIG. 29, which is discussed below, illustrates an example of a bearing having the requisite radially spaced beams therein. A greater pocket is obtained when the beams are spaced further apart. In a similar manner, a channel can be formed in a journal bearing by providing axially or circumferentially spaced beam supports and an unsupported region between the beams.

Figure 15:
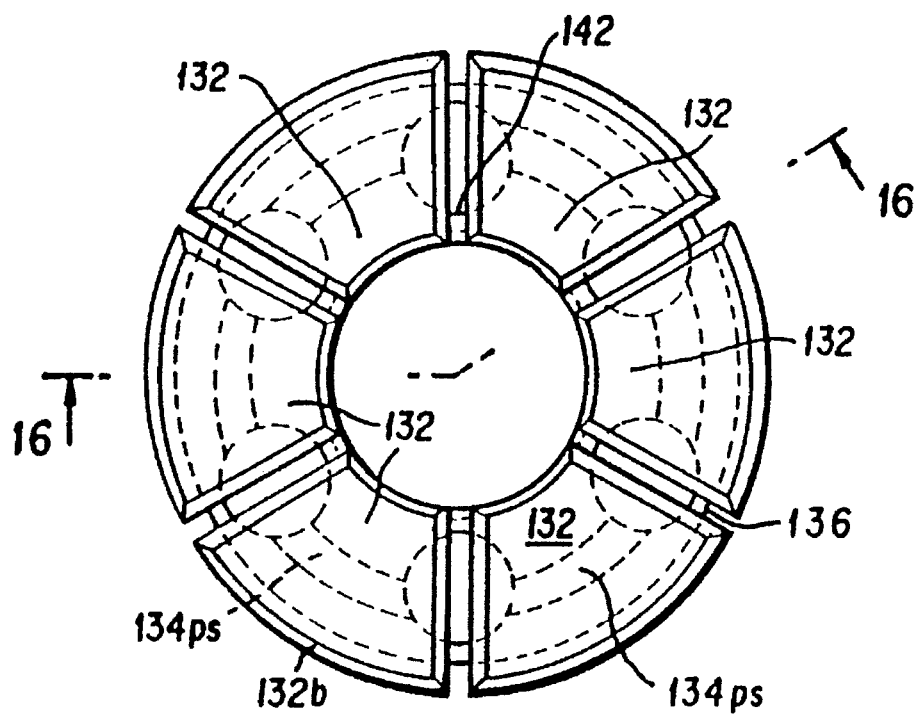
FIG. 15 is a top view of a thrust bearing having beam mounted bearing pads.

As best shown in FIGS. 15 and 16, each bearing pad has a chamfer or bevelled edge 132b around its entire periphery. The purpose of the chamfer is to reduce entrance and exit lubricant losses.

Each of the bearing pads 132 is supported by primary support portion, which in the illustrated embodiment comprise a beam-like support member 134 supporting the pad at a bearing pad support surface 134ps. Each beam 134 is in turn supported by a secondary support portion such as a beam supported beam or membrane 136. The beam or membrane 136 is in turn supported by a tertiary support member such as pair of beam-like legs 138a, 138b.

By providing holes or openings 142 in the beam or membrane portion 136, the continuous membrane 136 becomes a set of beams 136. Naturally, if holes or openings 142 are not provided in the membrane 136, the membrane functions as a continuous membrane. Alternatively, the inner beam-like leg 138a could be replaced with short stub-like beams or even eliminated to define a tertiary support such that the secondary support is supported in a cantilever fashion. Finally, because the holes and openings are symmetrically disposed with respect to the major axis the bearing is symmetrical about the major axis and is therefore bi-directional.

As shown in FIGS. 15, 17 and 18 the holes or openings 142 which divide the continuous membrane into separate beams are round. The use of round openings facilitates manufacture of the bearing prototype because circular openings can easily be drilled into the bearing material. This is true of all the bearings described herein. Once such circular openings are provided, it may also be advantageous to extend the openings past the beam or membrane member 136 to the lower portion of the bearing pads 132 so as to define the beam-like members 134. This is why in FIG. 15, the cross-section of the pad support surface 134ps and consequently the sidewalls of the beam 134 have an accurate appearance.

Although the shape of the beam members may be dictated by manufacturing convenience, the shape also effects the performance of the individual bearings. Thus, although the specific shape of the bearings described herein, including the thrust bearing shown in FIGS. 15–18, is primarily attributable to the ease of manufacturing a prototype, it also has been found to yield excellent results for a specific application. Any changes in the shape would, of course, influence the performance characteristics of the bearing by, for example, altering the bending or twisting characteristics of the beams which support the bearing pad. Thus, while other shapes of beams, pads and membranes are certainly contemplated, both the ease of manufacturing and the effect of the beam pad or membrane's shape on bearing performance must be considered.

Examples of other thrust bearing shapes are shown in an FIGS. 21–30 and 38–39. The difference between these bearings and the bearing construction shown in FIGS. 15–18 primarily resides in different constructions of the primary support portion, the secondary support portion and the tertiary support portion.

Figure 21:
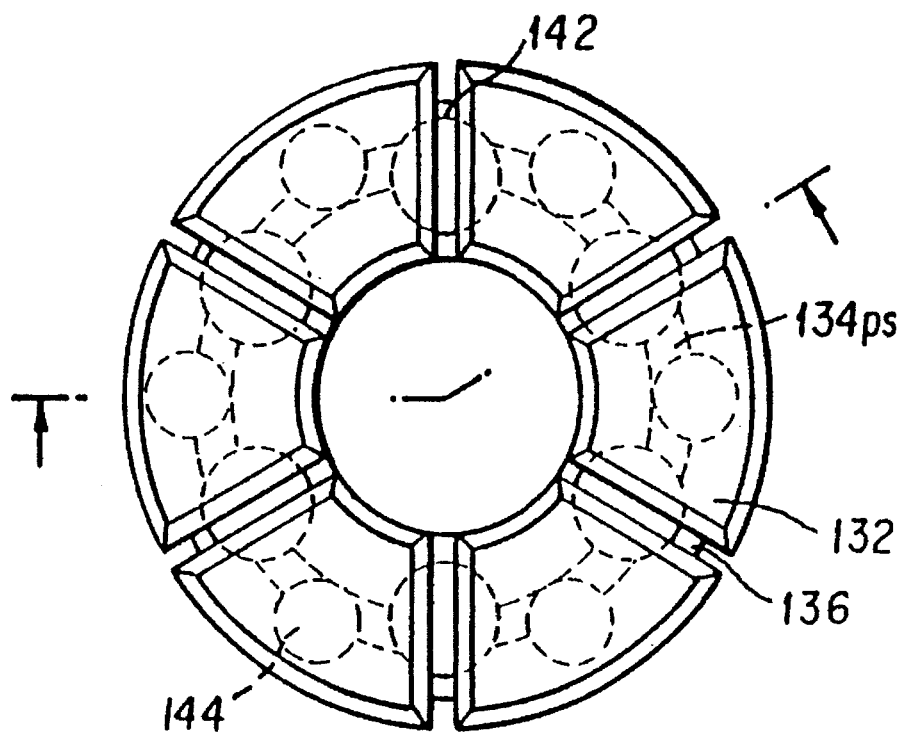
FIG. 21 is a top view of a thrust bearing according to the present invention having two legged support.
Figure 22:
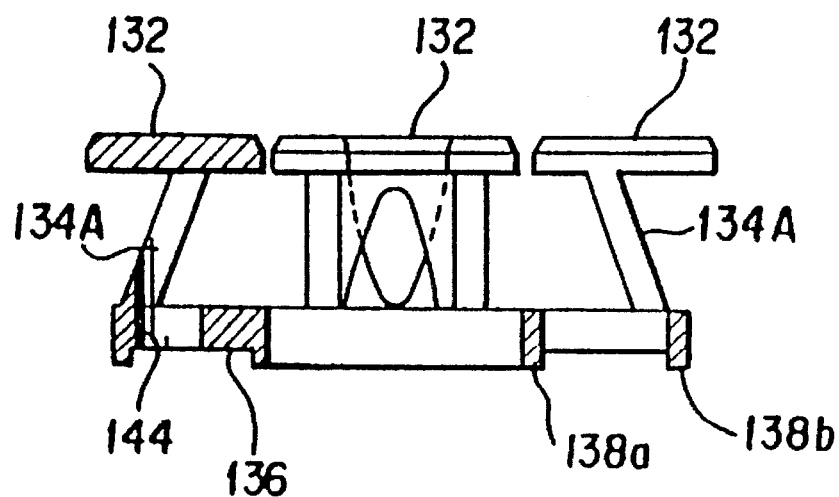
FIG. 22 is a side cross-section of the thrust bearing of FIG. 21.
Figure 23:
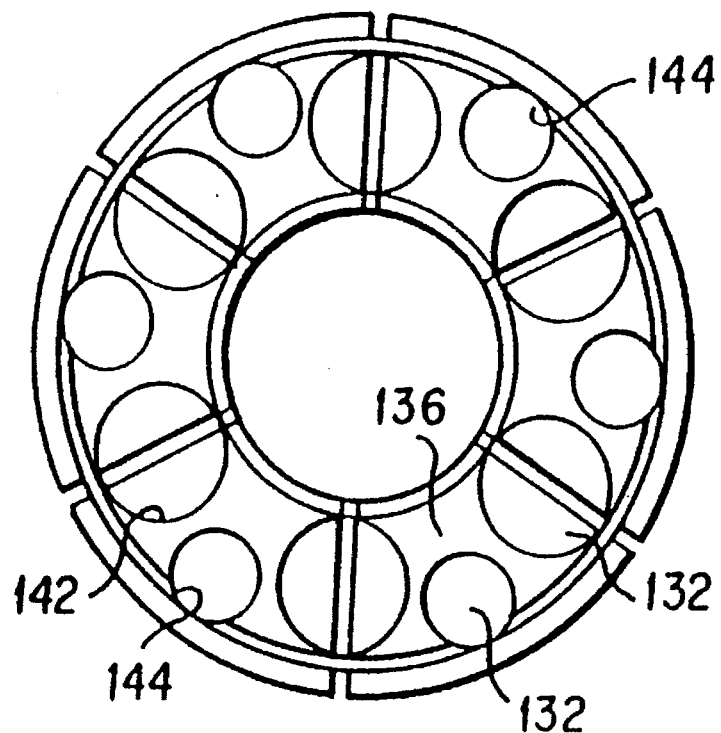
FIG. 23 is a bottom view of the bearing of FIG. 21.
Figure 24:
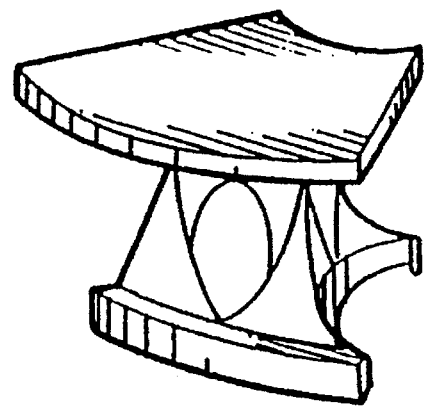
FIG. 24 is a perspective view of a segment of the bearing of FIG. 21.

One such other bearing shape is illustrated in FIGS. 21–24. A top view of the bearing is shown in FIG. 21; a cross-section of the bearing is shown in FIG. 22; a bottom view of the bearing is shown in FIG. 23 and a perspective view of the bearing is shown in FIG. 24. The bearing shown in FIGS. 21–24 is similar to the bearing of FIGS. 15–18 with two notable exceptions. First, the bearing of FIGS. 21–24 includes an angled or slanted support beam 134A rather than a vertical support beam as in FIG. 15. Second, the bearing includes additional holes 144 which extend through the support beam 136 to form a cylindrical opening through the slanted or angled beam 134 so as to form elliptical openings in the support beam. The elliptical openings divide the beam into a pair of complex ligaments, the shape of which can be appreciated with reference to the perspective view of FIG. 24. The provision of the openings 144 and consequent division of the slanted or angled beams 134A into complex ligaments significantly increases the flexibility of the support structure of the bearing shown in FIGS. 21–24 as compared to the bearings shown in FIGS. 15–18. Thus, the pads 132 of the bearing of FIGS. 21–24 move to form a hydrodynamic wedge in response to a lighter load than do the pads 132 of the bearing shown in FIGS. 15–18. It follows that the bearing shown in FIGS. 21–24 is better suited for supporting light loads and the bearing shown in FIGS. 15–18 is better suited for carrying heavier loads. Further, the provision of angled or slanted support beams such as beam 134A, with or without openings to divide the beam into complex ligaments, increases the flexibility of the pad in the vertical direction since a vertically applied load creates a moment which tends to cause the beam to move toward the center or inner diameter of the bearing and thereby eliminate centrifugal leakage of the lubricating fluid.

Figure 23A:
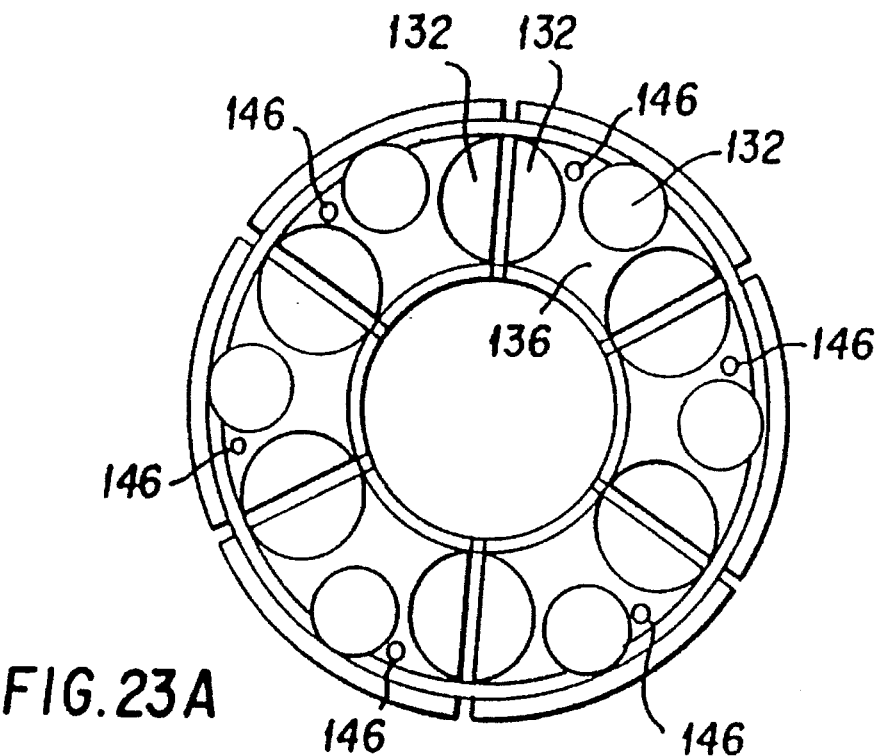
FIG. 23A is a bottom view of a modified version of the bearing of FIG. 21.

FIG. 23A shows a bottom view of a bearing of the type shown in FIGS. 21–24 in which additional holes 146 are formed in the membrane or support beam 136 to enhance the flexibility of the beam or membrane 136 even further. As illustrated in FIG. 23A, the holes 146 are formed nonsymmetrically with respect to each bearing segment. The provision of these holes in such a nonsymmetrical fashion results in a bearing in which the pads tend to move more easily in one direction than in the other direction. In other words, the bearing pads are biased in one direction by the provision of nonsymmetrical openings in the support structure. Naturally, such nonsymmetrically disposed openings can be provided in any of the bearing constructions of the present invention in which it is desired to bias the bearing pads in one direction. It may even be desirable to provide the nonsymmetrically disposed openings or holes such that only selected ones of the bearing pads are biased.

Figure 25:
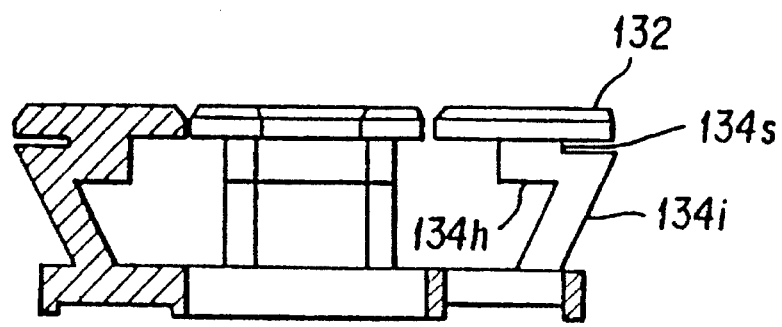
FIG. 25 is a cross-section of another bearing according to the present invention.

FIG. 25 is a cross-sectional view of another bearing according to the present invention. In accordance with this construction, the bearing pad 132 is supported on a pad support stub 134S which is in turn supported on a horizontally oriented beam portion 134H which is in turn supported on an inversely angled beam portion 134I. In other respects, the construction is similar to that of the previously described bearings. By virtue of this construction, the bearing has a great deal of flexibility in one direction but it is extremely rigid in the opposite direction.

Figure 26:
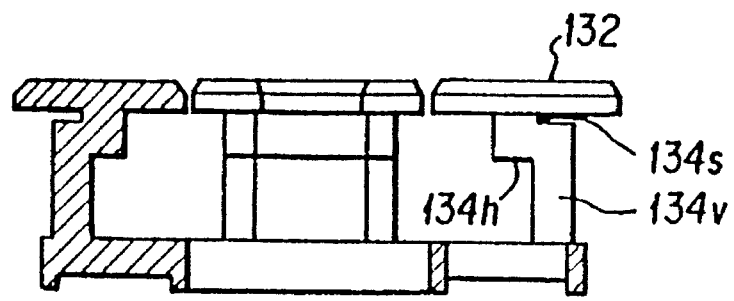
FIG. 26 is a cross-section of another bearing according to the present invention.

A similar construction is illustrated in FIG. 26. The difference between the bearing illustrated in FIG. 26 and the bearing illustrated in FIG. 25 is that the bearing illustrated in FIG. 26 uses a vertical beam portion 134V rather than an inversely angled beam portion 134I. The bearings are similar in all other respects. The absence of a angled beam in the bearing of FIG. 26 tends to give the bearing more rigidity in the vertical direction.

Figure 27:
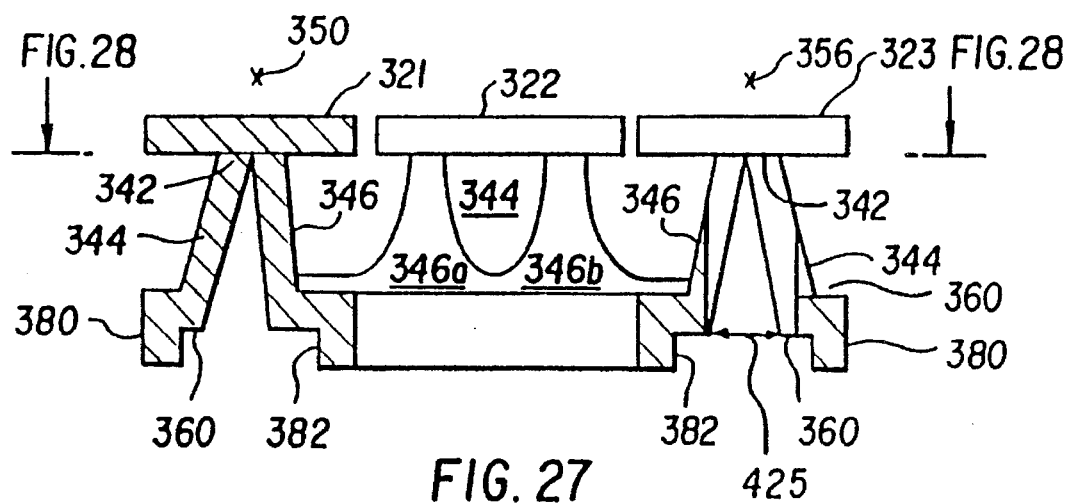
FIG. 27 is a side cross-section of another bearing construction according to the present invention.
Figure 28:
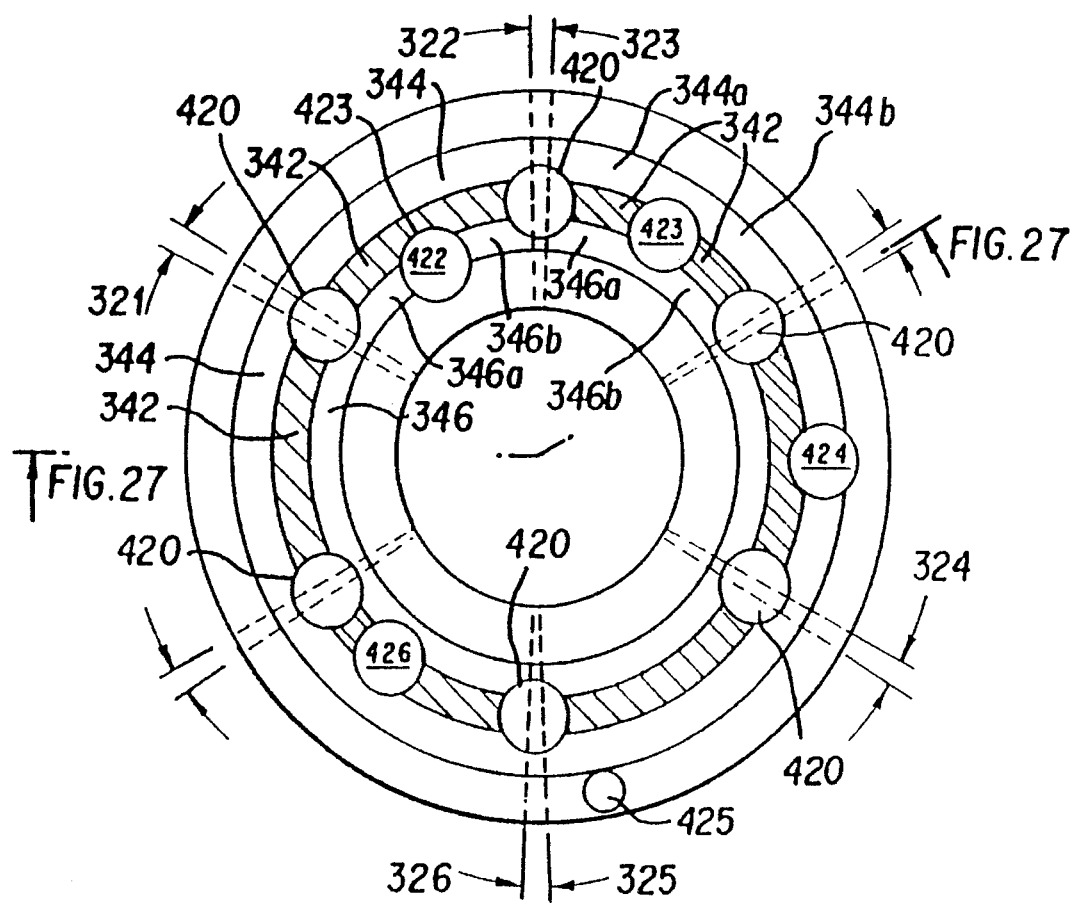
FIG. 28 is a top cross-section of the bearing construction of FIG. 27.

FIGS. 27–28 illustrate another embodiment of the bearing construction of the present invention.

As shown in the drawings, this bearing includes a plurality of bearing pads 321–326 (shown in phantom in FIG. 28). Each of the bearing pads 321–326 are supported on a pad support surface 342 of a bearing support structure. The bearing support structure includes a primary support portion composed of a pair of nested frustums supported on a secondary support portion which includes a split peripheral membrane 360 which is supported on a tertiary support portion which includes a pair of peripheral beams 382. The peripheral beams 380 and 382 are similar to those of the previously described constructions. The membrane 360 differs from the membrane in previously described constructions since the membrane 360 is radially split by the groove formed in the bottom of the bearing support structure which forms the nested frustums. The inner frustum is inverted with respect to the outer frustum such that the mean center lines of the frustums merge at a point 350 above the pad support surface 342 and have a cross-section which appears similar to an inverted V. Since the center lines of the frustums intersect at point 350 above the pad surface, the primary support structure supports the bearing pad for pivoting about a point above the pad surface. This ensures proper movement.

The beams 346 and 344 which support the bearing pad can be angled toward one another at the same angle, angled toward one another at different angles, one beam angled and one beam not angled, and angled in the same direction. Of course, variations in the degree of angling of the beams in the primary support structure impacts the movement characteristics of the bearing.

A plurality of holes or openings 420 disposed symmetrically about the bearing support structure divide the nested frustum or inverted V structure into a plurality of support beams 344, 346 and divide the apex of the nested frustums so as to define the pad support surfaces 342. Thus, for example, the bearing pad 321 is supported on a pad support surface 342 by a pair of complex support beams 344 and 346 which are tapered toward one another and have a complex geometrical configuration defined by the cylindrical extending openings passing through the nested frustum section. As best shown in FIG. 27, the center lines of the beams 344 and 346 intersect at a point 350 above the pad surface to ensure proper pivoting support. The individual beams 344 and 346 are supported on a peripheral membrane 360 which is split by the groove which defines the frustums. The membrane is supported by peripheral beams 380, 382. Naturally, as discussed above, the peripheral beams 380, 382 and the peripheral membrane 360 can be circumferentially split to define individual beam supports.

Numerous modifications to the bearing support structure are possible. For example, movement of the support structure can be modified by changing the angle of the beams, changing the location of the holes or openings which define the legs, varying the length of any of the beams or membranes, and changing the width or thickness of any of the beams or membranes. In order to illustrate a number of these possibilities, FIGS. 27 and 28 depict a different support structure for each of the bearing pads 321–326. It should be understood that these various support structures are shown in a single bearing for purposes of illustrating the present invention. In normal use, each of the bearing pads 321–326 would have a similar, though not necessarily identical, support structure to assure uniform performance.

The support structure for bearing pad 322 differs from that of bearing pad 321 by virtue of the provision of a hole or opening 422 which extends through the beam 346 so as to divide the beam 346 into a plurality of beams or sub-beams 346a and 346b. If, like the opening 422, the diameter and positioning of the opening is such that the beam is completely separated, the beam is divided into separate beams. On the other hand, if the opening only partially separates the beam (e.g. opening 423) the beam is divided into sub-beams. As shown in FIG. 27, the opening 422 forms an elliptical opening in the side of the beam 346 such that as viewed in FIG. 27, radially outer beam 344 is visible. By virtue of this construction, the pad 322 is supported by three angled ligaments or beams, 344, 346a and 346b.

Bearing pad 223 is supported by four angled beams or ligaments 344a, 344b, 346a and 346b. This structure is achieved by providing a hole or opening 423 which extends through both beam 344 and beam 346 and divides the pad support surface 342 into two sections.

It should be noted that with respect to all of the modifications discussed herein, the size of the openings should be selected based upon the degree to which the beams 344 and 346 are to be divided into separate beams. In some instances it may be desirable to completely separate the beam sections, in which case a larger opening would be used. In other instances, such as that illustrated with respect to the support of bearing pad 323, it is desirable to subdivide the beam at some point along the sidewall of the beam. It should also be noted that although the drawings only show the provision of one opening for bearing pad support structure to divide the beams 344 and 346 it is possible that two or more openings similar to that of the openings 422–426 shown in FIG. 28 could be provided so as to divide the beams 344, 346 into three or more beams or sub-beams. As always, a determination of the type of support to be employed depends on the desired performance characteristics. Generally, dividing the beams into separate beams or sub-beams makes the support structure more flexible. By making the support structure more flexible in one direction as with the support structure for bearing pads 322, 324 and 326, the bearing pads are biased in a predetermined direction.

The support structure for bearing pad 324 is similar to that for bearing pad 322 except that the opening 424 extends through the outer support beam 344 rather than the inner support beam 346. Thus, like the bearing pad 322, the bearing pad 324 is supported by three angled legs.

The support structure for bearing pad 325 is similar to that for bearing pad 321 except that an opening 425 is provided through the outer peripheral beam 380 and peripheral membrane 360 in a nonsymmetrical position. Thus, the bearing pad 325 is biased in a predetermined direction, i.e., the direction of greatest flexibility caused by the provision of the opening 425.

The support structure for the bearing pad 326 is similar to that of bearing pad 322 except that the opening 426 which divides the beam 346 is provided in a nonsymmetrical fashion so as to bias a bearing pad 326 in the direction of greater flexibility, i.e., the direction of the smaller, more flexible beam.

Naturally, any combination of the support structures illustrated in FIGS. 27, 28 could be employed to achieve desired performance characteristics.

Figure 30:
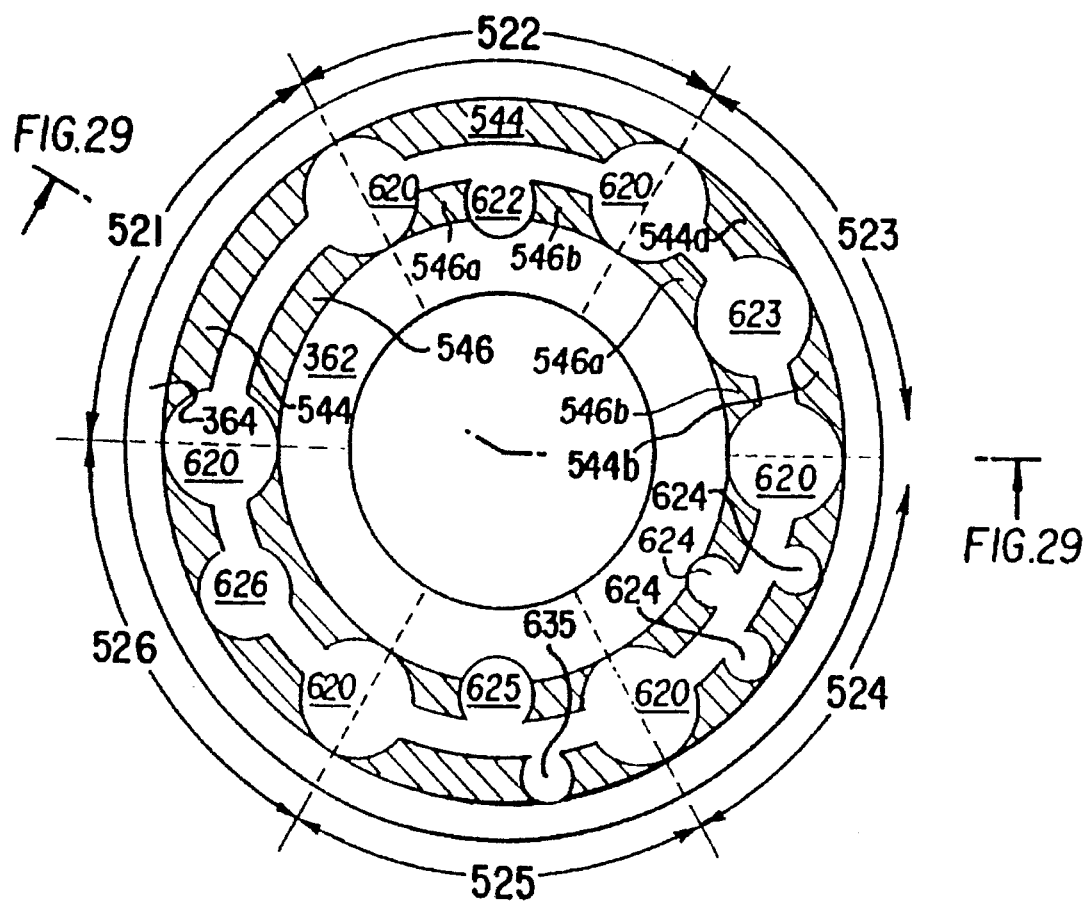
FIG. 30 is a top cross-section of the bearing construction of FIG. 29.

FIGS. 29–30 illustrate another embodiment of the bearing of the present invention. As shown in the drawings, this bearing includes a plurality of bearing pads 521–526 (location shown in phantom in FIG. 30). Each of the bearing pads 521–526 are unitary with, and supported on, a bearing pad support structure. Generally, the bearing pad support structure includes at least a primary support structure including an inner circumferential support beam 546 and an outer circumferential support beam 544; a secondary support portion including an inner peripheral membrane 362; and a tertiary support portion including an outer peripheral membrane 364 and an inner peripheral support beam 382 and an outer peripheral support beam 380. As best shown in FIG. 29, the circumferential support beams 544, 546 are defined in part by a deep circumferential channel extending from the bottom of the bearing to the bearing pad. The support beams are further defined by a plurality of holes or openings 620 disposed symmetrically about the bearing pad support structure which separate the beams 544, 546 from adjacent beams. Thus, for example, the bearing pad 521 is supported on a pair of beams 544 and 546, which beams have generally accurate side walls. As mentioned earlier, the beam support structure also includes membranes 364, 362 and peripheral beams 380, 382.

Numerous modifications to the bearing support structure are possible. In order to illustrate a number of these possibilities, FIGS. 29 and 30 depict a different support structure for each of the bearing pads 521–526. As with the previously described embodiment of FIGS. 27–28, these various support structures are shown in a single bearing for the purpose of illustrating the present invention. In normal use, each of bearing pads 521–526 would have a similar, though not necessarily identical, support structure to assure uniform performance.

The support structure for bearing pad 522 differs from that of bearing pad 521 by virtue of the provision of a hole or opening 622 which extends through the inner circumferential beam 546 so as to divide the beam 546 into a plurality of beams 546a and 546b. By virtue of this construction, the pad 522 is supported by three vertically extending beams or ligaments 544, 546a and 546b.

The bearing pad 523 is supported by four vertically extending beams or ligaments 544a, 544b, 546a and 546b. This structure is achieved by providing a hole or opening 623 which extends through both beam 544 and beam 546. The thinner beams which result from this modification would naturally have greater flexibility than the support structure for bearing pads 522 and 521.

The bearing pad 524 is supported by five, relatively thin vertically extending beams or ligaments. This structure is achieved by providing a hole or opening 624 to divide the inner beam 546 into two beams and providing two holes 624 to divide the outer beam 544 into three beams.

The support structure for bearing pad 525 is similar to that for bearing pad 522 except that an additional opening 635 non-symmetrically divides the outer beam 544 into two beams. By virtue of the non-symmetrical division of the outer beam 544, the bearing pad is biased in the direction of greater flexibility.

The support structure for bearing pad 526 is similar to that for bearing pad 522 except that the outer beam 544 is split rather than the inner beam 546. Further, the opening 626 is somewhat larger than the opening 622 such that a groove is formed on the outer periphery of the inner beam 546 so as to make the inner beam 546 somewhat more flexible.

Naturally, any combination of the support structures illustrated in FIGS. 29, 30 could be employed to achieve desired performance characteristics.

FIGS. 29A, 29B, 30A and 30B illustrate in detail a thrust bearing in which each of the bearing pads 521A of the support structure are very similar to that used to support bearing pad 521 in FIGS. 29 and 30. The bearing construction is different, however, insofar as the beams 544A and 546A are circumferentially narrower and vertically shorter than their counterparts in the bearing illustrated in FIGS. 29 and 30. Naturally, shorter beams are more rigid than the comparatively longer beams and narrow beams are less rigid than comparatively wider beams. Moreover, the beam 544A is radially narrower than the beam 546A; whereas in the bearing illustrated in FIGS. 29 and 30, the beams 544 and 546 have equal widths. The difference in radial thickness is compensated for since the large opening 620, which defines the circumferential extent of the beams 544A and 546A, is arranged such that beam 544A is significantly wider in the circumferential direction than is beam 546A. Finally, it should be noted that the openings 620 are significantly larger than the corresponding openings 620 in the bearing construction of FIGS. 29 and 30. Naturally, the larger openings increase the flexibility of the support structure defined thereby.

Figure 35:
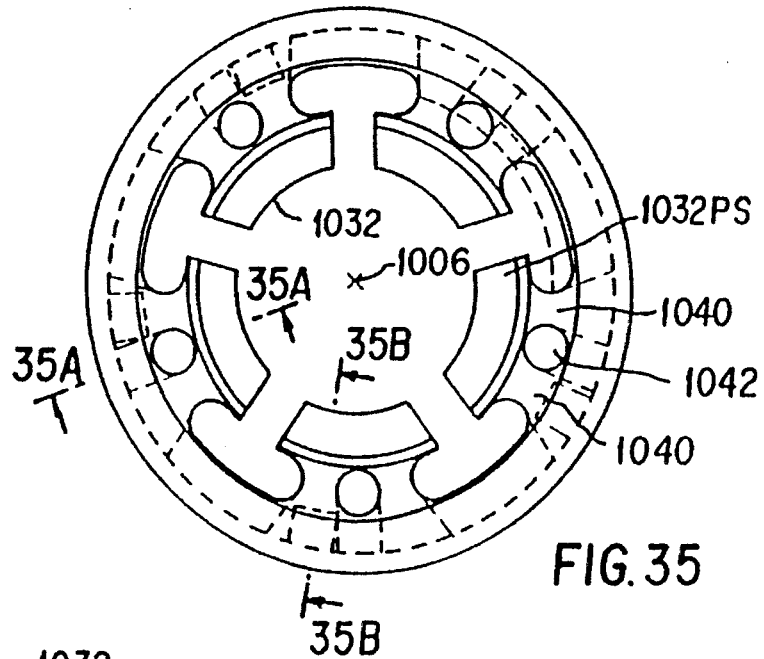
FIG. 35 is a side view of a combined radial and thrust bearing according to the present invention.
Figure 35A:
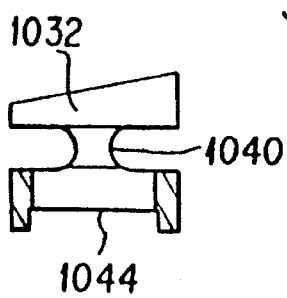
FIG. 35A is a cross-section of the bearing of FIG. 35.
Figure 35B:
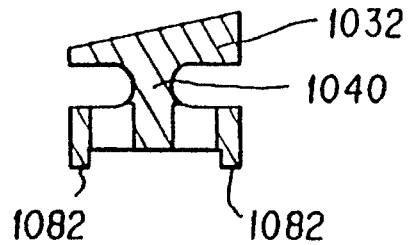
FIG. 35B is another cross-section of the bearing of FIG. 35.
Figure 36:
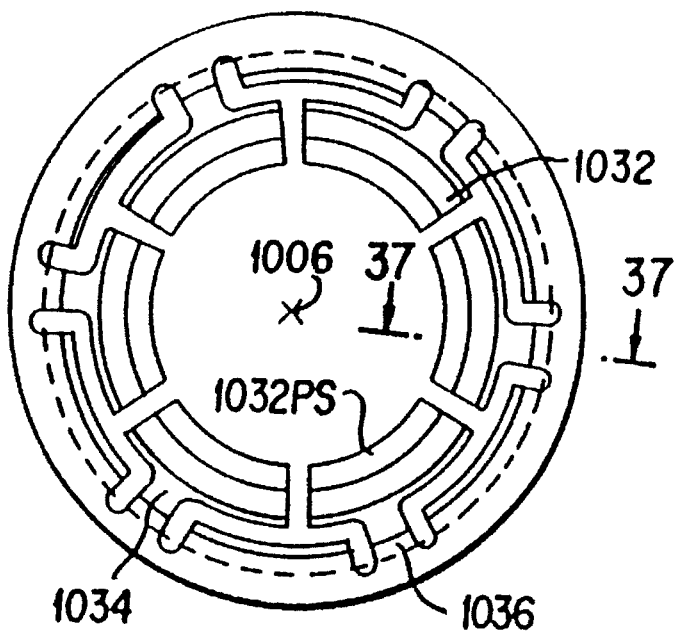
FIG. 36 is a side view of another combined radial and thrust bearing according to the present invention.
Figure 37:
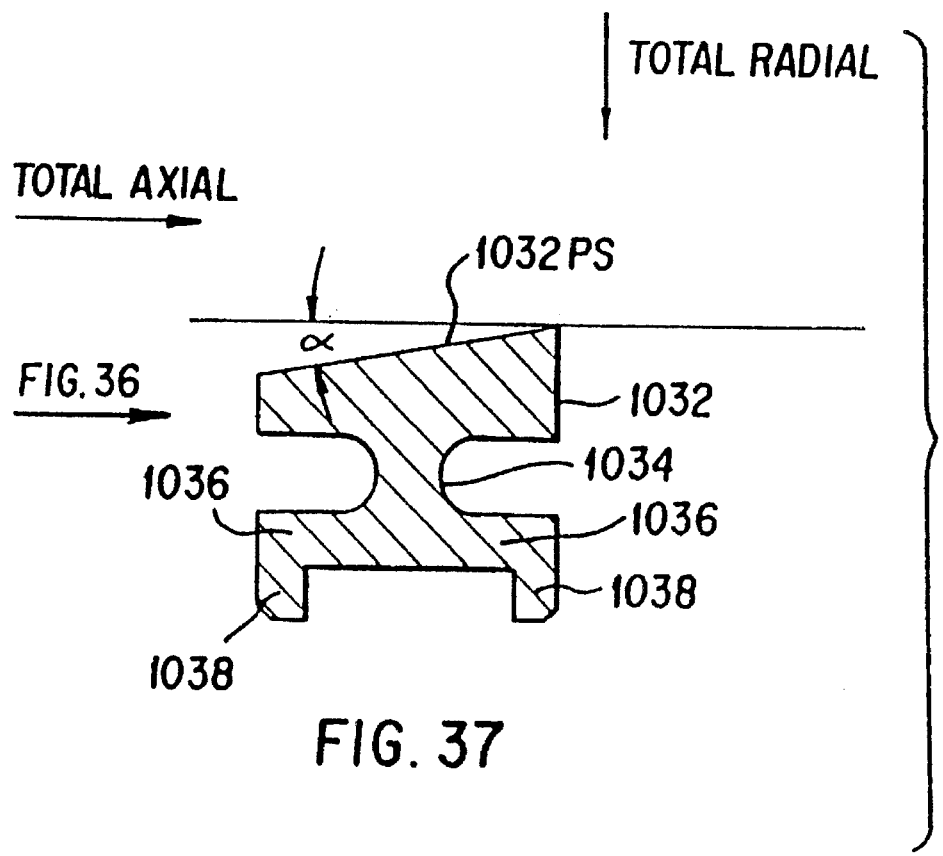
FIG. 37 is a diagrammatic cross-section of the bearing of FIG. 36 illustrating the forces acting on the bearing pad.

FIGS. 35–37 illustrates a combined thrust and radial hydrodynamic bearing in accordance with the present invention. The bearing illustrated in FIG. 35 is quite similar to the bearing illustrated in FIG. 34 and similar numerals are used to designate similar structure. Similarly, as viewed in the cross-section in FIG. 37, the bearing of FIGS. 36–37 is somewhat similar to the radial bearings illustrated in FIGS. 4 and 14D except that the bearing pad 1032 and the bearing pad support structure, which includes beams and/or membranes 1034, 1036 and 1038, are defined by proportionately larger slits and grooves. However, the radial-thrust bearings differ from radial-only bearings in that the bearing pad surface 1032ps is angled with respect to the major axis 1006.

By virtue of its angled pad surface, the bearings of FIGS. 35–37 support loads acting both along the major axis 1006 and radially from the axis 1006.

In order to be supported by the angled pad support face 1032ps, the shaft must be fitted with a runner which is angled at an angle complementary to the angle of the pad support face. The portion of the axial load taken by the bearing and the portion of the radial load taken by the bearing depends on the angle of the pad surface 1032ps. If the pad is angled at an angle e with respect to the major axis 1006, the axial load applied to the bearing can be determined by the following equation:

$$\text{Applied Axial Load} = \text{Total Axial Load} (\sin \alpha).$$

Similarly, the radial load applied to the bearing can be determined by the following equation:

$$\text{Applied Radial Load} = \text{Total Radial Load} (\cos \alpha).$$

The support structure for the bearing shown in FIG. 35 is similar to the support structure for the bearing shown in FIG. 34.

The support structure for the bearing illustrated in FIGS. 36 and 37 includes a primary support structure for the spaced bearing pads 1032 having a beam 1034 which supports the bearing pad 1032, a tertiary support structure which comprises a pair of circumferential beams 1038 which may be continuous. The secondary support structure comprises a membrane 1036 or a network of beams 1036 for connecting beam 1034 to the beams 1038. As shown most clearly in FIG. 36, the support structure for each of the plurality of bearing pads 1032 is nonsymmetrical. Accordingly, the bearing illustrated in FIGS. 36 and 37 is unidirectional.

Generally, any of the general bearing constructions described in this application can be employed in the design of combined radial-thrust bearings of the type illustrated in FIGS. 36 and 37. Of course in order to achieve the combined radial and thrust bearing characteristic, the bearing pad surface must be angled at an angle between 0 and 90 degrees with respect to the major axis. Moreover, the need to accommodate both radial and axial loads necessarily will impact the design of the bearing pad support structure.

In the past, the pad shape of hydrodynamic bearings has been primarily dictated by manufacturing convenience. For a thrust bearing, this has traditionally meant sector shaped pads to maximize the area of support or—in the case of applicant's prior U.S. Pat. No. 4,676,668—circular pads for low cost manufacture. For radial bearings, pads having a simple cylindrical section shape have been used. In many cases, such conventional pad shapes can be supported to obtain optimum results. However, the present inventor has discovered that important performance characteristics can be achieved by modifying conventional pad shapes. Consequently, the support structure can be simplified, and in some cases, even eliminated.

Figure 42A:
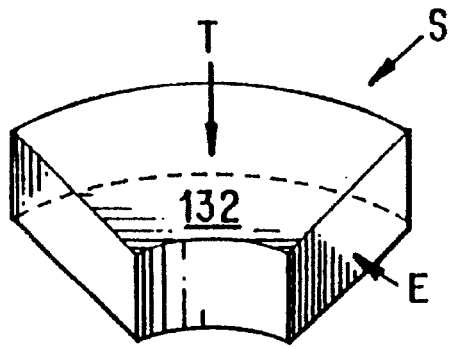
FIG. 42A is a perspective view of a sector shaped thrust pad with arrows indicating the side lines for the top side and edge views.
Figure 42B:
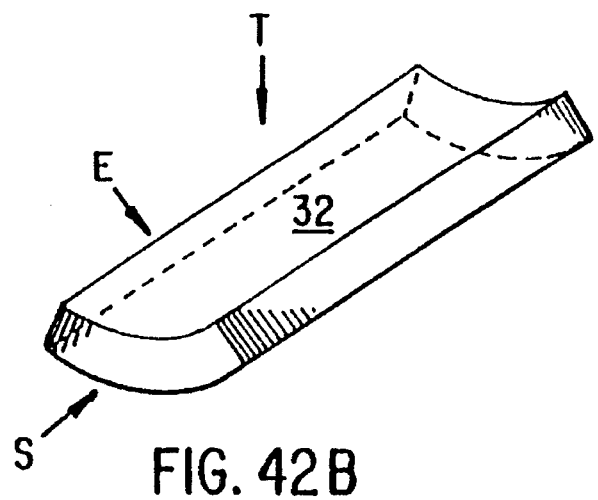
FIG. 42B is a perspective view of a journal bearing pad with arrows indicating the side lines for a top edge and side view.
Figure 42C:
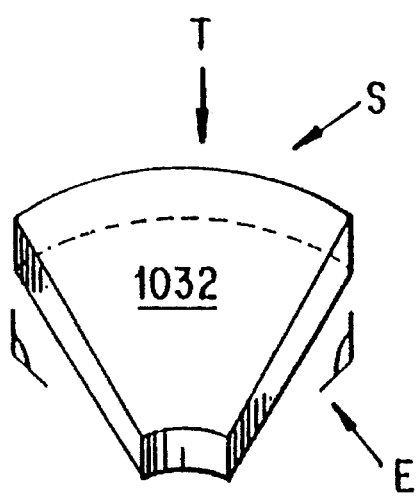
FIG. 42C is a perspective view of a combined radial/thrust bearing pad with arrows indicating the side lines for a top, side and edge view.
Figure 42D:
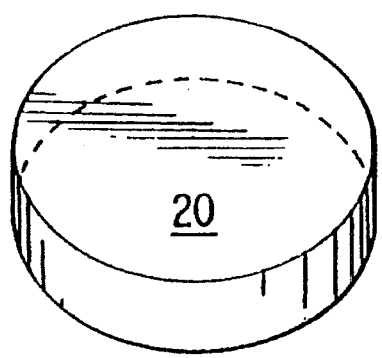
FIG. 42D is a perspective view of a circular thrust pad.

Examples of typical thrust pad shapes are illustrated in FIGS. 42A and 42D. FIG. 42A shows a sector shaped pad 132. The sight lines for a top view T, an edge view E and a side view S are indicated by arrows labeled T, E and S, respectively. FIG. 42D shows a circular pad 20. An example of a typical radial bearing pad is shown in FIG. 42B. Again, the arrows indicate the sight lines for the top view T, edge view E and side view S, as discussed below. Finally, one form of combined radial/thrust pad 1032 is shown in FIG. 42C. The arrows indicate the sight lines for the top view T, edge view E and side view S discussed below. These pad shapes are all characterized by uninterrupted planar surfaces and a uniform pad thickness.

Various modifications to traditional thrust, radial and combined radial/thrust pad shapes will be discussed hereinafter. It should be kept in mind that any of these modifications to the shape of the pad may be used in combination or alone. Also, the modifications can be easily adapted to pads having shapes other than the specific pad shapes illustrated. Moreover, the pads may be symmetrically shaped to allow bidirectional operation or non-symmetrical to provide different operating conditions depending on the direction of rotation. The modified pad shapes discussed hereinafter may be used in combination with any support structures including those described in this application where appropriate or, when used in the proper combination, may eliminate the need for a moving support structure altogether.

Figure 43A:
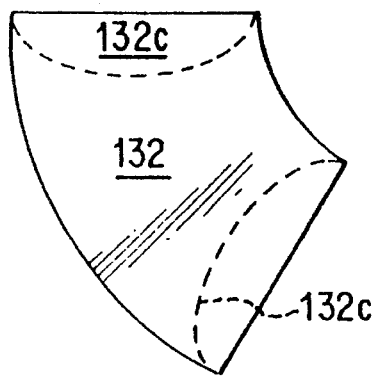
FIG. 43A is a top view of a thrust pad provided with radius cuts on both edges.
Figure 43B:
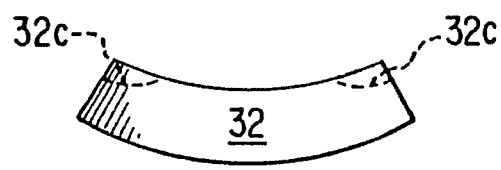
FIG. 43B is a side view of a journal bearing pad with radius cuts formed on both edges.
Figure 43C:
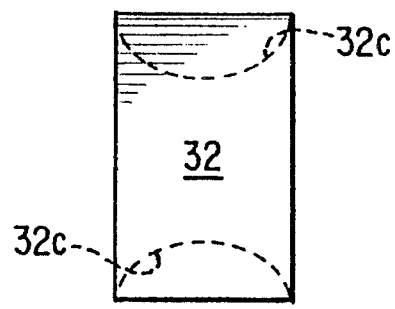
FIG. 43C is a top view of the journal bearing pad of FIG. 43B.
Figure 43D:
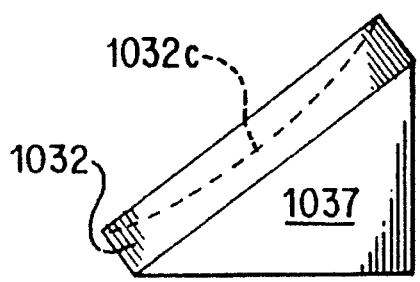
FIG. 43D is an edge view of a combined radial/thrust bearing pad having radius cuts formed on both edges thereof.
Figure 43E:
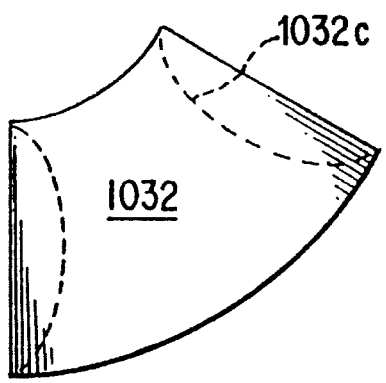
FIG. 43E is a top view of the combined radial/thrust bearing pad of FIG. 43D.

The first possible modification to the general pad shape is shown in FIGS. 43A–E. These figures illustrate the modification as applied to thrust bearing (FIG. 43A), a radial bearing (FIGS. 43B–C) and a combined radial/thrust bearing (FIGS. 43D and 43E).

This modification is based on finite element analysis which has shown that, in some instances, increasing the length of the edge where the lubricant enters (the leading edge) can improve bearing performance. Specifically, lengthening this edge allows more lubricant to be directed toward the pad center. To achieve this effect a radius cut may be formed on the pad surface to lengthen the leading edge. The cut may be formed either entirely through the pad or partially through the pad surface to provide a recess in the pad surface. Such a radius cut may be provided in a thrust bearing, a radial bearing or a combined radial/thrust bearing. It should be kept in mind that the provision of such a radius cut decreases the load bearing surface of the pad. Thus, there is a trade off; more lubricant but less load bearing surface.

FIG. 43A shows a top view of a thrust bearing pad 132 in which a radius cut 132C is formed as shown. In the illustrated embodiment, the cut 132C is provided on each edge of the pad 132. This is because the illustrated pad is intended for bidirectional use and the improved result is desired in both directions. If unidirectional operation is sufficient, the cut should only be provided on one edge.

FIGS. 43B and 43C show side and top views respectively of a radial bearing pad 32 formed with radius cuts 32C at each edge. Again, the provision of the radius cuts 32C increases the amount of lubricant entering the pad center at the same time reducing the load bearing surface area of the pad. The radial bearing shown in FIGS. IIB & C is also a bidirectional pads since it is symmetrical with radius cuts 32C formed in each edge.

FIGS. 43D and 43E show a combined radial/thrust bearing pad 1032 supported on an angled support structure 1037 schematically illustrated as a conically tapered block. FIG. 43D is an edge view and FIG. 43E is a top view. Again, the pad is symmetrical and a radius cut 1032C is provided on each edge of the thrust bearing pad to allow bidirectional operation.

FIGS. 44A–D illustrate another possible modification to the basic pad shape. Specifically, it has been learned that tapering the leading edge of the bearing pad results in increased inlet bending. This allows more lubricant to enter into the shaft-pad space which increases the load carrying capability of the pad. Complex finite element analysis using computers can predict the amount of bending needed to obtain optimum lubricant flow.

Figure 44A:
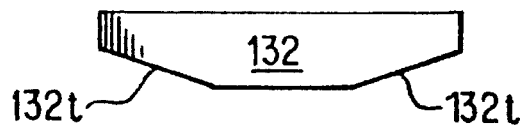
FIG. 44A is a side view of a thrust pad with tapered edges.
Figure 44B:
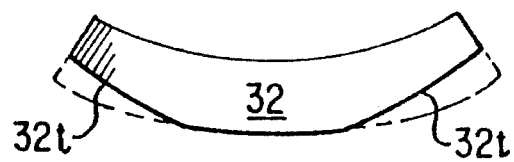
FIG. 44B is a side view of a journal bearing pad with tapered edges.
Figure 44C:
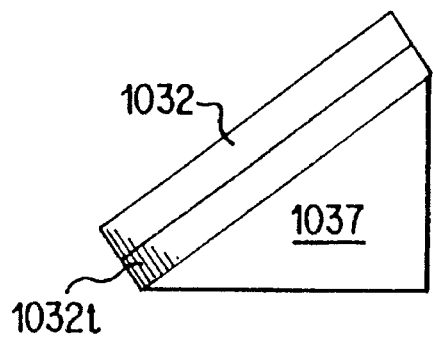
FIG. 44C is a side view of a combined radial/thrust bearing pad with tapered side edges.
Figure 44D:
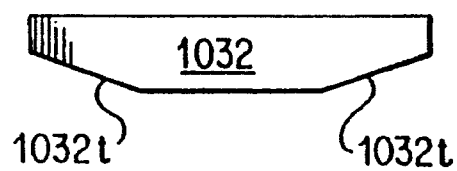
FIG. 44D is a side view of the combined radial/thrust bearing pad of FIG. 44C.

The drawings illustrate the use of tapered edges in thrust, radial, and combined radial/thrust bearings. Specifically, FIG. 44A is a side view along the S axis in FIG. 42A illustrating a thrust bearing pad 132 with a taper 132t formed at each edge. Again, the taper is provided at each end to allow for bidirectional operation. FIG. 44B shows a side view of a radial bearing pad 32 with a taper 32t formed at each edge thereof to allow bidirectional operation. Finally, FIGS. 44C and 44D illustrate edge and side views of a combined radial/thrust bearing pad 1032 with tapers provided on each edge to increase inlet bending. Of course, if unidirectional operation is sufficient, only one edge, the leading edge, should be tapered.

The basic pad shape may also be modified by providing rails on the side edges of the pads such that, under load, the pad moves to form a channel which retains lubricant on the pad face and minimizes end or side leakage.

Figure 45B:
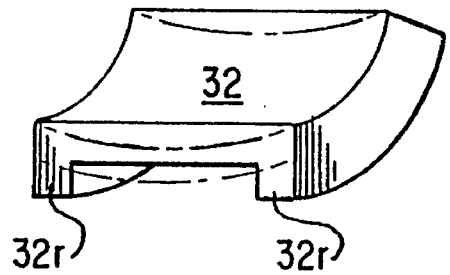
FIG. 45B is an edge perspective view of a journal or radial bearing pad provided with side edge rails on its axial edges.
Figure 45C:
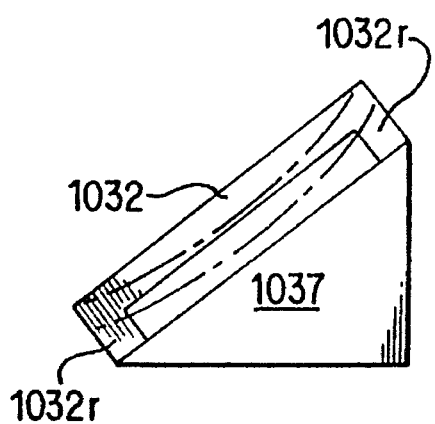
FIG. 45C is an edge view of a combined radial/thrust bearing pad provided with side edgte rails.
Figure 45A:
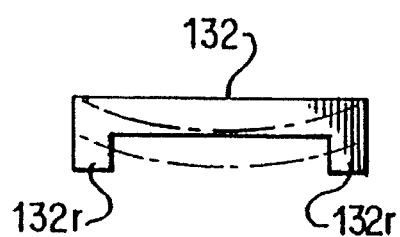
FIG. 45A is an edge view of a thrust pad provided with side edge rails.

Examples of pad shapes so modified are shown in FIGS. 45A–C. FIG. 45A shows an edge view of a thrust bearing pad 132 provided with side edge rails 132r on the radially inner and outer edges. The movement of this pad under load (greatly exaggerated) is indicated in phantom. As can be seen, the pad moves under load to form a lubricant retaining channel.

FIG. 45B shows a radial or journal bearing pad 32 provided with side edge rails 32r on its axial edges. The movement of the pad under load, again greatly exaggerated, is illustrated in phantom. As is apparent from this exaggerated example, the pad deforms under load to form a lubricant retaining channel to prevent leakage of lubricant along the axial ends of the bearings.

FIG. 45C shows a combined radial/thrust bearing pad 1032 formed with rails 1032r on its inner and outer edges. The movement of the pad under load (greatly exaggerated) is indicated in phantom. As is apparent from this exaggerated view, the pad deforms under load to form a lubricant retaining pocket so that lubricant does not escape from the radially inner and outer edges of the pad 1032.

Figure 46A:
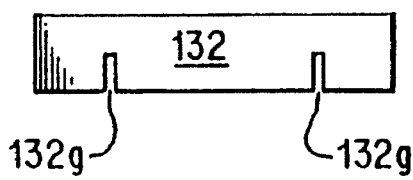
FIG. 46A is a side view of a thrust bearing pad having grooves formed in the bottom proximate the side edges.
Figure 46B:
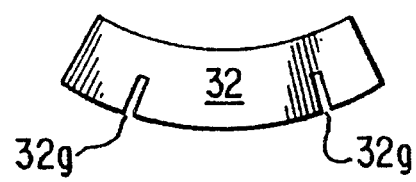
FIG. 46B is a side view of a radial or journal bearing pad having grooves formed in the bottom proximate the sides.
Figure 46C:
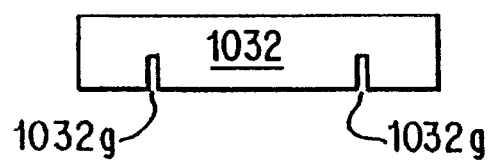
FIG. 46C is a side view of a combined radial/thrust bearing pad having grooves formed in the bottom proximate the side edges.

As mentioned before with reference to FIGS. 44A–44D, it is sometimes desirable to increase the inlet bending of the leading edge of a bearing pad. Another modified bearing pad shape for achieving or enhancing this desired result is shown in FIGS. 46A–46C. Specifically, these drawings show that in addition to or instead of tapering the leading edge, a groove may be formed on the lower edge of the lower side of the pad proximate the leading edge to cause increased leading edge bending while maintaining a flatter surface. FIG. 46A shows a thrust pad 132 with grooves 132g formed in the bottom near both edges to allow bidirectional operation. FIG. 46B shows a radial bearing pad 32 with grooves 32g formed on the outer surface proximate each side edge. FIG. 46C shows a combined radial/thrust bearing pad 1032 with grooves 1032g formed in the bottom surface thereof near each edge.

Figure 47A:
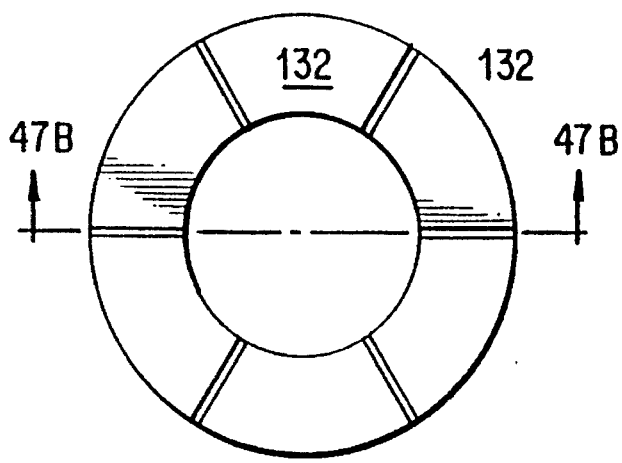
FIG. 47A is a top view of a thrust bearing in which the individual pads are defined by pad defining grooves.
Figure 47C:
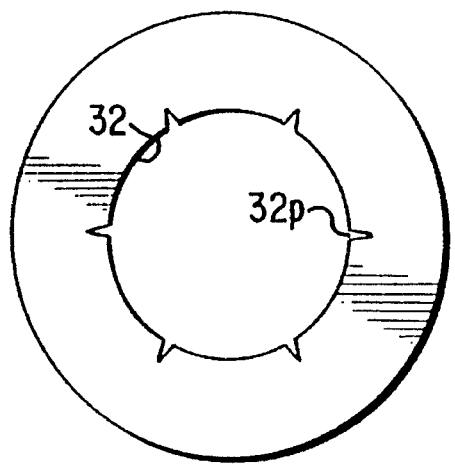
FIG. 47C is a side view of a radial or journal bearing in which the individual pads are defined by pad defining grooves.
Figure 47B:
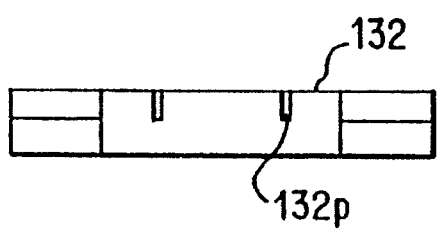
FIG. 47B is a sectional view of the thrust bearing of FIG. 47A along the liines indicated in FIG. 47A.

Another consideration in the design of hydrodynamic pads is that the pads themselves may be formed from a single member by simply providing grooves to define individual pads. Examples of this are shown in FIGS. 47A–47C. FIGS. 47A–47B show how a continuous surface can be divided into individual thrust pads 132 through the provision of pad defining grooves 132p. In this case, FIG. 47A is a top view and FIG. 47B is a side view along the lines indicated in FIG. 47A. For a combined radial/thrust bearing the construction is essentially the same as that shown in FIG. 47A. FIG. 47C illustrates how a cylindrical body may be divided into individual journal pads 32 through the provision of pad defining grooves 32p on the radially inner surface thereof.

Figure 48A:
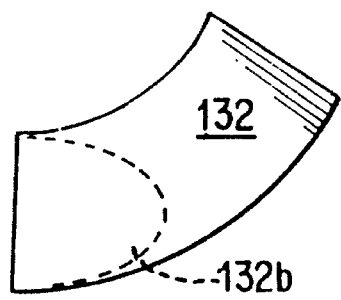
FIG. 48A shows a top view of a thrust bearing pad formed with a bottom recess indicated in phantom.

A final consideration in the design of specific pad shapes is the provision of bottom recesses on the pads. Specifically, the provision of bottom recesses can cause channeling in a manner somewhat like that shown in FIGS. 45A–45C and allow inlet bending in a way such as the tapered structure shown in FIGS. 44A–44D. Examples of bottom recesses formed in pads designed for unidirectional operation are shown in FIGS. 48A–48D. FIGS. 48A–48B show top and side views of a thrust bearing pad 132 formed with a bottom recess 132b to cause channeling. The reduced pad area also enables compressive movements onto the bottom surface which develops a converging wedge. Since this modification is provided on only one edge of the pad 132, the pad is intended for use in a unidirectional bearing. The pad construction shown in FIGS. 48A and 48B is essentially the same as would be used for a combined radial/ thrust bearing. The only difference is that the pad would be formed of a conical section.

Figure 48C:
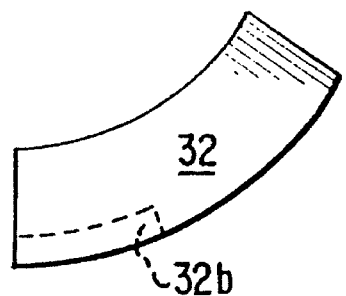
FIG. 48C shows a side view of a radial bearing pad formed with a bottom recess indicated in phantom.
Figure 48B:
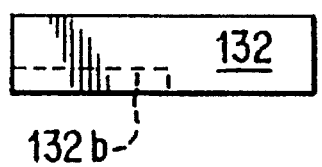
FIG. 48B shows a side view of the thrust bearing pad of FIG. 48A.

FIG. 48C shows a radial bearing pad 32 provided with a bottom recess 32b on one edge thereof. Again, this is a unidirectional bearing.

Figure 49A:
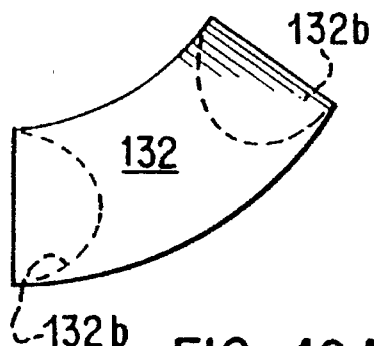
FIG. 49A is a top view of a thrust bearing pad formed with a bottom recess on each edge indicated in phantom.
Figure 49C:
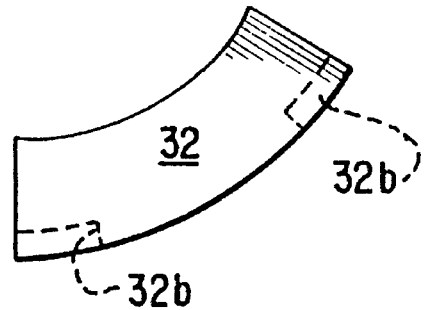
FIG. 49C is a side view of a radial or journal bearing pad with bottom recesses formed proximate each edge as indicated in phantom.
Figure 49B:
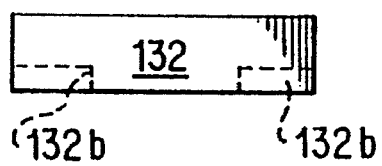
FIG. 49B is a side view of the thrust bearing pad of FIG. 49A with the bottom recesses indicated in phantom.

FIGS. 49A–49C illustrate bearing pad configurations similar to those shown in FIGS. 48A–48C except that the bottom recesses 132b are provided at both edges of the bearing pad so as to permit bidirectional operation. Specifically, the thrust or combined radial and thrust bearing pad 132 shown in FIGS. 48A and 49B includes bottom recesses 132b at each edge thereof. As is apparent by comparing FIGS. 49A–49B with FIGS. 48A–48B, the bottom recesses are somewhat smaller to accommodate the provision of such recesses at each edge.

Likewise, in FIG. 49C the radial bearing pad 32 includes bottom recesses 32b at each edge thereof. Again, the recesses are somewhat shorter than the recesses provided in the unidirectional bearing shown in FIGS. 48C.

As mentioned before, the design of a pad shape for any particular application depends on the requirements of that application. The foregoing structural modifications and considerations can be used alone or in combination. FIGS. 50A–50C and 51A–51C show how all these features can be combined in a single bearing. This is not to suggest that all these features should necessarily be included in every design. Indeed, this would rarely be required. However, it is possible to combine all these features in a single bearing, if desired.

Figure 50A:
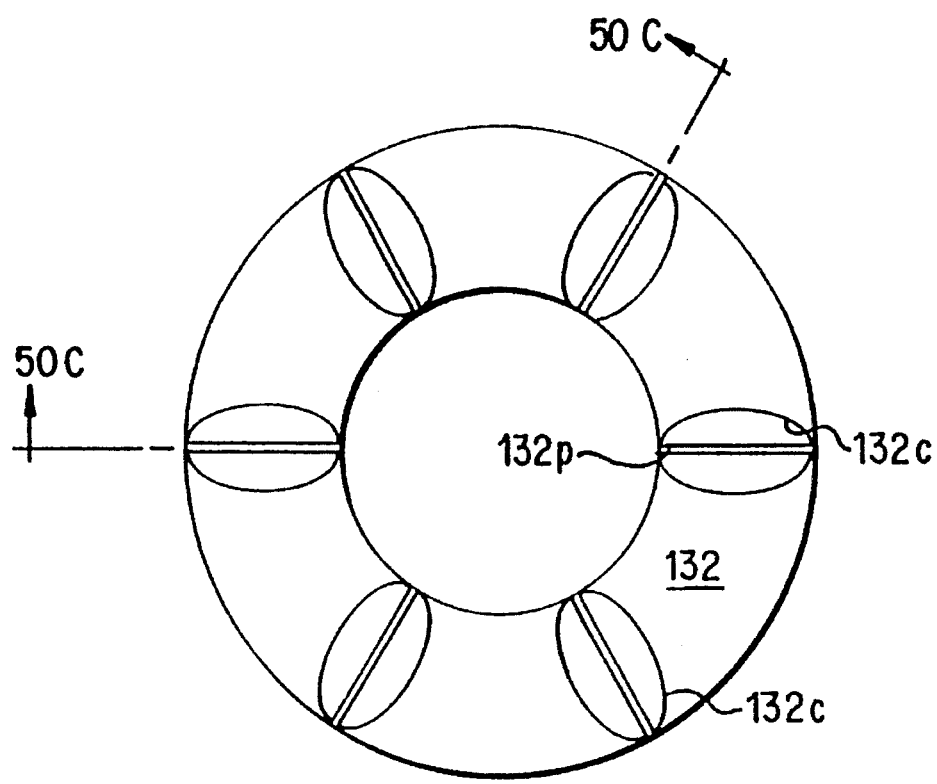
FIG. 50A is a top view of a thrust or combined radial/thrust bearing.

FIG. 50A shows a top view of a thrust bearing or combined radial/thrust bearing in which the bearing pads 132 are provided with radius cuts 132C to increase the length of the leading edge. The radius cuts 132C are provided on each edge so as to permit bidirectional operation. Of course, if desired, the radius cuts 132C can be provided on only one edge to provide optimum results for unidirectional operation. In FIG. 50A, the individual pads 132 are defined by pad defining grooves 132p.

Figure 50B:
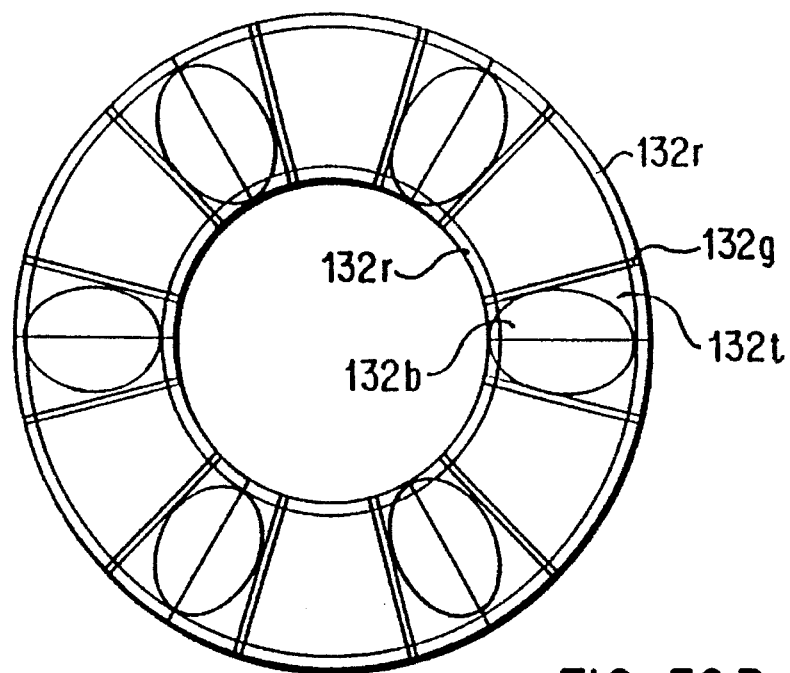
FIG. 50B is a bottom view of the thrust bearing or combined radial/thrust bearing of FIG. 50A.
Figure 50:
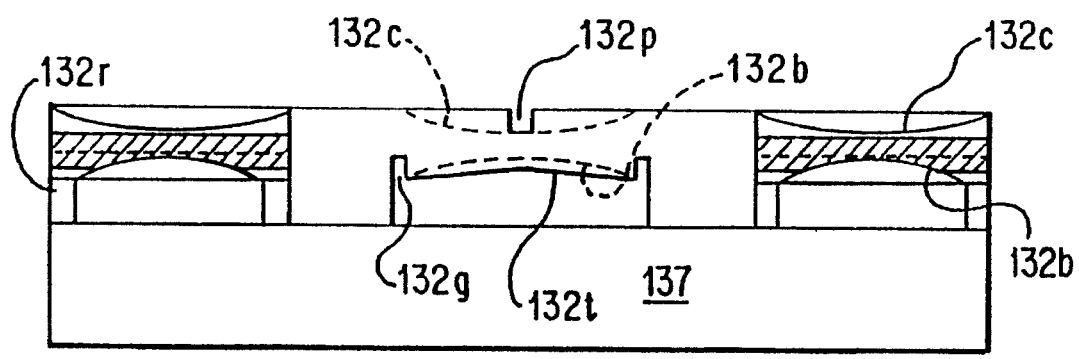
FIG. 50C is a cross-section through the lines indicated in FIG. 50A.

FIG. 50B shows a bottom view of the thrust bearing of FIG. 50A. In this view, it can be seen that the bearing includes bottom rails 132r, grooves 132g to increase inlet bending, a taper 132t to further increase inlet bending and a bottom recess 132r to further channel liquid and increase inlet bending. In this case, the grooves, taper, and recesses collectively provide the desired movement.

FIG. 50C is a cross-section of the bearing of FIG. 50A along the lines indicated in FIG. 50A. FIG. 50C also shows the bearing mounted on a support structure 137. The support structure is shown schematically as a box to indicate that, in accordance with the present invention, any of the support structures disclosed herein can be used. As noted above, it is possible through proper pad design to obviate the need for a moving support structure. In such a case, the support structure could be rigid, e.g., the housing. Alternatively, however, the support structure can be a moving support structure of any of the types disclosed herein having primary, secondary and tertiary support portions for supporting the bearing pads for movement with six degrees of freedom. Likewise, the pad modifications discussed herein are generally applicable individually or in combination to the bearing pads of any of the bearings disclosed herein.

Figure 51A:
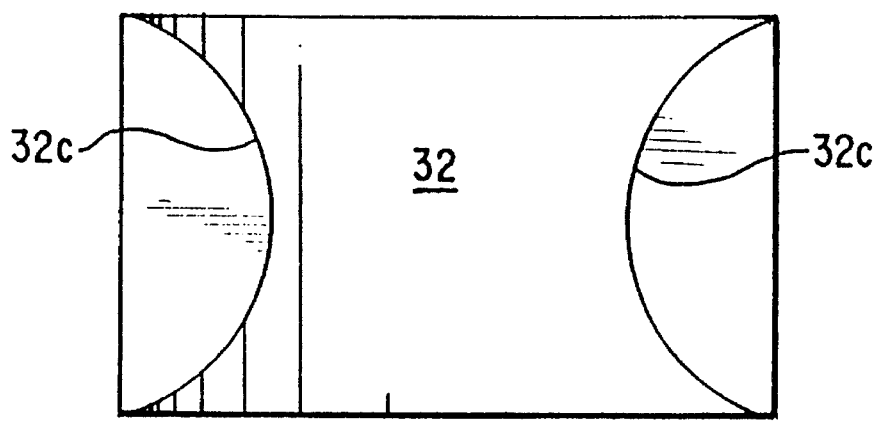
FIG. 51A is a top view of a bearing pad for a radial bearing.

FIG. 51A shows a top view of a journal or radial bearing pad 32 having a radius cut 32C formed in each edge thereof to increase the length of the leading edge. This increases the amount of lubricant passing on to the bearing pad surface.

Figure 51B:
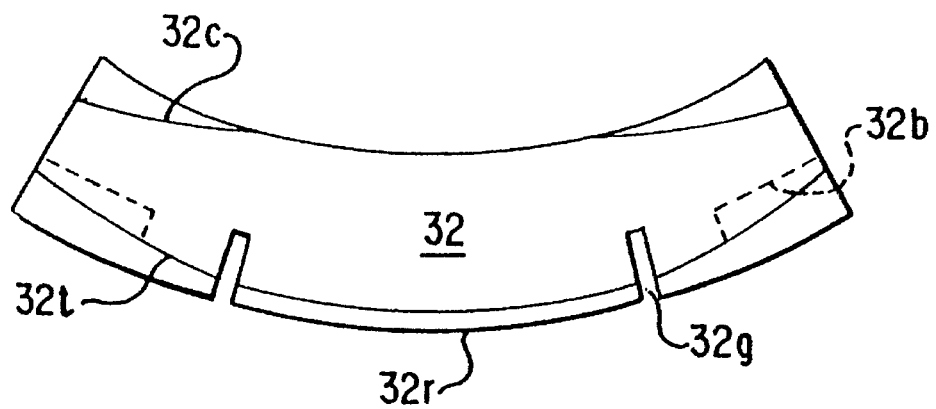
FIG. 51B is a side view of the bearing pad of FIG. 51A.

FIG. 51B shows a side view of the bearing pad 32 of FIG. 51A. From this view, it is possible to see the radius cut 32C formed on the top surface of the pad, the taper 32t formed at the bottom edges of the pad, the bottom recess 32b formed on the bottom side of the pad, the grooves 32g formed on the bottom side of the pad and the rails 32r extending radially outward from the bottom surface of the pad.

Figure 51C:
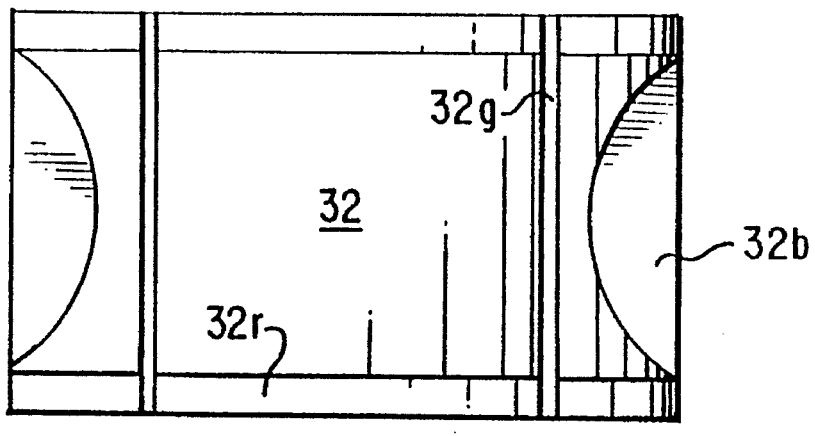
FIG. 51C is a bottom view of the bearing pad of FIG. 51A.

FIG. 51C shows the bottom view of the bearing pad of FIGS. 51A & 51B in which the bottom rails 32r, the grooves 32g and the bottom recess 32p are apparent. If desired, a bearing having pads of the type illustrated in FIGS. 51A–51C could be formed from a single piece with the pads separated from one another by pad defining grooves as shown in FIG. 47C.

Figure 52A:
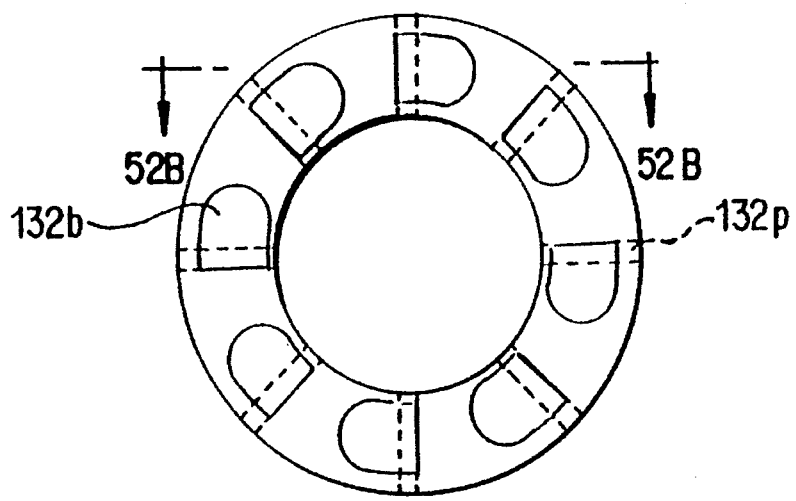
FIG. 52A is a bottom view of a thrust bearing according to the present invention.
Figure 52:
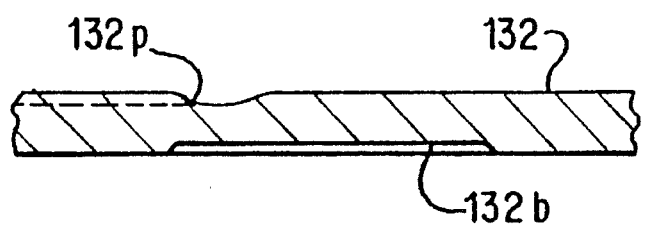
FIG. 52B is a partial sectional view of the thrust bearing of FIG. 52A along the lines indicated in FIG. 52A.
FIG. 52C is a top view of the thrust bearing of FIG. 52A.
Figure 52:
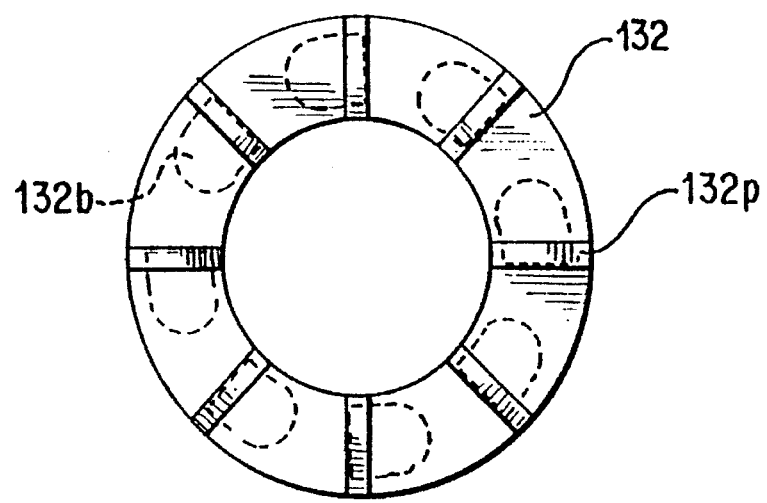

Another complete bearing design is depicted in FIGS. 52A–52C. These drawings depict a washer-like thrust bearing in which the desired pad shape is obtained in an extremely thin washer-like cylindrical element. FIG. 52A is a bottom view of the washer-like bearing showing circumferentially spaced bottom recesses 132b and grooves 132p (in phantom) which define a plurality of circumferentially spaced thrust pads 132. The cross-section of the grooves 132p and bottom recesses 132b is best illustrated in the cross-sectional view of FIG. 52B. As shown in this figure, the grooves 132p and 132b are very shallow. Finally, FIG. 52C shows a top view of the washer-like thrust bearing in which the circumferentially spaced pad defining grooves 132p are depicted and the bottom recesses 132b are shown in phantom.

As previously discussed, the pad defining grooves 132p define a circumferentially spaced series of bearing pads 132. The bottom recesses 132b undercut the pad surface to a sufficient extent that the portion of the thrust pad surface that is undercut can move slightly downward so as to form a conveying wedge and a lubricant retaining channel. Collectively, these movements result in the formation of a series of converging wedges so that the shaft runner is supported on a layer of pressurized fluid film. Further, because of the nature of the bottom recesses 132b the lubricant is retained on the pad surface and does not escape from the radially inner and outer edges of the pad. Finite element analysis has shown that, under sufficient load, this simple washer will move so as to operate as a multiple pad hydrodynamic bearing even without a moving support structure. Thus, a simple washer-type bearing pad configuration of the type shown in FIGS. 52A–52C can be mounted on a rigid support structure and still obtain satisfactory results. Of course, a moving support structure could be used, if desired.

An important aspect of the present invention is the disclosure of machinable bearing shapes i.e., bearing shapes which can be produced by machining a piece of heavy walled tubing or similar cylindrical journal using standardly available machining techniques. Such bearings are characterized by the fact that they are formed from a piece of heavy walled tubing or similar cylindrical journal through the provision of bores, slits and grooves. The advantage of such bearings is that it is easy to manufacture prototypes and to modify these prototypes after testing. Naturally, when the bearings are to be mass produced, using, for example, molding or casting techniques, different manufacturing considerations may dictate different shapes. It is important to recognize that changes in shape affect bearing performance.

Another manufacturing consideration is ease of molding. Naturally, most of the bearing constructions of the present invention are capable of being molded by some molding technique. However, only certain shapes can be injection molded in a simple two-piece mold, i.e., a mold which does not include cams. Another advantage of the bearings of the present invention is that the bearings can be constructed with easily moldable shapes which are defined as shapes which can be injection molded using a simple two-piece mold. An easily moldable shape generally is characterized by the absence of "hidden" cavities which require cams for molding. For instance, with respect to radial bearings, an easily moldable shape includes no radially extending grooves in the inner and outer diameter and a continuous axial cross section. The bearing shown in FIGS. 32, 32A and 32B is an example of an easily moldable radial or journal bearing.

Similarly, easily moldable thrust bearings are characterized by the fact that they can be molded with a single seam line such that, for example, when viewed only from the top and bottom, all surfaces are visible.

Figure 38A:
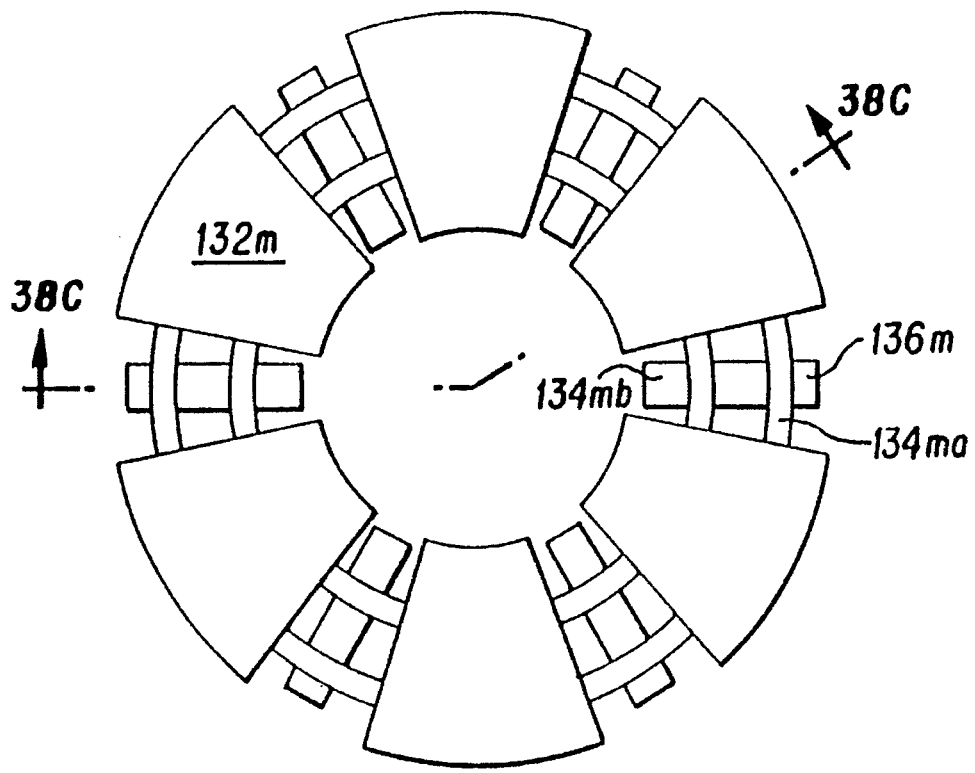
FIG. 38A is a top view of an easily moldable thrust bearing according to the present invention.
Figure 38B:
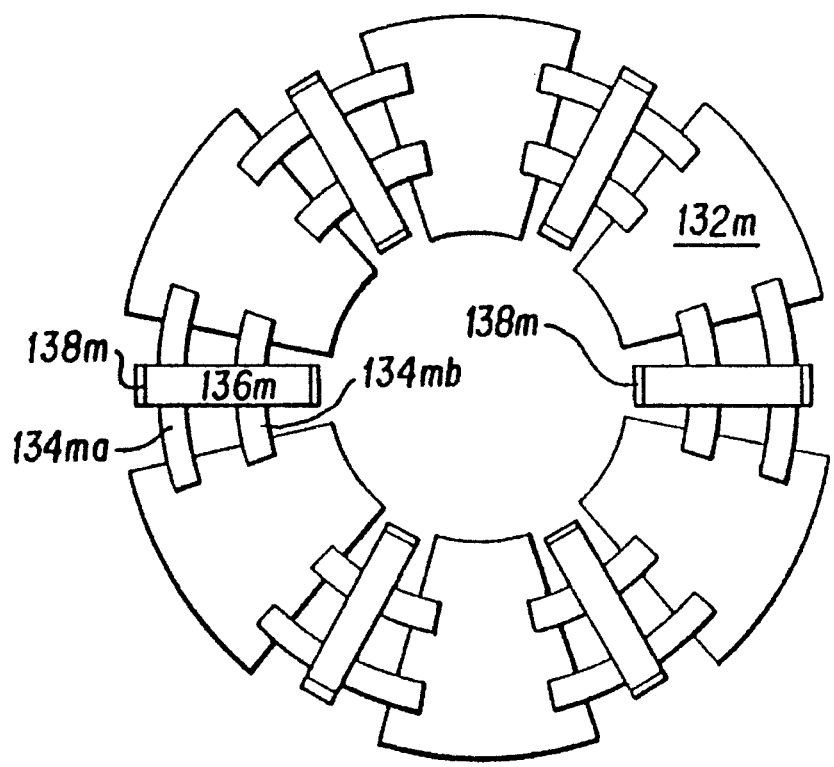
FIG. 38B is a bottom view of the bearing of FIG. 38A.
Figure 38C:
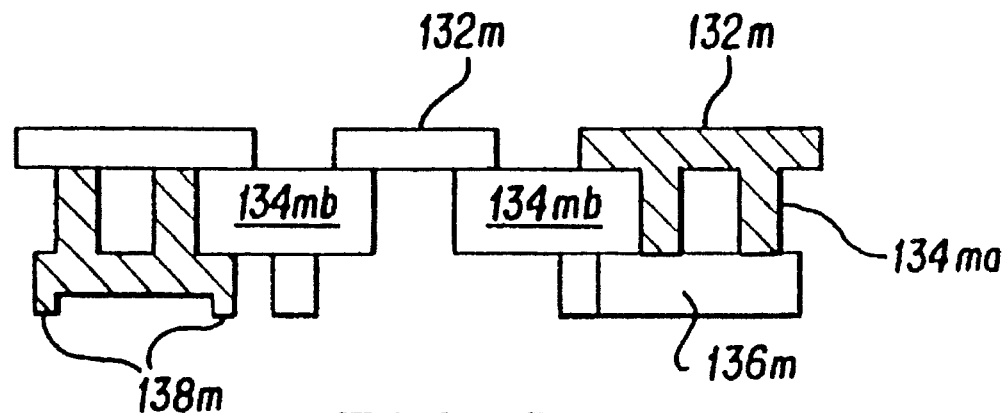
FIG. 38C is an exploded cross-section along the lines indicated in FIG. 38A.

FIGS. 38A–38C illustrate an easily moldable thrust bearing. The bearing includes a plurality of circumferentially spaced bearing pads 132m and a support structure supporting each of the bearing pads 132m. The support structure includes a primary support portion which includes circumferential beams 134mb and 134ma, a secondary support portion which includes radially extending beam 136m and a tertiary support portion which includes the stub-like pair of beams 138m. It should be noted that, in FIGS. 38A–38C, the dimensions of the support structure are somewhat distorted to provide clarity. For instance, as shown in FIG. 38C, the circumferential beams 134ma and 134mb are shown as extremely thick. Such beam structure would provide a very rigid support for the bearing pads 132m and in practice, such a rigid support would probably not be necessary or desirable.

Variants of the specific moldable beam structure illustrated are possible. For instance, either or both of the spaced circumferential beam segments 134ma or 134mb could be formed as a continuous circumferential beam element. Additionally, the secondary support portion could include a plurality of radially extending beams between each bearing pad 132m. Further, the primary support structure could be modified to include three or more circumferential beam segments connecting each pair of adjacent bearing pads and/or circumferential beam segments; also, segments of different radial widths could be used. Further, the stub-like beam portions 138m could be provided along the radially extending edges of the beams 136 rather than the circumferentially extending ends. Finally, as with any bearing in accordance with the present invention, the structure could also be varied by varying the length or thickness of any of the elements in the support structure to modify the movement characteristics of the support structure.

Figure 38D:
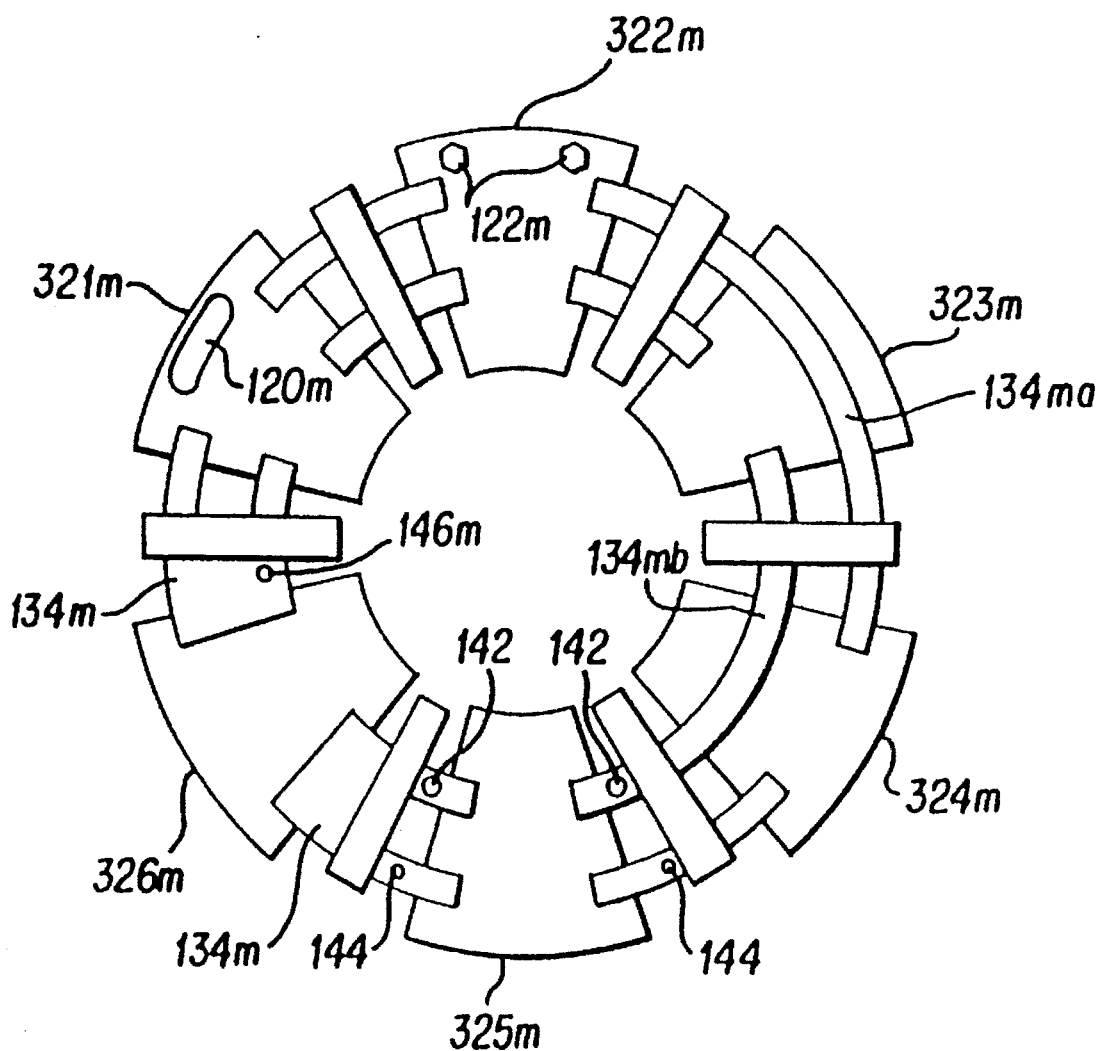
FIG. 38D is a bottom view illustrating modifications of the bearing illustrated in FIGS. 38A-C.

In order to illustrate a number of possible support structure constructions, FIG. 38D depicts a different support structure for each of the bearing pads 321m–326m. In particular, FIG. 38D is a bottom view with the modifications illustrated herein. It should be understood that these various support structures are shown in a single bearing for purposes of illustrating the present invention. In normal use, each of the bearing pads 321-326m would have a similar, though not necessarily identical, support structure to assure uniform performance.

The support for bearing pad 322m differs from that for the bearing pads 132m in that an oval shaped projection extends from the back of the bearing pad surface to provide a rigid support for the outer circumferential edge of the bearing pad 321m. By virtue of this construction, the bearing pad 321m would be extremely rigid at its outer circumferential end.

The support for bearing pad 322m is similar of that to 321m except that rather than a single large projection, two smaller projections 122m extend from the bottom of the bearing proximate the outer circumferential edge of the bearing pad. Like the projection 120m, these two projections 122m provide rigidity to the outer circumferential edge of the bearing pad 322m. However, this construction allows the bearing to move in the unsupported region between the projections.

The bearing pad 323m is supported by modified support structure which includes a continuous circumferential beam 134ma in the primary support portion. Similarly, the bearing pad 324m includes a continuous inner circumferential beam 134mb. The provision of such continuous beams increases the rigidity of the bearing support structure.

The support structure for bearing pad 325 is modified by the provision of large openings 142m in the inner beam 134mb and smaller openings 144 in the outer beam 134ma. The provisions of these openings increase the flexibility of the beams. Naturally, the larger openings increase the flexibility of the beams to a greater extent than the small openings 144. Variants of this support structure include the use of different sized openings or a different number of openings to bias the bearing pad 325m in a predetermined direction.

The bearing pad 326m is supported by a modified structure in which the primary support portion includes a membrane 134m rather than a pair of beams. In the illustrated example, one of the membranes is provided with a opening 146 to bias the bearing pad 326m in a predetermined direction. Of course, the provision of the opening 146m is not necessary and if desired, a number of openings could be provided.

As is evident from these drawings, the moldable bearings do not include any hidden cavities which would necessitate the use of a complex mold and/or a mold including a displaceable cam. In particular, since each surface of the bearing structure is directly visible in either the top view of FIG. 38A or the bottom view of FIG. 38B, the bearing can be simply molded using a two piece mold. Specifically, a first mold piece defines those surfaces which are directly visible only in the top view of FIG. 38A. The second mold piece defines those surfaces which are only visible in the bottom view of FIG. 38B. Surfaces having edges visible in both FIGS. 38A and 38B can be molded using either or both molds. In the illustrated bearing, easy moldability is achieved because the secondary and tertiary support portions are circumferentially located in the space between bearing pads. The modifications illustrated in FIG. 38D do not alter the easy moldability of the bearing.

More complex variants of the moldable thrust bearing illustrated in FIGS. 38A–38D are possible. In particular, any of the previously discussed modifications of the bearing structure which can be adapted to easy molding could be employed. For instance, the primary support beams could be continuous. Thus, the provision of an easily moldable bearing does not necessarily require a simple bearing construction. An example of a more complex bearing structure is illustrated in FIGS. 39A–39C.

Figure 39A:
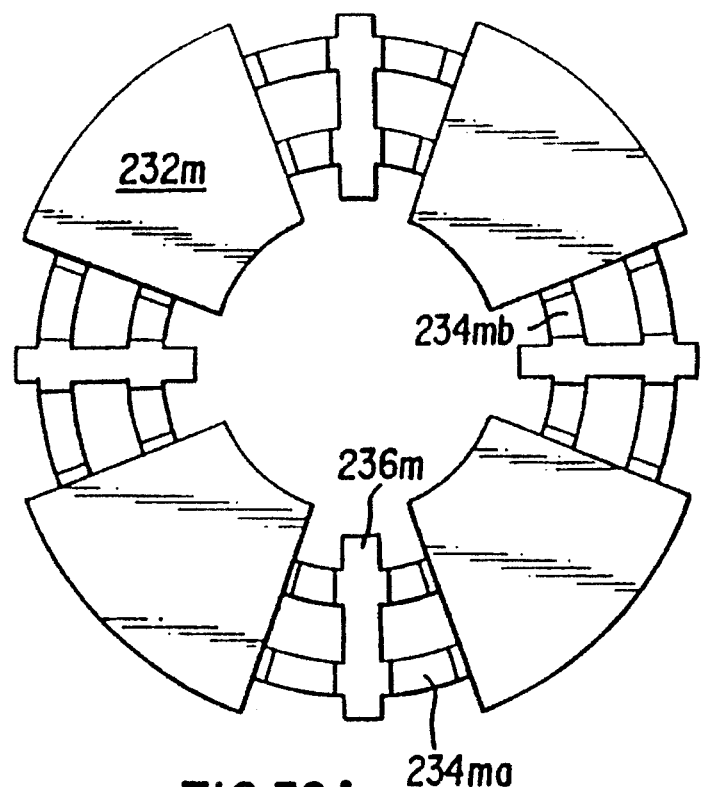
FIG. 39A is a top view of another easily moldable thrust bearing according to the present invention.
Figure 39B:
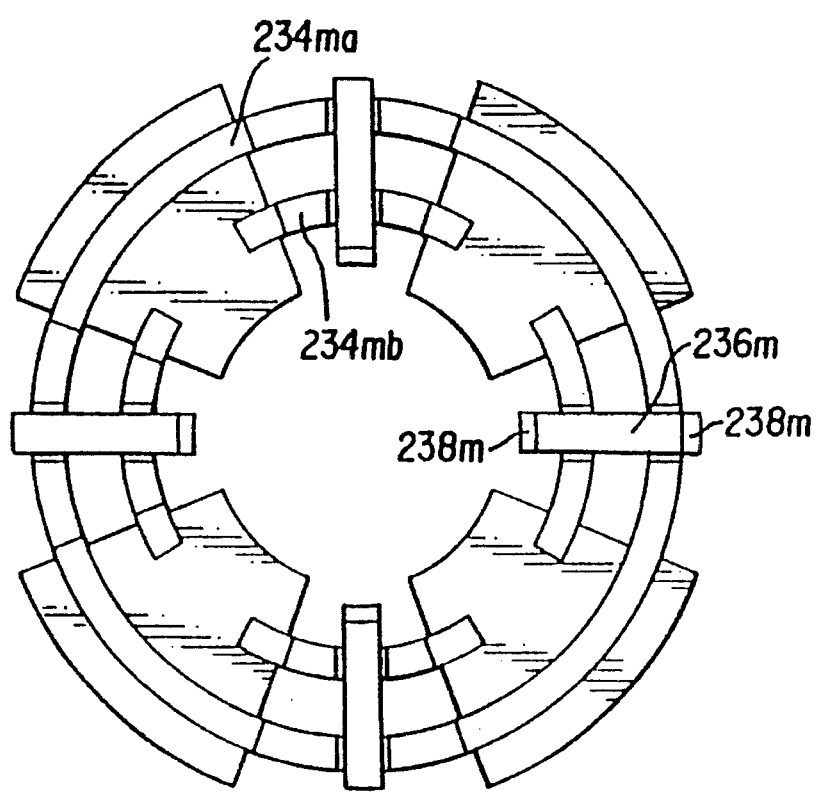
FIG. 39B is a bottom view of the bearing of FIG. 39A.
Figure 39C:
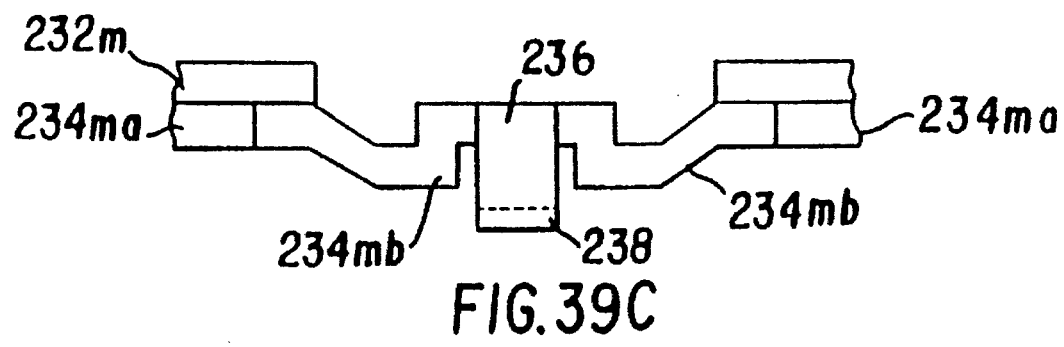
FIG. 39C is a partial cross-section showing the support structure for the bearing pads in the bearing of FIGS. 39A and 39B.

As illustrated in FIGS. 39A–C, the bearing includes a plurality of circumferentially spaced bearing pads 232m supported by a bearing pad support structure. The secondary and tertiary portions of the support structure are similar to corresponding portions of the bearing support structure of FIG. 38. However, the bearing of FIG. 39 differs from the bearing of FIG. 38 in that, in the bearing of FIG. 39, the primary support portion includes a plurality of complex beams 234. Specifically, each bearing pad is supported by a radially outer continuous complex circumferential beam 234ma. The pads are further supported by the plurality of spaced circumferential complex beams 234mb. The complex shapes of the continuous beam 234ma and the beam segments 234mb can be best appreciated with reference to FIG. 39C which shows, somewhat schematically, the profile of the complex beams 234. In operation, the beams 234ma and 234mb function as a beam network. Thus, it can be seen that numerous complex thrust bearing constructions can be provided while retaining the ability to mold the bearing with a simple two-piece mold, i.e., easy moldability. Naturally, each structure provides unique movement characteristics which must be considered in designing the bearing for optimum wedge formation.

In certain gas or air lubricated movable pad bearings, there are cases where loads or speeds exceed the capability of an air film. In these cases, it is necessary to introduce a liquid type lubricant into the converging wedge without providing a liquid reservoir or bath. FIGS. 40, 40A, 41 and 41A illustrate bearing constructions for achieving this purpose. In particular, these drawings illustrate a novel self-lubricating movable pad bearing in accordance with another important aspect of the present invention. The bearing is essentially a movable pad bearing of the type described herein which has been modified to include lubricating plastic in its various openings.

The plastic employed in the bearing is a conventional castable porous plastic which is capable of absorbing lubricating liquid when soaked in such a liquid. One such plastic is sold under the trade name POREX™. Generally, the porous plastic can be formed from various plastics by injecting air into the plastic material to form the pores. In particular, the liquid is absorbed into the porous plastic in a wick like manner and held in place by the plastic.

The lubricating movable pad bearing is constructed by taking a conventional journal, thrust or combined radial and thrust movable pad bearing of the type described above and casting or injecting the conventional porous plastic around and into the spaces between the movable members. As a consequence of this construction, during operation, the movement of the shaft and the compression of the movable members causes the lubricating liquid to leave the porous plastic and to be drawn into the leading edge of the converging wedge. The formation of the liquid filled wedge greatly increases the load and speed capability of the bearing. After the liquid passes over the pad surface, it is reabsorbed by the porous plastic after leaving the trailing edge.

An important aspect of the present invention is the composite structure combining a standard bearing material with the porous plastic. By virtue of this composite, it is possible to take advantage of the unique characteristics of both materials. More specifically, conventional porous plastics alone make poor movable pad bearing materials because the pores in the plastic are actual voids that are detrimental to the development of the very thin fluid film. On the other hand, conventional plastic or metal bearing materials not having the pores are incapable of absorbing lubricant to any great extent. However, through the use of both materials in the manner described, an effective self-lubricating hydrodynamic bearing can be obtained. Further, there are synergistic results from the combined use of standard bearing material and lubricant absorbing porous plastic. For example, the movements of the bearing surface assist in forcing the liquid lubricant into the leading edge. Moreover, channelling or lubricant retaining deformation of the bearing surface assists in containing the liquid.

Figure 40:
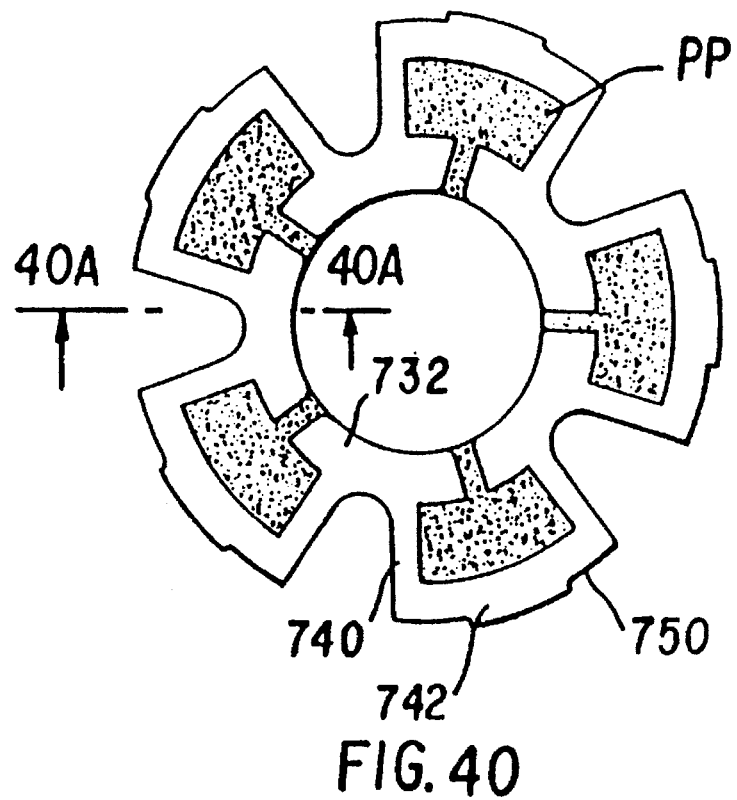
FIG. 40 is a side view of a self-lubricating bearing according to the present invention.
Figure 41:
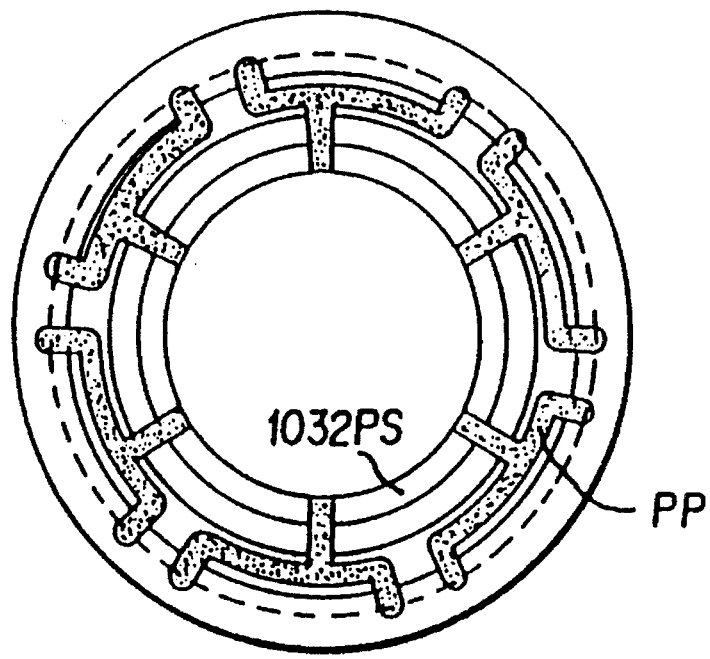
FIG. 41 is a side view of a self-lubricating combined radial and thrust bearing according to the present invention.

FIGS. 40 and 41 show two examples of the self-lubricating movable pad bearing of the present invention. In particular, these drawings show bearings similar to bearings described previously which have been modified to include the liquid absorbing porous plastic filled into the spaces between the movable members. To some extent, the bearing acts as a skeletal portion and the porous plastic portion acts as a lubricant retaining and releasing sponge.

Figure 40A:
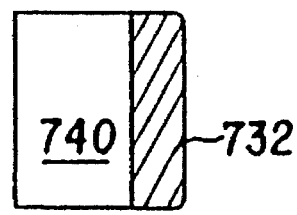
FIG. 40A is a cross section of the bearing of FIG. 40.

In particular, FIGS. 40 and 40A show a self-lubricating bearing having an underlying bearing structure which is essentially identical to the bearing shown in FIGS. 32 and 32A. However, the bearing structure of FIG. 40 is modified such that porous plastic fills the openings between the bearings and the openings within the support structure which are continuous with the spaces between the bearing pads 732. Naturally, the spaces under the bearing pads could be filled with porous plastic as well. However, unless there is communication between the porous plastic and the bearing pad surface, the provision of such porous plastic areas would be fruitless.

Figure 41A:
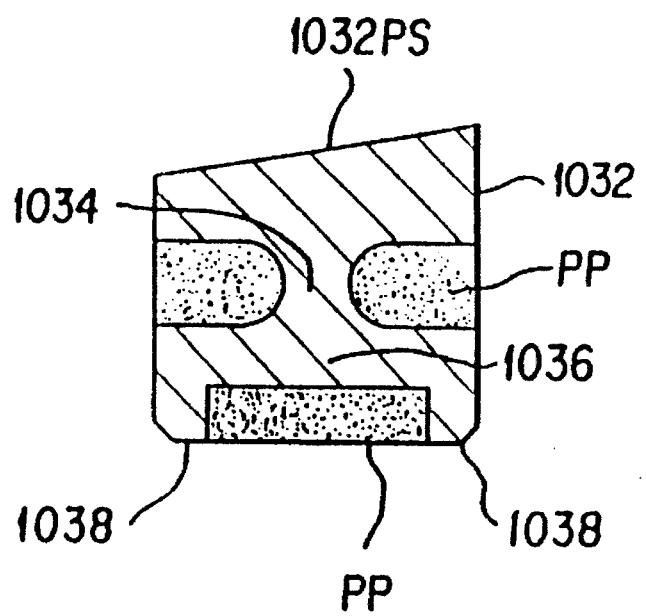
FIG. 41A is a cross-section of the bearing of FIG. 41.

Likewise, FIGS. 41 and 41A show a bearing having a construction virtually identical to the construction of the combined radial and thrust bearing shown in FIGS. 36 and 37. However, porous plastic is again injected into the interstices or spaces within the support structure between the pads. Again, the injection of the porous plastic as illustrated results in a bearing having a continuous inner diameter. However, like the bearing of FIG. 40, the material characteristics across the inner diameter vary significantly.

Specifically, like the bearing of FIG. 40, the inner diameter of the bearing of FIG. 41 includes wedge supporting bearing pad surfaces and circumferentially spaced lubricant releasing, absorbing and retaining portions. In operation, the movement of the shaft and the compression of the movable members causes the lubricating liquid to leave the porous plastic and to be drawn into the leading edge of the converging wedge. The formation of the liquid filled wedge greatly increases the load and speed capability of the bearings.

The manufacture of the self-lubricating movable pad bearing involves three general steps. First, the basic bearing or skeletal portion is formed of standard bearing material. Second, the porous plastic is injected into the desired spaces in the bearing structure. For purposes of manufacturing convenience, the plastic is injected into the bearing without lubricant. Finally, the bearing, with the porous plastic injected into the desired spaces, is loaded with liquid lubricant. To properly load the plastic with liquid lubricant, it is necessary to work the lubricant in from one side. The merging in the liquid results in an unfilled internal portion. This is caused by not allowing the pores to vent from one side. In FIG. 40, the basic bearing structure is combined radial and thrust structure similar to that shown in FIG. 36. However, porous plastic fills the interstices within the support structure. The provision of the porous plastic yields a composite bearing having a continuous inner diameter surface. However, the movement characteristics across the surface vary greatly. Specifically, the movable pads, which are formed of standard bearing materials such as metal or non-porous plastic, are suited for movement and formation of a fluid wedge. On the other hand, the porous plastic portions are suited for compression so as to release lubricant at the leading edge of the bearing pads and absorbing lubricant at the trailing edge of the bearing pads.

As noted with respect to each of the illustrative examples described above, the bearings of the present invention can be formed to provide for a wedge ratio of 1:2 to 1:5, have a deformable bearing surface the shape of which can be modified, allow six degrees of freedom of the pad, and provide a dash pot type damping action. The bearings are typically of a unitary construction.

By virtue of the wedge formed by movement of the bearing pad and the ability of the pad to move with six degrees of freedom, the bearing of the present invention exhibits exceptional performance characteristics. Specifically, the bearing dimensions and movement variables including number, size, shape, location and material characteristics of the elements defined in the unitary bearing can be tailored for any specific application to support a wide variety of loads. Of these variables, the shape of the support members is particularly important. The impact of shape of the support members on the movement characteristics of the support structure can be appreciated when the variable formula for moment of inertia $bh^3/12$ (English units) (the main component of sectional modulus for rectangular section, $z= I/c=bh^2/6$) is used as an example. Moreover, the ability of the pad to move with six degrees of freedom allows the bearing to compensate for and correct shaft misalignment. In this regard it is noted that the bearings of the present invention have a self-correcting characteristic resulting from the tendency of the bearing to return to its non-deflected state due to the stiffness of the bearing. Of course, the stiffness of the bearing is primarily a function of the shape of the support structure, and to a lesser extent the other movement variables, including number, size, location, and material characteristics of the elements defined by the grooves and cuts or slits formed in the unitary element. Stiffer bearings have a greater self-correcting tendency but are less able to adjust for shaft misalignment.

Tests have shown that bearings incorporating the features of the present invention exhibit dramatically improved performance even in comparison to the structure disclosed in the present inventor's prior U.S. Pat. No. 4,496,251. In a recent test, the journal bearings of the present invention were utilized in a radial bearing with a radial envelope of 0.091"(2.31 mm). Inward movements of the bearing pad were 0.0003"(0.0076 mm) which provides exceptional stability and bearing performance. A comparable displacement using the arrangement shown in the present inventor's prior U.S. Pat. No. 4,496,251 would have required a radial space of 0.30"(7.6 mm).

In conventional hydrodynamic journal bearings, it is typically necessary to provide a fluid-film clearance between the bearing pad surface and the shaft portion to be supported. This requires extremely close manufacturing tolerances which can present an obstacle to high volume production.

The bearings of the present invention can be designed to obviate the need for such close manufacturing tolerances. Specifically, by providing appropriate bores, grooves and cuts or slits, it is possible to define a bearing having virtually any desired performance characteristic. One such characteristic is the stiffness or spring characteristic of the bearing pad in the direction of load, i.e., in the radial direction (radial stiffness) with respect to journal bearings and in the axial direction (axial stiffness) with respect to thrust bearings.

It is known in the bearing art that the fluid film between the shaft and the bearing may be modeled as a spring since it has a calculatable radial or axial fluid film stiffness or spring characteristic. This is true for both compressible and incompressible fluids but is particularly useful in regard to gas fluid lubricants. The fluid film stiffness and the bearing stiffness act in opposition to one another such that if the fluid film stiffness or spring characteristic exceeds the bearing stiffness or spring characteristic, the bearing will move in the direction of the fluid film stiffness (i.e., radial direction for journal bearings and axial direction for thrust bearings) until the stiffness of the fluid and the bearing are in equilibrium. Thus, it has been found that if a journal bearing is designed such that radial stiffness of the bearing is less than the radial stiffness of the fluid film, it is not necessary to provide a precise spacing between the shaft and the bearing because the radial stiffness of the fluid film will automatically and instantaneously, upon rotation of the shaft, cause appropriate radial movement of the journal bearing. The virtually instantaneous wedge formation results in virtually instantaneous formation of the protective fluid film, thereby preventing damage to wedge forming surface which typically occurs at low speeds during the formation of the fluid film.

The radial stiffness of the bearing is, of course, primarily a function of the section or flexure modulus of the support structure which depends on the shape of the support structure. The radial stiffness of the pad also depends on the length of the slits or cuts formed in the bearing. The same is true of thrust bearings except, naturally, the axial stiffness of the bearing is critical. Accordingly, with the present invention, it is possible to achieve high performance without the close manufacturing tolerances typically required of hydrodynamic bearings.

For example, the bearings of the present invention may be designed to have an interference fit when installed on the shaft such that as the bearing is forced on the shaft, the pads move slightly so as to form a converging wedge shape while in the stationary installed position. The trailing edge bearing pad contacts the shaft. At instantaneous start up, the fluid film enters the wedge and builds up fluid pressure causing separation of the shaft and pad. Thus, in accordance with another important aspect of this invention, the bearings of the present invention may be designed and dimensioned such that the trailing edge of the bearing is in contact with the shaft portion to be supported when the shaft is at rest.

Figure 1C:
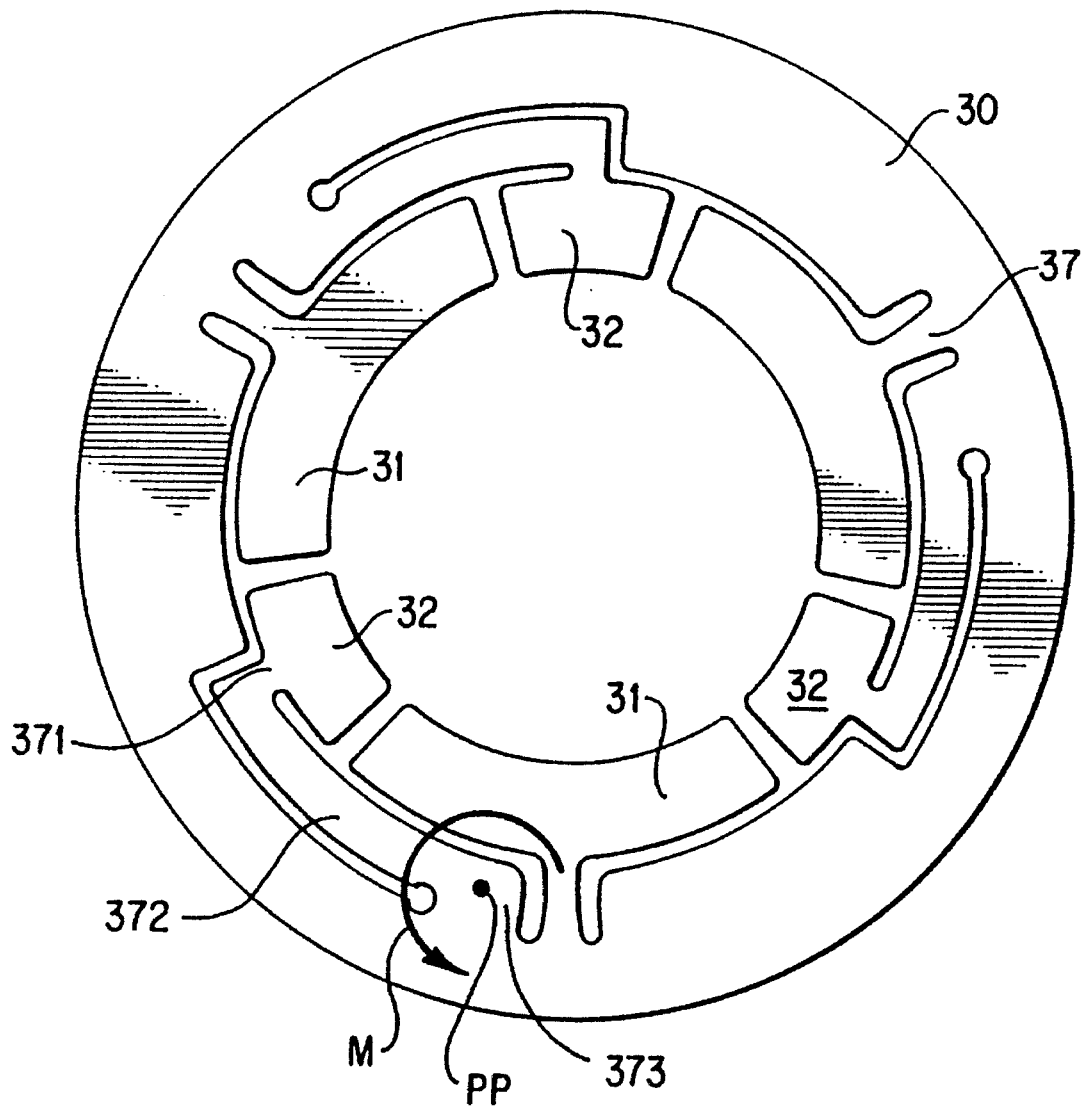
FIG. 1C is a side view of a hydrodynamic bearing according to the present invention.

FIG. 1C shows a side-view of a three pad positive-centering movable pad bearing for use in applications where floating of the axis of rotation must be minimized or eliminated. As shown in FIG. 1C, the bearing includes two different types of bearing pads: circumferentially short pads indicated at 32 and circumferentially long pads indicated at 31. The short pads 32 operate as flexible centering pads. These pads begin at zero clearance, i.e., shaft contact and expand at design speeds under hydrodynamic pressure to a larger operating clearance. The larger, centrally pivoted pads 31 offer low pivot rotational stiffness and high radial stiffness to attenuate unbalanced response and maintain stability.

The operation of the larger centrally pivoted pads 31 is similar to tilt type pads described above in connection with FIGS. 1A and 1B. The pads 31 are supported by a single ligament 37 for simple flexibility in the plane of the paper of the drawing. It is critical, however, that the ligaments be so thin as to offer virtually no resistance to pivots. At a minimum, the radial length of the ligaments should exceed their circumferential width. In essence, the larger pads 31 have a support structure 37 which allows simple pivoting of the pad 31. It is known that a simple pivoting construction like this provides adequate support at operational speeds.

To ensure proper shaft centering and support at start up, the smaller pads 32 have a more flexible support structure. Specifically, the support structure of the pads 32 includes a primary support portion 371 in the form of a stub type shaft, a secondary support portion in the form of a elongated circumferential beam 372 and a tertiary support portion 373 in the form of a stub shaft connecting the secondary support portion 372 to the base or outer periphery of the bearing 30. Because of the elongated nature of the beam 372, any force acting on the surface of the pad 32 causes pivoting about a pivot point PP as illustrated in FIG. 1C. This pivot point PP is located circumferentially beyond the trailing edge 32t of the bearing pads 32. As a consequence, any force acting on the pad 32 causes a moment M to be generated in the direction shown in FIG. 1C. This ensures that under static state, contact between the pad 32 and the shaft occurs only at the trailing edge of the pad. In this way, a preformed wedge is formed even in the static state.

Moreover, the contact between the shaft and each trailing edge of each of the pads 32 collectively maintains the shaft center in the proper position. Thus, a hydrodynamic effect occurs immediately upon start up while at the same time the shaft is properly centered and shaft run out does not occur. Thus, this hydrodynamic bearing, unlike known hydrodynamic bearings, can be used in applications where shaft float is unacceptable such as, for example, a mechanical face seal of the gap type. The advantages of hydrodynamic bearings versus rolling element type bearings are set forth above. An additional important advantage occurs at high speed where rolling element bearings are subject to rapid wear, but hydrodynamic bearings perform without wear because there is no shaft-to-pad contact.

The particular bearing construction shown in FIG. 1C includes two types of pads support structures. This provides a wide range of support conditions. It should be understood, however, that bearings could be designed such that each of the pads are supported in the same way. If shaft centering is required, then each support structure should be designed like the support structure of the bearing pads 32 such that the pivoting caused by static load occurs beyond the trailing edge of the pad in the manner shown in FIG. 1C so that under static loading the pads are moved to that only their trailing edge contacts the shaft. This ensures that a preformed wedge is formed and at the same time properly centers the shaft.

The thrust bearings of the present invention can also be designed to provide a statically loaded wedge. In order to provide a statically loaded wedge, the support structure for the bearings is designed such that the bearing pads slope toward the shaft from the radially inner circumferential edge of the bearing pad to the radially outer circumferential edge of the bearing pad. Further, the support structure is designed such that the bearing pad slopes toward the shaft from the radially extending leading edge to the trailing edge. In this way, a statically loaded wedge approximating the optimum wedge is formed. Further, the pad is sloped toward the shaft at the outer circumferential edge so as to provide the desired fluid retaining characteristic. The stiffness of the support structure can also be designed such that an appropriate space in between the pads and shaft is established instantaneously upon rotation of the shaft.

Alternatively, the bearing may be designed such that the entire bearing pad contacts the shaft portion to be supported when the shaft is at rest. This aspect of the present invention is particularly useful in high volume production of the bearings and with bearings using gas lubricating fluids because it allows a much larger variation of machining tolerances. In one example, a 0.003 inch variation can be designed to have an insignificant impact on the wedge whereas conventional machining of known gas bearings require 0.00000x tolerance which can only be attained through the use of sophisticated and expensive machining techniques such as micro inch machining via etching.

In accordance with another aspect of the present invention, the relationship between fluid stiffness and spring rate can be used to provide a self adjusting characteristic to a simple continuous conical combined radial/thrust bearing. Heretofore, the greatest difficulty in getting a simple continuous conical surface combined radial/thrust bearing to work has been the need for precise adjustment and tolerances. The present invention provides a self adjusting radial/thrust bearing which obviates these disadvantages.

The radial/thrust bearing arrangement includes a shaft having a conical runner. The runner may be formed as a part of the shaft or formed separately and rotatably secured to the shaft. The bearing has a continuous conical surface which is similar, but not complimentary to the runner's surface since a complimentary surface would tend to seize. Generally, the bearing surface has a slightly greater diameter than the runner.

The bearing is biased toward the runner by a spring having a predetermined spring characteristic. A hydrodynamic fluid is located between the surface of the shaft runner and the bearing pad surface. The fluid has a calculable fluid film stiffness or spring characteristic. This fluid film stiffness acts in opposition to the force applied by the spring.

When the shaft is at rest, the spring pushes the bearing into contact with the shaft runner. Because the bearing and runner have different shapes this contact occurs along a single line (if the cone angles are equal) or discrete points. Fluid, preferably either air or liquid a lubricant such as oil, fills the remaining space between the runner and bearing. As the shaft begins to rotate, the pressure and stiffness of the fluid increases. Under normal operating conditions, the fluid film has a calculable stiffness when the shaft is at rest. By selecting a spring which has a constant stiffness which is greater than the stiffness of the fluid film when the shaft is at rest, but less than the fluid film stiffness under normal operating conditions, automatic adjustment is achieved. Specifically, when the shaft speed begins to approach normal operating conditions, the fluid film stiffness becomes greater than the spring stiffness, the bearing moves away from the shaft runner until an equilibrium position is reached. At equilibrium, the fluid stiffness is equal to the spring stiffness, the bearing is spaced from the shaft runner and the shaft is supported on a fluid film.

The spring force may be applied by separate washer or coil spring, a separate or integral elastic member or, in the case of the moving support structure bearings of the present invention, an integral beam-like support structure.

In accordance with one aspect of the present invention, it is possible to provide a self adjusting bearing construction in which the bearing surface is in contact with the shaft surface when the shaft is at rest, but the two surfaces are forced apart by a pressurized fluid film when the shaft rotates under normal operating conditions. This is achieved by designing the bearings such that the force tending to push the shaft and bearing surfaces together is less than the counteracting stiffness of the fluid under normal operating conditions. This principle is applicable to multiple pad bearings or continuous surface bearings.

Figure 53:
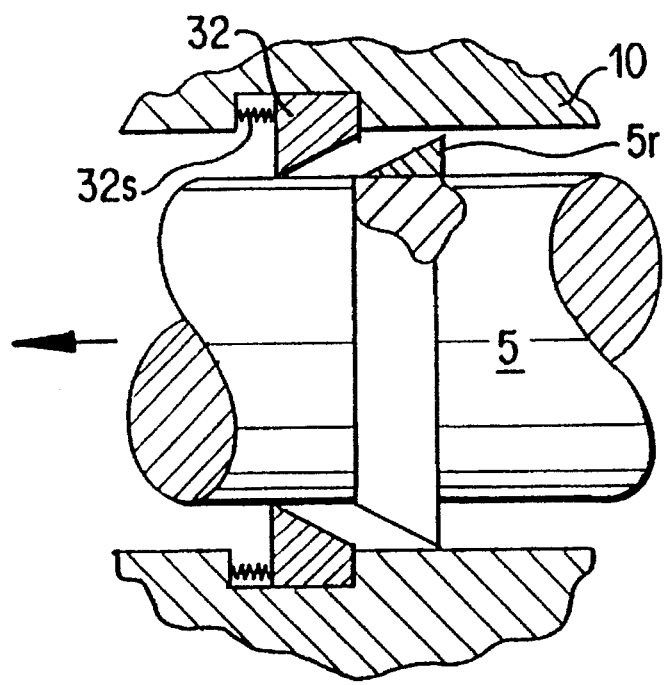
FIG. 53A is a side view, partially in section, of a self-adjusting continuous combined radial/thrust bearing arrangement according to the present invention.
FIG. 53B is a somewhat schematic perspective view showing the relationship of the bearing to the shaft and runner of the combined radial/thrust bearing arrangement of FIG. 53A.
FIG. 53C is a side view, partially in section, of another continuous self-adjusting combined radial/thrust bearing arrangement according to the present invention.
FIG. 53D is a somewhat schematic perspective view showing the relationship between the shaft and runner and the combined radial/thrust bearing of FIG. 53C.
Figure 53:
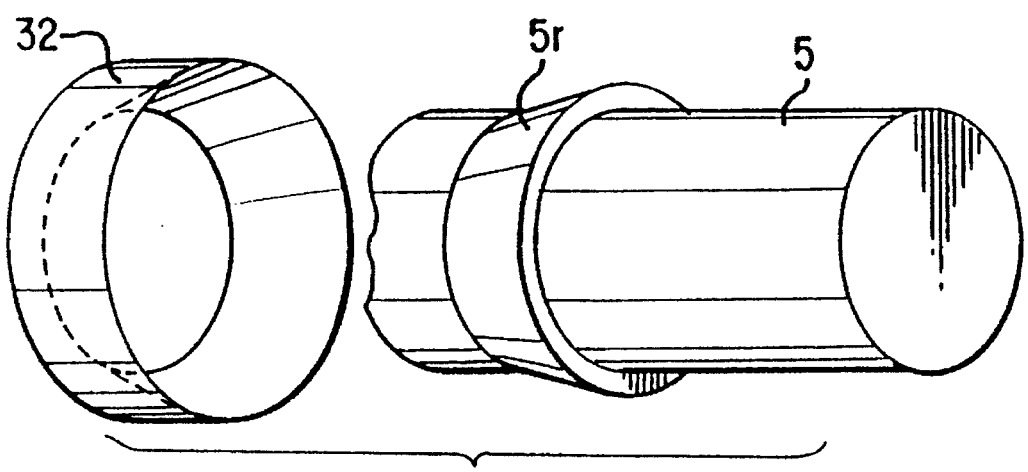

One useful embodiment of this aspect of the present invention is illustrated, somewhat schematically, in FIGS. 53A–53D. Specifically, FIGS. 53A and 53B show a simplified combined radial/thrust support arrangement in which a conically shaped runner 5r is secured to a shaft 5 and a bearing 32 having a conical face is mounted in a housing 10 to support the runner 5r and hence the shaft 5 in both the radial and thrust direction. The bearing 32, for purposes of the illustration, is a simple continuous conical surface. The bearing 32 is typically tapered at the same angle as the runner 5r but is slightly larger so that, at rest, the bearing and runner are eccentric and a wedge shaped space is formed between them. Moreover, when the surfaces contact, they contact along a single line with a converging wedge shaped space extending from each side of the line of contact. The bearing 32 is biased toward the runner 5r by spring 32s. At rest, the surface of the bearing 32 is in contact with the conical surface of the shaft runner 5r. The two surfaces are pressed against one another by the force of the spring 32s and any gravity force. As the shaft 5 begins to rotate, the stiffness of the hydrodynamic fluid increases until the stiffness of the fluid exceeds the force of the spring 32s acting to push the surface of the bearing 32 into contact with the surface of the shaft runner 5r. At that point, the fluid forces the surfaces apart against the bias of the spring 32s and any additional forces until an equilibrium is reached and the shaft runner 5r and shaft 5 are supported on a film of pressurized fluid.

Figure 53C:
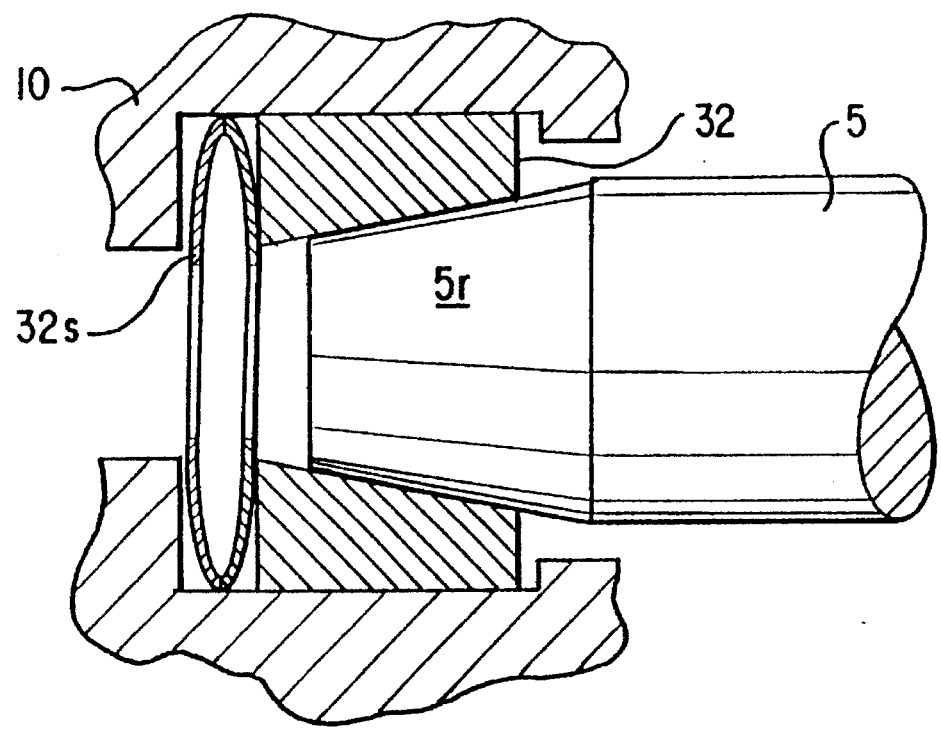
Figure 53D:
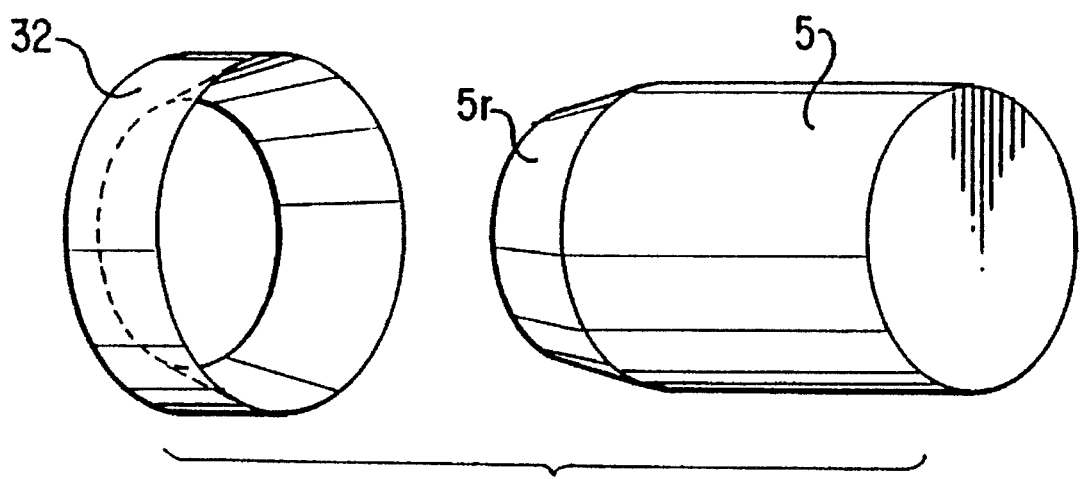

FIGS. 53C and 53D show a combined radial/thrust support arrangement which is similar to that of FIGS. 53A and 53B. However, in this arrangement, the runner 5r is formed at the end of the shaft 5 as shown in FIGS. 53C and 53D. Additionally, the spring in this case is a Belleville type spring washer. The operating principles are the same.

The advantage of such a self adjusting system is that there is no need to maintain close tolerances since the fluid itself balances with the spring force 32s and the other forces to assure proper spacing between the surface of the bearing 32 and the surface of the shaft runner 5r. In arranging for a operable balance of spring force versus fluid film stiffness, there are several constraints. For instance, once the fluid to be used is known, the stiffness characteristics of that fluid are fixed since they are physical characteristics. In such a case, the balance must be provided for by selecting an appropriate spring stiffness. The spring force can be provided by any known spring such as a Belleville (initially coned) spring, a spring washer and an elastomeric cushion or, as discussed herein, a beam-like support structure. In FIG. 53A, the spring 32s is indicated schematically as a helical spring. In FIG. 53C, the spring is indicated as a Belleville or initially coned spring. Regardless of the specific type of spring selected, the spring can be designed using known principles to have the necessary spring characteristic to operate as described above. In this way, a very simple and reliable combined radial and thrust bearing arrangement can be provided. Naturally, these principles may be applied to more sophisticated bearing constructions as discussed below.

In small quantities, the bearings disclosed herein are preferably constructed by electrical discharge machining or laser cutting methods. The double lines shown in the drawings are the actual paths of the wire or beam which is typically 0.002–0.060"(0.50–1.52 mm) in diameter. The lubricant that flows into the electrical discharge machined paths acts as a fluid dampener that reduces any vibration or instability at resonant frequencies. In the situations described above where a continuous cylindrical membrane is formed, the damping takes the form of a dash pot that exhibits high damping characteristics. A significant consideration in the design is that the support structure length and direction be oriented to provide the inward movement shown in FIG. 3. Also, minute movements of the pads themselves in the direction of load, as shown in FIG. 9, result in eccentricity changes which further improve bearing performance. It is noted that in Faires, Design of Machine Elements, the distance between the center of the bearing and the center of the shaft is called the eccentricity of the bearing. This terminology is well known to those skilled in bearing design. With the novel approach of tuning or modifying the stiffness of the bearing configuration or structure and particularly the beam to suit a particular bearing application, optimum performance is readily obtained. Recent computer analysis has demonstrated that virtually any stiffness or movement may be accomplished.

As noted above, when manufacturing low volumes or prototypes of the bearings of the present invention, the bearings are preferably constructed by electrical discharge machining or laser cutting methods. Such small volumes or prototypes are usually constructed of metal. However, when higher volume production of a particular bearing is contemplated, other methods of manufacture such as injection molding, casting, powdered metal die casting and extrusion are more economical. In connection with such manufacturing methods, it may be more economical to employ plastics, ceramics, powdered metals or composites to form the bearings of the present invention. It is believed that methods such as injection molding, casting, powdered metal die casting with sintering and extrusion are sufficiently well known that the processes need not be detailed herein. It is also believed that once a prototype bearing is constructed, the method of producing a mold or the like for mass production of the bearing is well known to those skilled in the molding and casting art. Moreover, it is to be understood that only certain types of the bearings of the present invention are adapted to be made in high volumes through extrusion. Generally, these are the bearings that are formed only through the provision of circumferential grooves and radial and circumferential cuts or slits which extend axially throughout the entire bearing, i.e., those bearings having a constant or otherwise extrudable cross-section.

In accordance with another aspect of the present invention, a novel investment casting method has been found to be particularly useful in the manufacture of intermediate quantities, e.g., less than 5,000 bearings. In accordance with this method of manufacture, the first step of the investment casting procedure is manufacture of a prototype bearing. As discussed above and detailed below, the prototype can be manufactured in any number of ways, but is preferably manufactured by machining a piece of heavy walled tubing or similar cylindrical journal. In larger bearings, the cylindrical journal typically is machined using a lathe for forming face and circumferential grooves, and a mill for forming axial and radial bores. In machining smaller cylindrical journals, techniques such as water-jet cutting, laser and wire electrical discharge techniques are generally more suitable. However, in either application, the journals are typically turned and milled to form the larger grooves.

After the prototype bearing is formed, it may be desirable to test the prototype to confirm that the bearing functions in the predicted manner. As a result of such testing, it may be necessary to modify and refine the prototype to obtain the desired results.

Once a satisfactory prototype is obtained, a rubber mold of the prototype is formed. Typically, this step involves encasing the prototype in molten rubber and allowing the rubber to harden so as to form a rubber mold of the prototype. The rubber encasing the prototype is then split and the prototype is removed to yield an open rubber mold.

Once the rubber mold is obtained, it is used to form a wax casting. This step typically involves pouring molten wax into the rubber mold and allowing the wax to harden to form a wax casting of the bearing.

After the wax casting is obtained, it is used to form a plaster mold. This step typically involves encasing the wax casting and plaster, allowing the plaster to harden around the wax casting so as to form a plaster mold.

The plaster mold can then be used to form a bearing. Specifically, molten bearing material, such as bronze, is poured into the plaster mold so as to melt and displace the wax casting from the mold. Thus, the plaster mold is filled with molten bearing material and the melted wax is removed from the plaster mold.

After the molten bearing material is allowed to harden, the plaster mold is removed from around the bearing and a bearing is obtained.

Because this method of manufacture involves the sacrifice of a wax casting, it is known as investment casting or sacrificial casting.

Despite the fact that the investment or sacrificial casting method described above involves sacrifice of a wax casting and the production of both rubber and plaster molds, and is quite labor intensive, it has proven to be cost effective when intermediate quantities, e.g., less than 5,000 units, of a particular bearing are required. The cost effectiveness of this procedure for lower quantity bearing requirements is due to the fact that the molds used in this method are far less expensive to produce than the complex mold required for injection molding or powdered metal casting.

As noted above, the first step in the investment casting method, indeed in any method, of producing bearings in accordance with the present invention is the production of a prototype bearing. In accordance with another aspect of the present invention, the relatively complex journal and thrust bearings of the present invention can be formed using simple manufacturing techniques. Similar techniques are used for both thrust and journal bearings.

With the foregoing in mind, it is believed sufficient to describe the method of making a single journal bearing through the use of electrical discharge manufacturing and machining. It is believed that a description of such manufacture demonstrates the ease with which the relatively complex bearing shapes of the present invention can be achieved.

Each bearing is initially in the form of a cylindrical blank having a cylindrical bore as shown in FIGS. 11A and 11B. The blank is then machined to provide a radial lubricating fluid groove as shown in FIGS. 12A and 12B. For certain applications, it is desirable to further machine the blank to include facing grooves which are preferably symmetrically disposed on the radial faces of the bearings as shown in FIGS. 13A and 13B. The provision of such facing grooves ultimately results in a bearing which is easily torsionally moved. While the groove shown in FIGS. 13A and 13B are cylindrical, it is possible to provide tapered grooves as shown in FIGS. 14A and 14B. As will become evident below, this yields a bearing which exhibits improved movement characteristics by virtue of the angled alignment of the support beams. In this context, it should be noted that it is preferable that the support beams as viewed in FIG. 14A are tapered along lines which converge at a point proximate the center line of the shaft. This ensures that flexibility occurs about the shaft center line by establishing a center of action for the entire system such that the pads may adjust to shaft misalignment. In essence, the tapering of the support beams causes the bearing to act in a manner similar to a spherical bearing by concentrating the support forces on a single point about which the shaft may pivot in all directions to correct any misalignment. The arrows in FIG. 14A illustrate the lines of action of the movement.

Bearings having cross sections of the type shown in FIGS. 12A and 14A are particularly effective at retaining the hydrodynamic fluid. This is because the bearing pad is supported proximate the axial ends of the bearing pad and the central portion of the bearing pad is not directly supported. By virtue of this construction, the bearing pad is supported so as to deform under load to form a fluid retaining concave pocket, i.e. the central portion of the bearing pad moves radially outward. This greatly decreases fluid leakage. Naturally, the degree of pocket formation depends of the relative dimensions of the bearing pad and support structure. A larger fluid retaining pocket could be obtained by providing a thinner bearing pad surface and supporting the pad surface at the extreme axial ends of the bearing pad.

After the cylindrical blank is properly machined as shown in FIGS. 12A and 12B, FIGS. 13A and 13B, or FIGS. 14A and 14B radial and/or circumferential slits or grooves are formed along the radial face of the machined blank to define the bearing pads, the beam supports and the housing. FIGS. 14C and 14D illustrate such grooves formed in the machined blank of FIGS. 14A and 14B. When manufacturing low volumes of the bearings or prototypes of the bearings for use in the construction of a mold, the cuts or slits are preferably formed through electrical discharge manufacturing or through the use of a laser. The machining of the cylindrical blanks to achieve the configurations illustrated in FIGS. 12A and 12B, FIGS. 13A and 13B, FIGS. 14A and 14B or a similar shape can be done through conventional machine tools such as a lathe or the like.

Although the foregoing discussion is specifically directed to journal bearings, the principles apply just as well to thrust bearings. For instance, the thrust bearing shown in FIGS. 15–18 can be formed by machining a section of heavy walled tubing to provide radially inner and outer grooves, facing grooves, axial bores, radial cuts and chamfers so as to define bearing pads and support structure.

The performance characteristics of the bearings of the present invention result from the relative shape, size, location and material characteristics of the bearing pads and the beam supports defined by the bores and cuts or slits formed in the machined blank. These parameters are largely defined by the dimensions and location of the radial circumferential bores, cuts or slits formed in the bearing in conjunction with the shape of the machined blank in which the bores or slits are formed to yield the bearing.

As noted above, while the construction of the bearings of the present invention is most easily understood by reference to the machining process, larger quantities are preferably manufactured through the investment casting method of the present invention, and even larger scale production of the bearings contemplated by the present invention could be more economically performed through injection molding, casting, powdered metal, die casting, extrusion or the like.

In extruding a large number of bearings from a pipelike cylindrical blank, radial lubricating fluid grooves, as shown in FIGS. 12A and 12B can be provided along the length of the pipe-like cylindrical blank prior to extrusion. However, if facing grooves were desired in the bearing, these can be individually defined after slicing the individual bearings from the extruded and machined blank. For this reason, extrusion might not be a preferred method of producing bearings which require facing grooves to enhance torsional flexibility.

To obtain variable pad geometry in a one-piece design using a single ligament supporting its pad, the ligament must be flexible enough that the pads rotating with the load imposed by the rotating shaft as shown in FIG. 1D. This characteristic, flexural rotation, distinguishes the present invention from other fluid film bearings. The capability of the pad to flex and rotate with the load allows cross coupling stiffness to approach zero as with a tilt pad bearing. This ensures stable operation. The web dimensions depend on the load being applied in a particular application and on other parameters which vary depending on the specific application and material construction of the bearing. The values for the rotational stiffness in a particular application are determined from a stability analysis where the stiffness is varied until a range is reached where the rotational flexibility provides performance comparable to tilt pad bearings. Tilt pad bearings tilt and build a pressure in the oil film which is symmetric around the shaft journal. The bearings of the present invention also tilt, but the tilt is not due to the rolling action as in standard tilt pad bearings. Instead, the tilt in the bearings of the present invention is due to the flexibility of the web section which allows the pad to rotate or tilt and accommodate the applied load. Although specific dimensions depend on the specific application the ligaments should as a rule be longer in the radial direction than they are wide in the circumferential direction.

Illustrative Example

Having described the method and apparatus of the invention, the following example will serve to illustrate the design of a movable-pad bearing according to the present invention with reference to FIGS. 59–68.

The performance characteristics of such radial bearings can be analyzed as discussed above in FIGS. 55 and 56. As illustrated in FIGS. 55 and 56, once the selected shaft position yields a calculation equilibrium force substantially equal to the specified load, stiffness coefficients $K_{xx}$, $K_{yy}$, $K_{xy}$ and $K_{yx}$ can be calculated.

Figure 59:
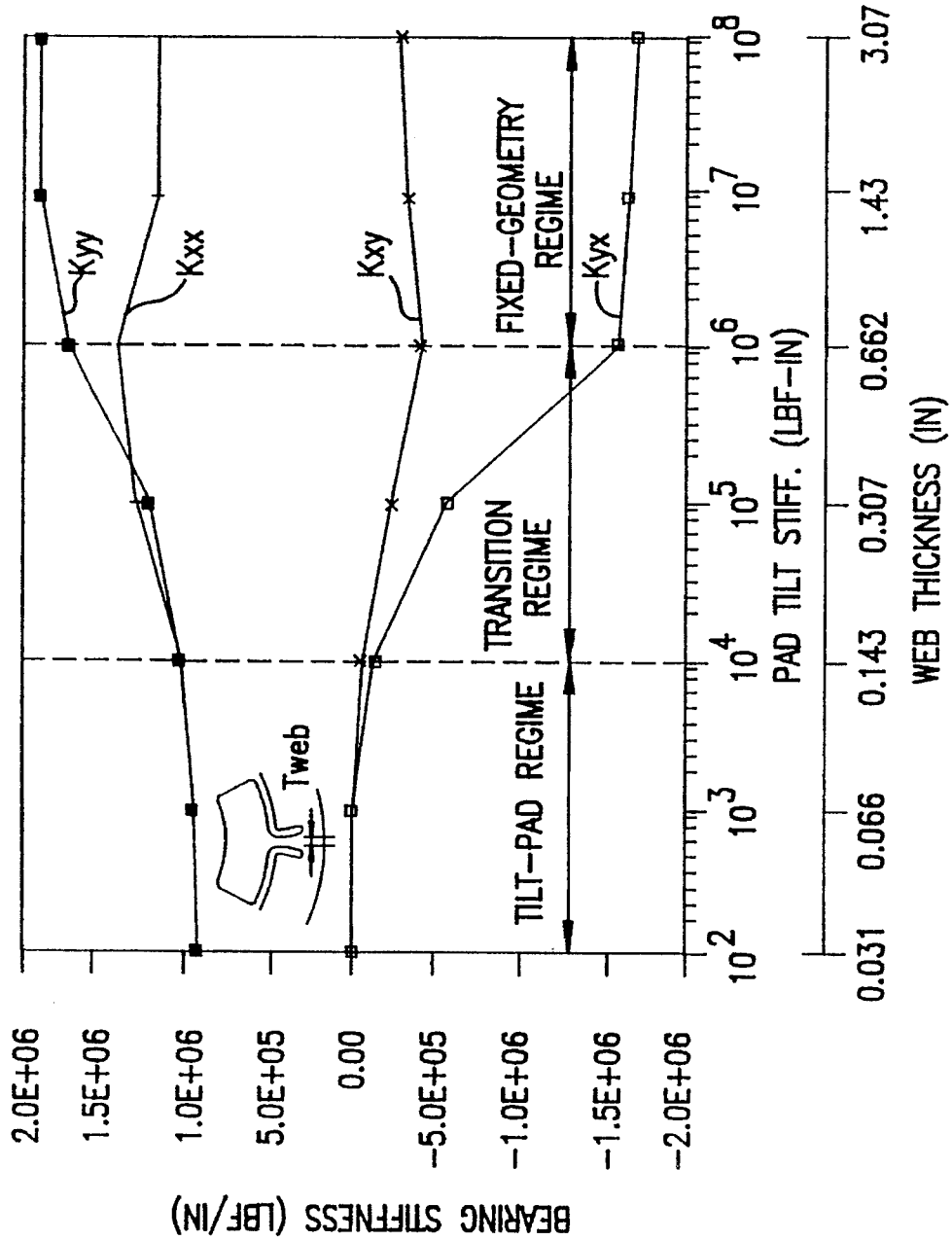

As shown in FIG. 59, the principle and cross-coupled stiffness coefficients of a four-pad radial bearing design, similar to that shown in FIG. 1A, vary with pad tilt stiffness. The data presented are for a four-pad bearing having a diameter of 3.0 inches, a length of 2.25 inches, a pad arc length of 80°, an offset of 0.5 and a preload of 0.3 operating at 10,000 RPM with ISO 32 oil having an inlet temperature of 120° F. under a load of 100 lbf.

As tilt stiffness drops, the cross-coupling terms asymptotically approach zero, which, by definition, yields tilt-pad behavior. At high pad tilt stiffnesses, the cross-coupling coefficients asymptotically approaches high negative fixed-geometry values, giving the much lower stability that is characteristic of fixed-geometry bearings. The principle coefficients vary slightly from the asymmetric (unequal) fixed-geometry values, to symmetric (equal) values that are characteristic of a tilt-pad bearing with load between pads.

Figure 60:
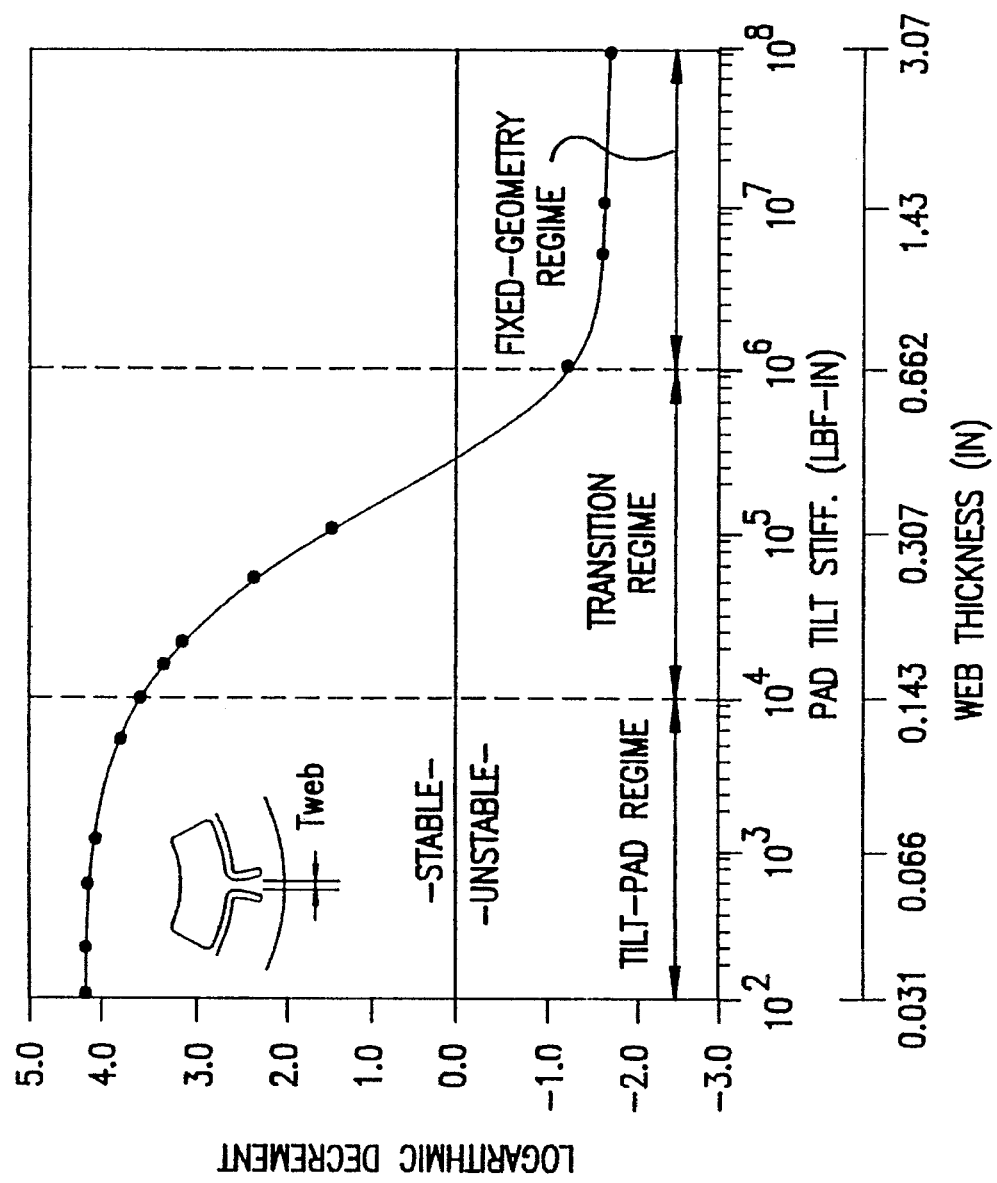
Figure 61:
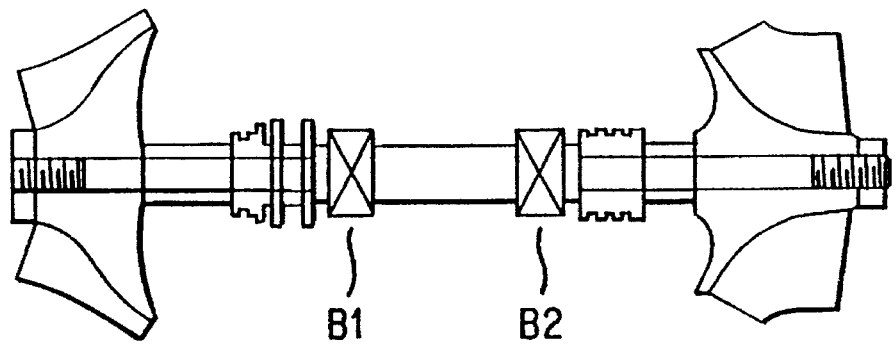

The relative stability of various web thicknesses may be illustrated through a simplified stability analysis which models the rotor as a lumped mass orbiting inside the bearing. While not comparable to the comprehensive flexible-rotor stability computation to follow, such a simplified stability analysis is very useful for assessment of relative performance between different bearing designs. FIG. 60 illustrates the bearing stability logarithmic decrement for a 1,000 lb mass revolving at 1,000 RPM inside the above four-pad bearing under varying pad tilt stiffness.

As shown in FIG. 60, the movable pad bearing exhibits unstable fixed-geometry performance with high tilt stiffness, and stable tilt-pad performance at low tilt stiffness. Intermediate stiffnesses reflect transition from fixed-geometry behavior to tilt-pad behavior. In this case, the fixed-geometry behavior results from tilt stiffnesses above approximately 1,000,000 lbf-in, while tilt pad behavior occurs below values of around 10,000 lbf-in. With careful design optimization, the web thickness can be chosen low enough to exhibit tilt-pad stability without becoming overstressed from shaft loads or tilt stresses. The tilt-stresses are low because of the very small tilt angles (less than 0.1 degree) traversed by the pads during operation.

Once additional data is known concerning the rotor design, a more in-depth stability study can be conducted. As an illustration, high-speed compressor requiring bearings with maximum stability characteristics is shown schematically in FIG. 61. B1 and B2 denote first and second bearings, respectively. The rotor type is a high-speed double overhung air driven turbocompressor; the maximum running speed is 135,000 RPM; the impeller diameter is 90 mm (3.5 in); the rotor weight is 2.1 lb.; the rotor length is 8.7 in; and the bearing span is 1.9 in.

The 90 mm turbo-compressor rotor is very lightweight and runs at relatively high speeds, making it inherently susceptible to bearing-induced rotordynamic instability. This requires that the rotor be equipped with bearings of a highly stable design to preclude subsynchronous whirl at higher operating speeds. In addition, it is desirable to improve shaft centering which allows for lower clearances and improves machine efficiency.

In such applications, a bearing design is needed to maintain or improve the stability characteristics of the original bearings, while also providing better shaft centering characteristics. A practical solution is the use of a set of movable-pad bearings that will minimize the destabilizing cross-coupling effects and also provide the needed positive-centering effects through cantilevered secondary pads. A three-pad positive-centering movable-pad bearing appropriate for this application is shown in FIG. 1C.

The three cantilevered centering pads 32 begin at zero clearance and expand at operating speed under hydrodynamic pressure to a larger operating clearance. The larger centrally-pivoted pads 31 offer low pivot rotational stiffness and high radial stiffness to attenuate unbalance response and maintain stability. A parametric study of the movable-pad bearing design geometry can be conducted using the method of the present invention to optimize the bearings for maximum stability, maximum critical speed margins, and minimum unbalance response sensitivity.

Figure 62:
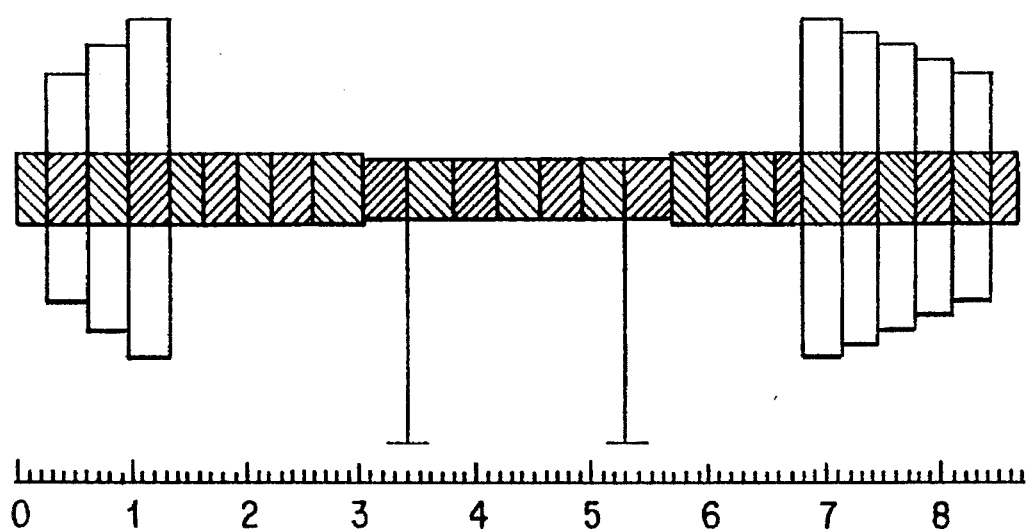
Figure 63:
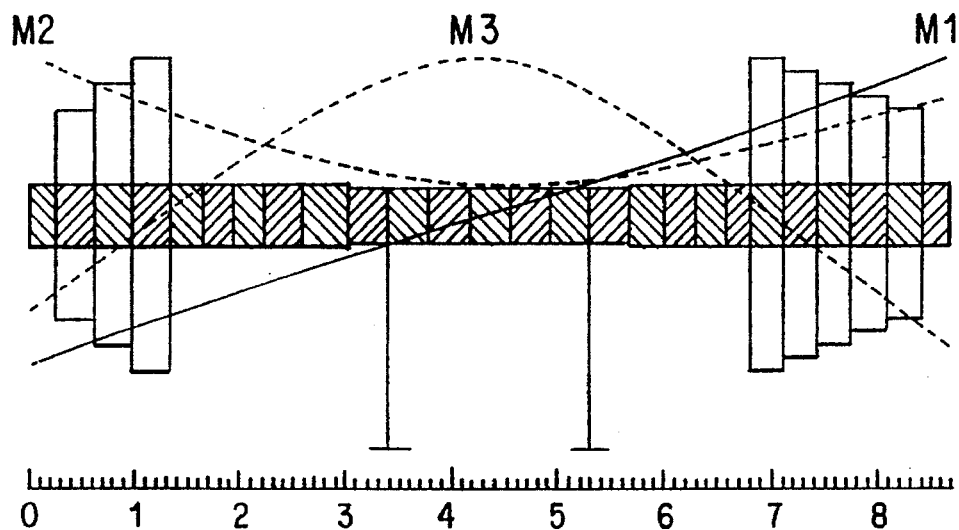
Figure 64:
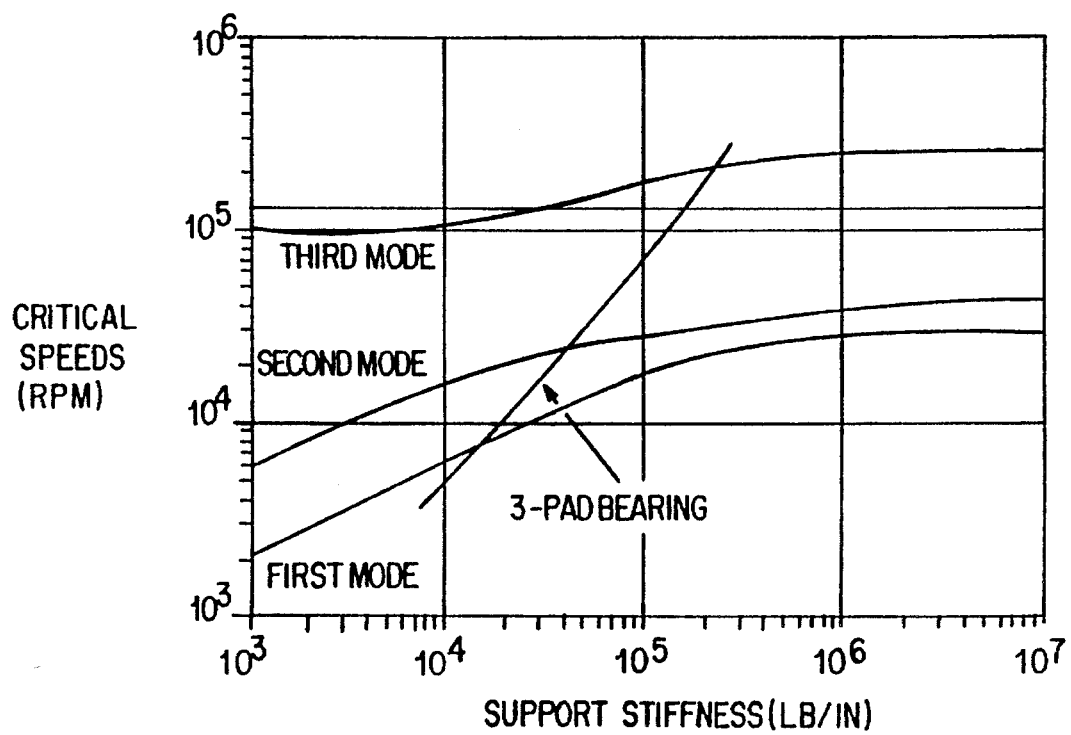

FIG. 62 shows a cross section of the rotor model used in the rotordynamic analyses. The scale is in inches and the supported vertical lines represent bearing placement. This model assumes first and second bearing end overhangs of 3.41 inches and 3.37 inches, respectively, and first and second bearing reactions of 0.6 lb and 1.4 lb, respectively. FIG. 63 shows the first, second and third computed undamped modeshapes M1, M2 and M3, respectively. FIG. 64 shows the undamped critical speed map of the rotor model.

The first undamped critical speed (shown in FIG. 64) occurs at approximately 8,000 RPM and has classic rigid rotor conical mode shape (shown in FIG. 63) typical of double overhung machines with short bearing spans. Because nearly all of the modal compliance is in the bearings, rather than in the shaft, the bearing damping is a high percentage of the critical damping, making this a well attenuated mode that is relatively insensitive to unbalance. The amplification factor from the forced response analysis is only 1.0, thus eliminating any unbalance response concerns passing through this critical speed. Since nearly all of the modal stiffness is in the bearings, the first mode is also highly sensitive in both frequency and amplitude to bearing stiffness changes. At 8,000 RPM, this mode is very adequately removed from the running speed of 135,000 RPM for resonance considerations.

The second undamped critical speed occurs at approximately 25,000 RPM and has a "C" mode shape, making it the first flexible rotor mode. Unlike the first mode, the second critical speed is characterized by significant shaft bending, making it less damped than the first mode, and much less sensitive to bearing changes. This is because the bearing damping is now a smaller percentage of the critical damping, yielding a higher amplification factor of 1.6 and a greater unbalance response. Since the bearing modal participation is lower, this mode is less sensitive in both frequency and amplitude to bearing stiffness changes. The generous separation between the second mode frequency at 25,000 RPM from running speed at 135,000 RPM eliminates unbalance response concerns at running speed. However, the higher unbalance sensitivity requires that care is taken to properly balance the rotor to prevent impeller rubs when passing through the second mode during startup and coastdown.

While similar in modeshape to the second mode, the third mode at 210,000 RPM is fundamentally different in nature because it is the first free-free flexible rotor mode, meaning that it is unaffected by bearing stiffness at low stiffness values. The high angular end displacements of this mode introduce high modal stiffness due to gyroscopics, and high modal mass due to rotary inertia. These make the bearing dynamic stiffness ineffective at low stiffness values, resulting in free-free rotor motion and high dynamic amplification factors. As the bearing stiffness is increased to around 10,000 lbf/in, this mode becomes susceptible to bearing stiffness and is raised in frequency like the other modes. Fortunately, at the actual frequency-dependent stiffnesses of the 3-pad bearings (shown in FIG. 64), the third mode is raised well above the maximum operating speed of 135,000 RPM, making it inconsequential if the rotor does not experience excessive overspeed.

A complete flexible rotor stability analysis can also be performed to further optimize the flexure-pivot bearings for assured rotordynamic stability. This involves computation of damped natural frequencies and corresponding logarithmic decrements at the maximum rotor operating speed for a range of bearing- dimensions that are varied parametrically until maximum log decrements (stabilities) are achieved.

The stability rotor model is the same as the forced response model, with speed-dependent bearing coefficients, gyroscopics, and rotary inertia effects. Two additional cross-coupling terms may be added to include the effects of aerodynamics in the compressor and turbine blades and seals. For a single stage compressor, the aerodynamic cross-coupling may be estimated (approximately) as:

$Kxy = -Kyx = \delta T/2 Rh$ where:

T=torque (lbf-in)

R=Blade mean radius (in)

h=blade axial length at tip (in)

$\delta$=cross-coupling factor (20 for high-speed single stage compressor).

Figure 65:
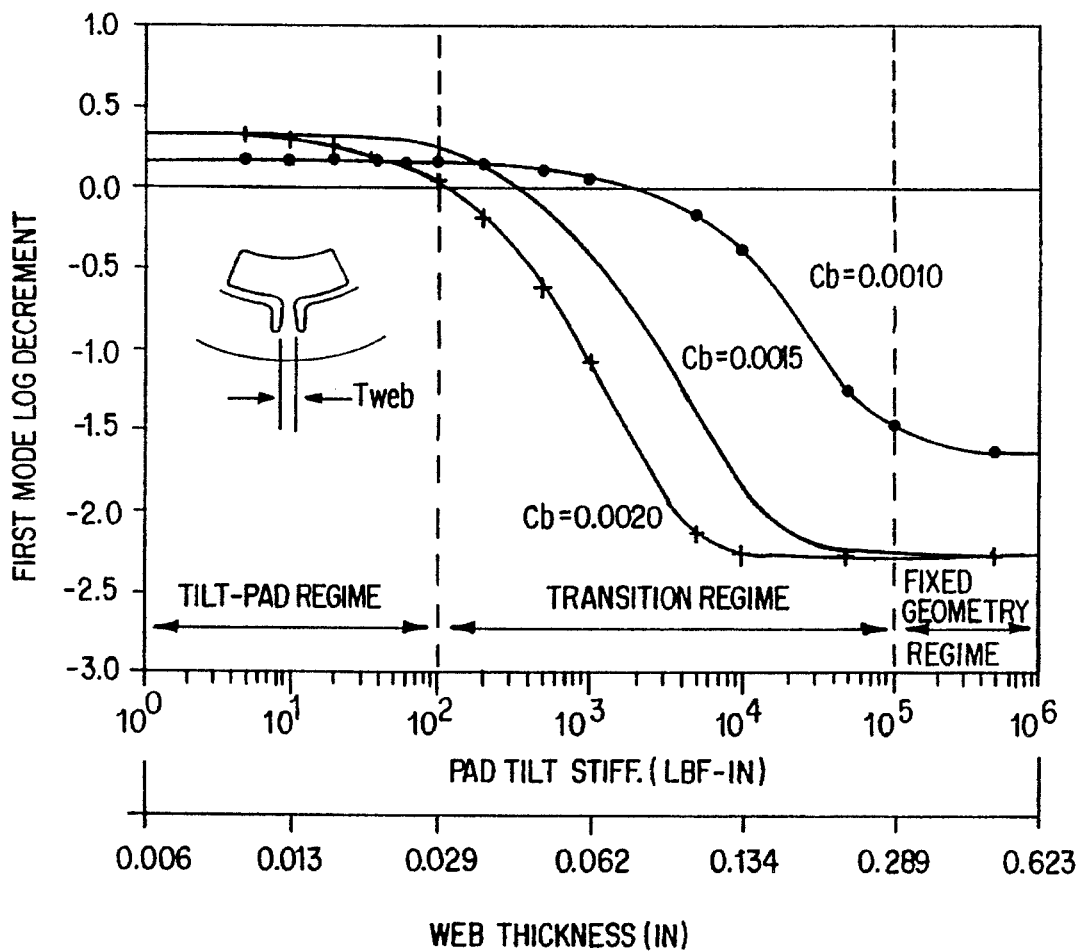
Figure 66:
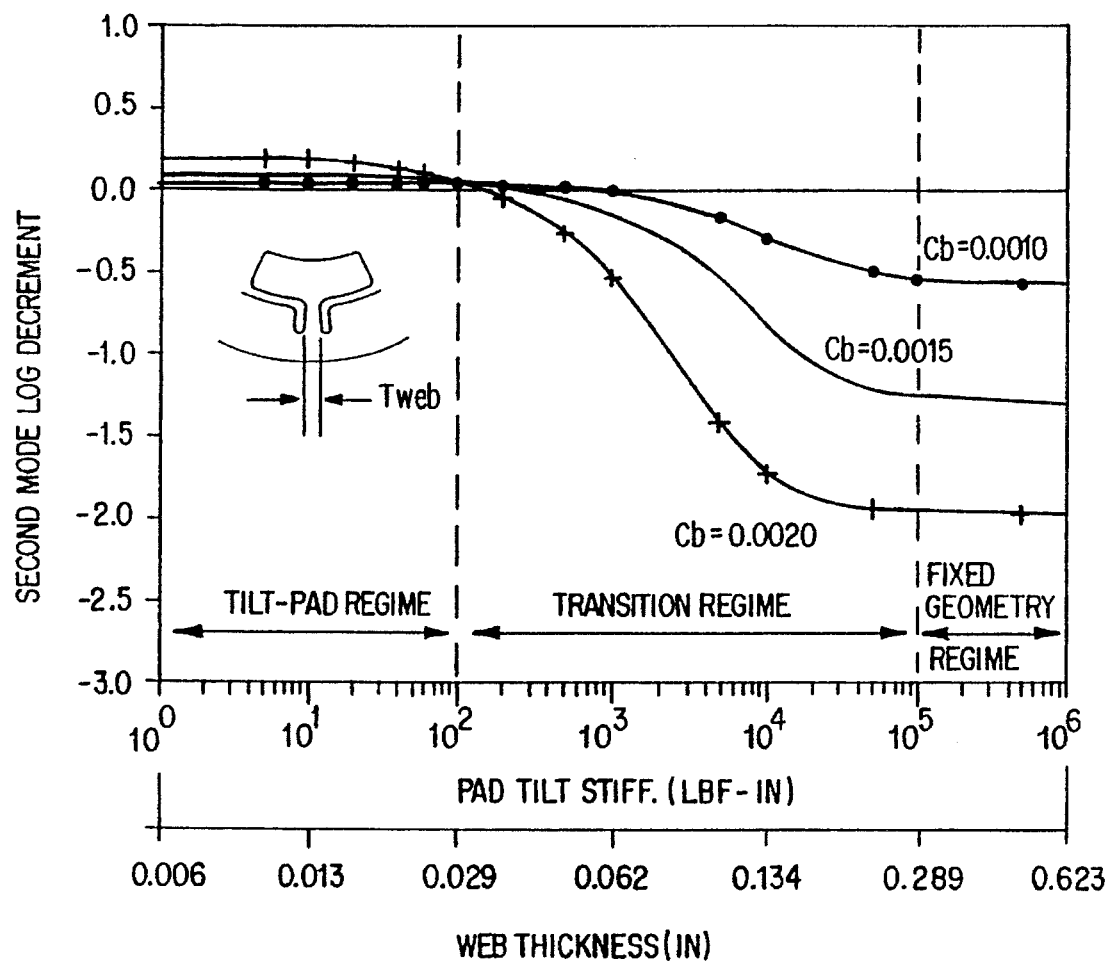

For the 90 mm compressor running at 135,000 RPM and 120 hp, the aerodynamic cross-coupling per impeller becomes $Kxy = Kyx = 20 \times (56.2 \text{ lbf-in})/((2) \times (1.8 \text{ in}) \times (0.5 \text{ in}))$
$= 624.0 \text{ lbf/in}$ FIGS. 65 and 66 show the first and second mode computed logarithmic decrements versus pad tilt stiffness for three bearing radial clearances. In these figures, bearing diameter is 0.55 inches, bearing length is 0.5 inches, pad arc length is 70° offset is 0.5, preload is 0.4, and oil viscosity is $5 \times 10^{-6}$ Reyns. Rotor stability is computed at running speed (135,000 RPM). The computed logarithmic decrements must be positive for stable operation, and should generally be above 0.2 for flexible rotors.

As expected, the logarithmic decrements are negative (unstable) for high pad tilt stiffnesses that yield fixed-geometry behavior. As tilt stiffness is decreased, the logarithmic decrements increase asymptotically to three respective positive values that all reflect the stable behavior of a tilt pad bearing. Smaller bearing clearances (Cb) improve stability in the fixed-geometry regime, while larger bearing clearances appear to be better in the tilt-pad region.

Optimum bearing geometry requires a tradeoff between a thick web to support shaft loads, and a thin web to maximize stability. In this case, the shaft weight and unbalance loads are low enough to allow a relatively thin web of 0.020 inches that satisfies both. Table I summarizes the parametric study that reveals the optimum web thickness for an assumed (conservative) shaft unbalance load of ten times the static load (10.0 lbf). Also, for conservatism, the entire 10 lbf load is assumed to be carried by a single pad, rather than shared between several pads as would actually happen. Values shown are for a radial clearance of 0.0020 inches.

TABLE I

BEARING OPTIMIZATION SUMMARY

| CASE NUMBER | WEB THICKNESS (INCHES) | PAD ROTAT. STIFFNESS (LBF-IN) | RADIAL STRESS (PSI) | FIRST,SECOND LOG DECREMENTS | |
|---|---|---|---|---|---|
| 1 | 0.040 | 270.0 | 500.0 | −0.30, | −0.01 |
| 2 | 0.035 | 180.0 | 571.4 | −0.15, | 0.00 |
| 3 | 0.030 | 112.0 | 666.6 | 0.00, | 0.05 |
| 4 | 0.025 | 66.0 | 800.0 | 0.25, | 0.10 |
| 5 | 0.020 | 33.0 | 1000.0 | 0.28, | 0.18 |
| 6 | 0.015 | 14.0 | 1333.0 | 0.30, | 0.20 |

Since the logarithmic decrements become satisfactory for web thicknesses below 0.020 inches, and the corresponding unbalance stress of 1,000 psi is also negligible for a 0.020 inch web, the optimum web thickness becomes that of case number 5 in Table I. It will be shown below that the tilt-induced stresses in the 0.020 inch web are also inconsequential.

Other bearing parameters were similarly optimized and are provided in Table II. Table II lists the bearing design parameters for the optimized movable-pad bearings. The movable-pad bearings are installed in the load-betweenpad orientation. The final web thickness and radial clearance are 0.020 in and 0.002 in, respectively. A relatively high viscosity oil (1000 SSU @100 F) is used by the customer, requiring an oil flowrate of approximately 1.2 gpm per bearing to carry away the generated heat. The only difference between the turbine and compressor ends is the static gravity loading.

TABLE II

SUMMARY OF MOVABLE PAD BEARING GEOMETRY

|  | COMPRESSOR END | TURBINE END |
|---|---|---|
| Nom. Shaft Dia. (in) | 0.550 | 0.550 |
| Bearing-Length (in) | 0.50 | 0.50 |
| Length/Diameter Ratio | 0.91 | 0.91 |
| Min. Web Thickness (in) | 0.020 | 0.020 |
| Primary Pad Arc (deg) | 70.0 | 70.0 |
| Secondary Pad Arc (deg) | 20.0 | 20.0 |
| Nominal Diametral Clearances (mils): |  |  |
| Bearing Cl. | 4.0 | 4.0 |
| Pad Cl. | 6.6 | 6.6 |
| Preload | 0.4 | 0.4 |
| Static load (lbf) | 0.6 | 1.4 |
| Unit Load (psi) | 2.2 | 5.1 |
| Oil Type | 1000 SSU @ 100 F. | 1000 SSU @ 100 F. |
| Inlet Temp. (dF) | 100 | 100 |
| Inlet Press. (psig) | 60 | 60 |
| Reqd. Flowrate (gpm) | 1.2 | 1.2 |

Maximum possible pad tilt rotation occurs when the shaft is forced radially between two pads to its maximum dry-bearing eccentricity as shown in FIG. 67. The resulting pad rotation is a conservative upper bound for the actual (lower) oscillatory pad rotations that occur in response to the orbital journal motion. Therefore, if the upper-bound web stresses in the dry bearing can be shown to be acceptable, then the actual operating stresses that occur as the shaft orbits (from unbalance) at a much lower amplitude are assured to be inconsequential.

A geometric analysis gives the pad tilt rotation as:

$$\Theta_T = ACOS\left[\frac{(R+C_b+t)^2 + (R+t)^2 - Y^2}{2(R+C_b+t)(R+t)}\right]$$

Where:

$\Theta_T$=Pad Tilt Rotation (deg)

Y=Shaft Sink (in)

=$C_b$/ cos ($\Theta_p$)

$C_b$=Bearing Radial Set Clearance (in)

$\Theta_p$=Pivot Angle From Vertical (deg)

R=Shaft Radius (in)

t=Pad Thickness (in)

For the 90 mm compressor having a shaft radius of 0.275 inches and a radial clearance of 0.002 inches, the maximum shaft sink becomes Y = 0.002 in/cos(60)

=0.004 in

This yields a maximum possible dry-bearing shaft eccentricity of

Ecc =Y/Cb

=0.004/0.002

=2.0

Substituting this into the expression for pad tilt rotation gives $$\Theta_T = ACOS\left[\frac{(0.275 + 0.002 + 0.1)^2 + (0.275 + 0.1)^2 - 0.004^2}{2(0.275 + 0.002 + 0.1)(0.275 + 0.1)}\right]$$

=0.53 deg

Therefore, the maximum possible induced web stresses are those corresponding to a 0.53 degree (dry bearing) pad rotation.

For an accurate assessment of the corresponding induced web stresses, the 0.53 degree pad tilt rotation was applied to the finite element model illustrated by the system of key points and line segments shown in FIG. 68. Subsequent stress analysis, calculated using FEA, indicates a maximum Von Mises stress of 35,000 psi. Since this is well under the yield stress for tempered Aluminum Bronze of 45,000 psi, there is no possibility of overstressing the pad web statically.

During operation, the pad tilt oscillations will be much lower than the 0.53 degrees computed above for the dry bearing. This is because operating shaft eccentricities from unbalance typically range from 0.05 to 0.05 , rather than the maximum possible dry-bearing eccentricity of 2.0 given above. Unbalance response computations indicate that the computed operating orbit amplitudes for the compressor with typical mass unbalance are approximately 0.000004 inches-peak, giving a shaft eccentricity of 0.000004/0.002= 0.002. For conservatism, assume the orbit amplitude to be ten times higher, or 0.00004 inches-peak. Substitution of this into a bearing analysis program gives the computed pad tilt angle as 0.068 degrees. Linear extrapolation of the induced static web stress yields the oscillatory web stress as sigma(oscillatory) = (0.068/0.53) × (35,000 psi)
= 4,480 psi The total dynamic stress induced in the pad web is the superposition of the 4,480 psi tilt stress and the 1,000 psi radial unbalance load stress given in Table I. To this dynamic stress, an additional static stress of approximately 4,000 psi from the hydrodynamic force induced by the pad preload must be carried. Adding these three together gives the total oscillatory web stress as

```
                       4,000 psi  (static)
    4,480 psi + 1000 psi +/- 5,480 psi  (oscillatory)
              = -1,480 psi to   9,480 psi  (oscillatory)
                       = 10,960 psi  (pk-pk)
```

With an aluminum, bronze, or similar tempered material, having an endurance stress capability near 36,000 psi, the 9,480 psi oscillatory stress becomes completely inconsequential. Therefore, the pad support web can safely withstand both the maximum static (35,000 psi) and maximum dynamic (9,480 psi) stresses without danger of either a yield or fatigue failure.

Thus, an embodiment of the present invention has been described wherein a specific bearing design is selected having a set of initial bearing parameters. A steady-state analysis can be conducted for the bearing design to determine principle and cross-coupling coefficients. Undamped mode shapes and critical speed maps can also be generated and forced response analysis can be performed, with bearing parameters selected to minimize unbalance response concerns. Using the above-generated coefficients, a complete flexible rotor stability analysis is also conducted. Bearing parameters are modified to provide maximum logarithmic decrement. A stress analysis is also performed to ensure that the maximum static and dynamic stresses do not exceed the limits of the bearing material, and the material or web geometry is accordingly adjusted if such limits are exceeded.

The present invention, therefore, provides for the optimization of bearing parameters. Using such performance characteristics as critical speed maps, mode shapes, forced response, stability and stress analyses as discussed above, bearing web thickness (or any other bearing parameter) can be selected to provide the most favorable bearing performance. Since all criteria are quantitatively defined, the above process is well suited for automated bearing optimization.

What is claimed is:

1. A method for designing a hydrodynamic bearing system comprising a hydrodynamic bearing for supporting a rotating shaft on a hydrodynamic fluid film, said bearing comprising a plurality of spaced bearing pads and a support structure for supporting said bearing pads, each of said bearing pads having a pad surface facing said rotating shaft, a support surface facing said support structure, a leading edge, a trailing edge and two side edges, said method comprising the steps of:

identifying operating conditions for said hydrodynamic bearing system;

identifying a range of acceptable steady-state behavior characteristics;

inputting the details of a bearing construction including a pad shape and support structure configuration to support the shaft under the operating conditions;

generating a multi-dimensional model of said bearing construction;

translating said multi-dimensional model of said bearing construction into a system of nodes appropriate for finite element analysis;

determining the movement characteristics of said hydrodynamic bearing construction through said finite element analysis by applying unit loads to selective nodes on said pad surface of said hydrodynamic bearing;

forming an influence coefficient matrix from said movement characteristics;

combining said influence coefficient matrix with a two-dimensional model of said hydrodynamic fluid film based on the Reynolds equation;

solving said combined matrix and model in an iterative fashion to determine the steady-state behavior characteristics of said bearing construction;

determining whether the steady-state behavior is acceptable; and modifying at least one of the pad shape and support structure if the steady-state behavior is not acceptable.

2. The method of claim 1, wherein a rotordynamic analysis is conducted for said hydrodynamic bearing system, said rotordynamic analysis comprising the steps of:

identifying a range of acceptable rotordynamic performance characteristics;

constructing a rotor model by replacing structural components of said hydrodynamic bearing system with springs and dampers at appropriate sections;

determining undamped critical speed maps and mode shapes from said rotor model;

determining damping coefficients by applying a velocity perturbation in said solving step and calculating a change in force from said velocity perturbation;

determining stiffness coefficients by applying a position perturbation in said solving step and calculating a change in force from said position perturbation;

applying said damping and stiffness coefficients to said springs and dampers;

performing forced response and stability analyses using said rotor model to determine the rotordynamic behavior of the bearing construction;

determining whether the rotordynamic behavior is acceptable; and modifying at least one of the pad shape and support structure if the rotordynamic behavior is not acceptable.

3. The method of claim 1, further comprising the step of providing for a temperature dependence within said two-dimensional fluid film model.

4. The method of claim 1, further comprising the step of providing for turbulence effects within said two-dimensional fluid film model.

5. The method of claim 1, further comprising the step of providing for cavitation effects within the said two-dimensional fluid film model.

6. The method of claim 1, wherein the step of modifying at least one of the pad shape and support structure comprises tapering the leading edge of the bearing pads.

7. The method of claim 1, wherein the step of modifying at least one of the pad shape and support structure comprises forming a recess in the support surface of the bearing pads.

8. The method of claim 1, wherein the step of modifying at least one of the pad shape and support structure comprises providing a cut in the support surface of the bearing pads, the cut extending between opposed edges of the bearing pad.

9. The method of claim 1, wherein the step of modifying at least one of the pad shape and support structure comprises providing a recess in the shaft support surface of the bearing pads.

10. The method of claim 1, wherein the step of modifying at least one of the pad shape and support structure comprises providing a single web-like ligament to support each bearing pad.

11. The method of claim 1, wherein the step of modifying at least one of the pad shape and support structure comprises providing a first beam for supporting each of the bearing pads and providing a second beam for supporting each of the first beams.

12. The method of claim 1, wherein the step of modifying at least one of the pad shape and support structure comprises providing a first beam for supporting each of the bearing pads and a single membrane for supporting all of the first beams and a plurality of circumferential beams supporting the membrane.

13. The method of claim 1, wherein the step of modifying at least one of the pad shape and support structure comprises providing at least two beams to support each bearing pad.

14. The method of claim 1, wherein the step of modifying at least one of the pad shape and support structure comprises providing at least one circumferentially extending beam to support each bearing pad.

15. The method of claim 1, wherein the step of determining whether the steady-state behavior is acceptable further comprises:

comparing the steady-state behavior of the bearing construction to the range of acceptable steady-state behavior characteristics and generating a first signal if the steady-state behavior characteristics of the bearing construction are within the range of acceptable steady-state behavior characteristics and generating a second signal if the steady-state behavior characteristics of the bearing construction are not within the range of the range of acceptable steady-state behavior characteristics.

16. The method of claim 15, further comprising the step of outputting in a readable format the details of the bearing construction in response to the first signal.

17. The method of claim 15, wherein the step of modifying at least one of the pad shape and support structure is carried out in response to the second signal.

18. An apparatus for designing a hydrodynamic bearing system comprising a hydrodynamic bearing for supporting a rotating shaft on a hydrodynamic fluid film, said bearing comprising a plurality of spaced bearing pads and a support structure for supporting said bearing pads, each of the bearing pads having a pad surface facing said rotating shaft, a support surface facing said support structure, a leading edge, a trailing edge and two side edges, wherein operating conditions and a range of acceptable steady-state behavior characteristics have been identified for the hydrodynamic bearing system and wherein a multi-dimensional model of a bearing construction has been generated, said apparatus comprising:

means for translating said multi-dimensional model of said bearing construction into a system of nodes appropriate for finite element analysis;

means for determining the movement characteristics of said bearing construction through said finite element analysis by applying unit loads to selective nodes on said pad surface of said hydrodynamic bearing;

means for forming an influence coefficient matrix from said movement characteristics;

means for combining said influence coefficient matrix with a two-dimensional model of said hydrodynamic fluid film based on the Reynolds equation;

means for solving said combined matrix and model in an iterative fashion to determine a steady-state behavior of said bearing construction;

means for determining whether the steady-state behavior is acceptable; and means for modifying at least one of the pad shape and support structure in said system of nodes if the steady-state behavior is not acceptable.

19. The apparatus of claim 18, wherein a range of acceptable rotordynamic performance characteristics have been identified, said apparatus further comprising:

means for constructing a rotor model by replacing structural components of said hydrodynamic bearing system with springs and dampers at appropriate sections;

means for determining undamped critical speed maps and mode shapes from said rotor model;

means for determining damping coefficients by applying a velocity perturbation in said solving step and calculating a change in force from said velocity perturbation;

means for determining stiffness coefficients by applying a position perturbation in said solving step and calculating a change in force from said position perturbation;

means for applying said damping and stiffness coefficients to said springs and dampers;

means for performing forced response and stability analysis using said rotor model to determine the rotrodynamic behavior of the bearing construction; and means for modifying at least one of the pad shape and support structure in said system of nodes if the rotordynamic behavior is not acceptable.

20. A method for providing a support for a rotating shaft, the method comprising the steps of:

providing a plurality of circumferentially spaced bearing pads, each pad having a shaft supporting face;

providing a support structure to support the bearing pads under load and to provide for movement of the bearing pads caused by shaft rotation under load such that a hydrodynamic wedge is formed between the shaft and the pad shaft supporting faces;

analyzing the movement characteristics of the pads and support structure under expected loading; and modifying at least one of the bearing pads and support structure to provide pad and support structure movement under load which results in the desired hydrodynamic wedge characteristics.

21. The method of claim 20, wherein the step of modifying at least one of the pad shape and support structure comprises tapering the leading edge of the bearing pads.

22. The method of claim 20, wherein the step of modifying at least one of the pad shape and support structure comprises forming a recess in the support surface of the bearing pads.

23. The method of claim 20, wherein the step of modifying at least one of the pad shape and support structure comprises providing a cut in the support surface of the bearing pads, the cut extending between opposed edges of the bearing pad.

24. The method of claim 20, wherein the step of modifying at least one of the pad shape and support structure comprises providing a recess in the shaft support surface of the bearing pads.

25. The method of claim 20, wherein the step of modifying at least one of the pad shape and support structure comprises providing a single web-like ligament to support each bearing pad.

26. The method of claim 20, wherein the step of modifying at least one of the pad shape and support structure comprises providing a first beam for supporting each of the bearing pads and providing a second beam for supporting each of the first beams.

27. The method of claim 20, wherein the step of modifying at least one of the pad shape and support structure comprises providing a first beam for supporting each of the bearing pads and a single membrane for supporting all of the first beams and a plurality of circumferential beams supporting the membrane.

28. The method of claim 20, wherein the step of modifying at least one of the pad shape and support structure comprises providing at least two beams to support each bearing pad.

29. The method of claim 20, wherein the step of modifying at least one of the pad shape and support structure comprises providing at least one circumferentially extending beam to support each bearing pad.

30. The method of claim 20, wherein the step of analyzing the movement characteristic of the pads and support structure comprises the steps of:

identifying operating conditions for said hydrodynamic bearing system;

identifying a range of acceptable steady-state behavior characteristics;

inputting the details of a bearing construction including a pad shape support structure configuration to support the shaft under operating conditions;

generating a multi-dimensional model of said bearing construction;

translating said multi-dimensional model of said bearing construction into a system of nodes appropriate for finite element analysis;

determining the movement characteristics of said bearing construction through said finite element analysis by applying unit loads to selective nodes on said pad surface of said hydrodynamic bearing;

forming an influence coefficient matrix from said movement characteristics;

combining said influence coefficient matrix with a two-dimensional model of said hydrodynamic fluid film based on the Reynolds equation;

solving said combined matrix and model in an iterative fashion to determine the steady-state behavior characteristics of said bearing construction;

determining whether the steady-state behavior is acceptable; and modifying at least one of the pad shape and support structure if the steady-state behavior is not acceptable.

31. The method of claim 30, wherein the step of analyzing the movement characteristics of the pad and support structure further comprises the steps of:

identifying a range of acceptable rotordynamic performance characteristics;

constructing a rotor model by replacing structural components of said hydrodynamic bearing system with springs and dampers at appropriate sections;

determining undamped critical speed maps and mode shapes from said rotor model;

determining damping coefficients by applying a velocity perturbation in said solving step and calculating a change in force from said velocity perturbation;

determining stiffness coefficients by applying a position perturbation in said solving step and calculating a change in force from said position perturbation;

applying said damping and stiffness coefficients to said springs and dampers;

performing forced response and stability analysis using said rotor model to determine the rotordynamic behavior of the bearing construction;

determining whether the rotordynamic behavior is acceptable; and modifying at least one of the pad shape and support structure if the rotordynamic behavior is not acceptable.

32. The method of claim 30, wherein a temperature dependence is provided within the two-dimensional fluid film model.

33. The method of claim 30, wherein turbulence effects are provided within the two-dimensional fluid film model.

34. The method of claim 30, wherein the step of analyzing the movement characteristics of the pads and support structure further comprises the step of providing for cavitation effects within the two-dimensional fluid film model.

35. The method of claim 30, wherein the step of determining whether the steady-state behavior is acceptable further comprises:

comparing the steady-state behavior of the bearing construction to the range of acceptable steady-state behavior characteristics and generating a first signal if the steady-state behavior characteristics of the bearing construction are within the range of acceptable steady-state behavior characteristics and generating a second signal if the steady-state behavior characteristics of the bearing construction are not within the range of the range of acceptable steady-state behavior characteristics.

36. The method of claim 35, further comprising the step of outputting in a readable format the details of the bearing construction in response to the first signal.

37. The method of claim 35, wherein the steps of modifying at least one of the pad shape and support structure is carried out in response to the second signal.

* * * * *